United States Patent
Roth et al.

(10) Patent No.: US 10,313,312 B2
(45) Date of Patent: *Jun. 4, 2019

(54) KEY ROTATION TECHNIQUES

(71) Applicant: Amazon Technologies, Inc., Seattle, WA (US)

(72) Inventors: Gregory Branchek Roth, Seattle, WA (US); Matthew James Wren, Seattle, WA (US); Eric Jason Brandwine, Haymarket, VA (US); Brian Irl Pratt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,604

(22) Filed: Mar. 17, 2017

(65) Prior Publication Data

US 2017/0195119 A1    Jul. 6, 2017

Related U.S. Application Data

(63) Continuation of application No. 13/916,999, filed on Jun. 13, 2013, now Pat. No. 9,608,813.

(51) Int. Cl.
*H04L 29/06* (2006.01)
*H04L 9/08* (2006.01)
(Continued)

(52) U.S. Cl.
CPC .......... *H04L 63/0428* (2013.01); *H04L 9/083* (2013.01); *H04L 9/0822* (2013.01);
(Continued)

(58) Field of Classification Search
None
See application file for complete search history.

(56) References Cited

U.S. PATENT DOCUMENTS 4,868,877 A   9/1989   Fischer
4,918,728 A   4/1990   Matyas et al.
(Continued)

FOREIGN PATENT DOCUMENTS

CN   1740944      3/2006
CN   101281578    10/2008
(Continued)

OTHER PUBLICATIONS

Bernstein et al., "The Poly1305-AES Message-Authentication Code," Lecture Notes in Computer Science, Department of Mathematics, Statistics, and Computer Science (M/C 249), The University of Illinois at Chicago, Feb. 21, 2005, 18 pages.
(Continued)

*Primary Examiner* — Henry Tsang
(74) *Attorney, Agent, or Firm* — Davis Wright Tremaine LLP

(57) ABSTRACT

A plurality of devices, having common access to a first key under which a set of data objects used by the plurality of devices are encrypted, is caused to replace the first key with a second key by at least causing a device of the plurality of devices to encrypt a subset of the set of data objects that are not selected for electronic shredding, allow access to a data object of the subset regardless of whether the data object is encrypted using the first key or the second key. At a time after the data object becomes accessible by using the second key, each of the plurality of devices is verified have common access to the second key, and the plurality of devices is caused to lose access to the first key.

20 Claims, 26 Drawing Sheets

(51) Int. Cl.
*H04L 9/14* (2006.01)
*H04L 9/32* (2006.01)
*H04L 9/16* (2006.01)

(52) U.S. Cl.
CPC .......... *H04L 9/0825* (2013.01); *H04L 9/0891* (2013.01); *H04L 9/0894* (2013.01); *H04L 9/14* (2013.01); *H04L 9/16* (2013.01); *H04L 9/3213* (2013.01); *H04L 9/3234* (2013.01); *H04L 9/3247* (2013.01); *H04L 63/0435* (2013.01); *H04L 63/0807* (2013.01)

(56) References Cited

U.S. PATENT DOCUMENTS

| Patent/Publication No. | Kind | Date | Inventor(s) |
|---|---|---|---|
| 5,054,067 | A | 10/1991 | Moroney et al. |
| 5,146,498 | A * | 9/1992 | Smith .................. H04L 9/0891 380/273 |
| 5,201,000 | A | 4/1993 | Matyas et al. |
| 5,495,533 | A | 2/1996 | Linehan et al. |
| 5,633,931 | A | 5/1997 | Wright |
| 5,675,653 | A | 10/1997 | Nelson |
| 5,826,245 | A | 10/1998 | Sandberg-Diment |
| 5,862,220 | A | 1/1999 | Perlman |
| 6,012,144 | A | 1/2000 | Pickett |
| 6,175,625 | B1 | 1/2001 | Safford et al. |
| 6,185,679 | B1 | 2/2001 | Coppersmith et al. |
| 6,199,162 | B1 | 3/2001 | Luyster |
| 6,240,187 | B1 | 5/2001 | Lewis |
| 6,259,789 | B1 | 7/2001 | Paone |
| 6,336,186 | B1 | 1/2002 | Dyksterhouse et al. |
| 6,356,941 | B1 | 3/2002 | Cohen |
| 6,505,299 | B1 | 1/2003 | Zeng et al. |
| 6,546,492 | B1 | 4/2003 | Walker et al. |
| 6,816,595 | B1 | 11/2004 | Kudo |
| 7,295,671 | B2 | 11/2007 | Snell |
| 7,362,868 | B2 | 4/2008 | Madoukh et al. |
| 7,490,248 | B1 | 2/2009 | Valfridsson et al. |
| 7,565,419 | B1 | 7/2009 | Kwiatkowski et al. |
| 7,620,680 | B1 | 11/2009 | Lamport |
| 7,774,826 | B1 | 8/2010 | Romanek et al. |
| 7,865,446 | B2 | 1/2011 | Armingaud et al. |
| 7,877,607 | B2 | 1/2011 | Circenis et al. |
| 7,894,604 | B2 | 2/2011 | Nishioka et al. |
| 7,894,626 | B2 | 2/2011 | Wang et al. |
| 7,953,978 | B2 | 5/2011 | Greco et al. |
| 8,024,562 | B2 | 9/2011 | Gentry et al. |
| 8,024,582 | B2 | 9/2011 | Kunitz et al. |
| 8,065,720 | B1 | 11/2011 | Ebrahimi et al. |
| 8,091,125 | B1 | 1/2012 | Hughes et al. |
| 8,111,828 | B2 | 2/2012 | Raman et al. |
| 8,140,847 | B1 | 3/2012 | Wu |
| 8,213,602 | B2 | 7/2012 | Mamidwar |
| 8,245,037 | B1 | 8/2012 | Durgin et al. |
| 8,245,039 | B2 | 8/2012 | Jones |
| 8,251,283 | B1 | 8/2012 | Norton |
| 8,261,320 | B1 | 9/2012 | Serenyi et al. |
| 8,295,492 | B2 | 10/2012 | Suarez et al. |
| 8,302,170 | B2 | 10/2012 | Kramer et al. |
| 8,315,387 | B2 | 11/2012 | Kanter et al. |
| 8,370,648 | B1 | 2/2013 | Natanzon |
| 8,379,857 | B1 | 2/2013 | Zheng |
| 8,494,168 | B1 | 7/2013 | Tolfmans |
| 8,572,369 | B2 | 10/2013 | Schmidt-Karaca et al. |
| 8,588,426 | B2 | 11/2013 | Xin et al. |
| 8,607,358 | B1 | 12/2013 | Shankar et al. |
| 8,654,970 | B2 | 2/2014 | Olson et al. |
| 8,713,311 | B1 | 4/2014 | Roskind |
| 8,751,807 | B2 | 6/2014 | Ma et al. |
| 8,774,403 | B2 | 7/2014 | MacMillan et al. |
| 8,804,950 | B1 | 8/2014 | Panwar |
| 8,868,914 | B2 | 10/2014 | Teppler |
| 8,904,181 | B1 | 12/2014 | Felsher et al. |
| 8,964,990 | B1 | 2/2015 | Baer et al. |
| 8,989,379 | B2 | 3/2015 | Katar et al. |
| 9,031,240 | B2 | 5/2015 | Yang et al. |
| 9,367,697 | B1 | 6/2016 | Roth et al. |
| 9,705,674 | B2 | 7/2017 | Roth et al. |
| 2001/0052071 | A1 | 12/2001 | Kudo et al. |
| 2002/0029337 | A1 | 3/2002 | Sudia et al. |
| 2002/0076044 | A1 | 6/2002 | Pires |
| 2002/0141590 | A1 | 10/2002 | Montgomery |
| 2003/0021417 | A1 | 1/2003 | Vasic et al. |
| 2003/0081790 | A1 | 5/2003 | Kallahalla et al. |
| 2003/0084290 | A1 | 5/2003 | Murty et al. |
| 2003/0093694 | A1 | 5/2003 | Medvinsky et al. |
| 2003/0131238 | A1 | 7/2003 | Vincent |
| 2003/0163701 | A1 | 8/2003 | Ochi et al. |
| 2003/0172269 | A1 | 9/2003 | Newcombe |
| 2003/0188181 | A1 | 10/2003 | Kunitz et al. |
| 2003/0188188 | A1 | 10/2003 | Padmanabhan et al. |
| 2004/0009815 | A1 | 1/2004 | Zotto et al. |
| 2004/0093499 | A1 | 5/2004 | Arditi et al. |
| 2004/0107345 | A1 | 6/2004 | Brandt et al. |
| 2004/0143733 | A1 | 7/2004 | Ophir et al. |
| 2004/0193915 | A1 | 9/2004 | Smith et al. |
| 2004/0223608 | A1 | 11/2004 | Oommen et al. |
| 2005/0010760 | A1 | 1/2005 | Goh et al. |
| 2005/0050317 | A1 | 3/2005 | Kramer et al. |
| 2005/0120232 | A1 | 6/2005 | Hori et al. |
| 2005/0123142 | A1 | 6/2005 | Freeman et al. |
| 2005/0165859 | A1 | 7/2005 | Geyer et al. |
| 2005/0246778 | A1 | 11/2005 | Usov et al. |
| 2005/0273629 | A1 | 12/2005 | Abrams et al. |
| 2006/0010323 | A1 | 1/2006 | Martin et al. |
| 2006/0018468 | A1 | 1/2006 | Toba et al. |
| 2006/0021018 | A1 | 1/2006 | Hinton et al. |
| 2006/0143685 | A1 * | 6/2006 | Vasishth ............... G06F 21/577 726/1 |
| 2006/0204003 | A1 | 9/2006 | Takata et al. |
| 2006/0206932 | A1 | 9/2006 | Chong |
| 2006/0288232 | A1 | 12/2006 | Ho et al. |
| 2006/0291664 | A1 | 12/2006 | Suarez et al. |
| 2007/0033637 | A1 | 2/2007 | Yami et al. |
| 2007/0050641 | A1 | 3/2007 | Flynn et al. |
| 2007/0136599 | A1 | 6/2007 | Suga |
| 2007/0140480 | A1 | 6/2007 | Yao |
| 2007/0180153 | A1 | 8/2007 | Cornwell et al. |
| 2007/0220279 | A1 | 9/2007 | Northcutt et al. |
| 2007/0230704 | A1 | 10/2007 | Youn et al. |
| 2007/0230706 | A1 | 10/2007 | Youn |
| 2007/0283446 | A1 | 12/2007 | Yami et al. |
| 2008/0005024 | A1 | 1/2008 | Kirkwood |
| 2008/0019516 | A1 | 1/2008 | Fransdonk |
| 2008/0019527 | A1 * | 1/2008 | Youn .................. H04L 9/083 380/278 |
| 2008/0025514 | A1 | 1/2008 | Coombs |
| 2008/0046984 | A1 | 2/2008 | Bohmer et al. |
| 2008/0082827 | A1 | 4/2008 | Agrawal et al. |
| 2008/0084996 | A1 | 4/2008 | Chen et al. |
| 2008/0112561 | A1 | 5/2008 | Kim |
| 2008/0127279 | A1 | 5/2008 | Futa et al. |
| 2008/0172562 | A1 | 7/2008 | Cachin et al. |
| 2008/0247540 | A1 | 10/2008 | Ahn et al. |
| 2008/0298590 | A1 | 12/2008 | Katar et al. |
| 2008/0319909 | A1 * | 12/2008 | Perkins .................. G06Q 10/00 705/50 |
| 2009/0025087 | A1 | 1/2009 | Peirson, Jr. et al. |
| 2009/0034733 | A1 | 2/2009 | Raman et al. |
| 2009/0060197 | A1 | 3/2009 | Taylor et al. |
| 2009/0092252 | A1 | 4/2009 | Noll et al. |
| 2009/0106552 | A1 | 4/2009 | Mohamed |
| 2009/0158033 | A1 | 6/2009 | Jeong et al. |
| 2009/0165076 | A1 | 6/2009 | DeCusatis et al. |
| 2009/0196418 | A1 | 8/2009 | Tkacik et al. |
| 2009/0245519 | A1 | 10/2009 | Cachin et al. |
| 2009/0276514 | A1 * | 11/2009 | Subramanian ...... G06F 21/6218 709/223 |
| 2009/0300356 | A1 | 12/2009 | Crandell |
| 2010/0008499 | A1 | 1/2010 | Lee et al. |
| 2010/0011448 | A1 | 1/2010 | Wagner |
| 2010/0014662 | A1 | 1/2010 | Jutila |
| 2010/0017626 | A1 | 1/2010 | Sato et al. |
| 2010/0074445 | A1 | 3/2010 | Nefedov et al. |
| 2010/0095118 | A1 | 4/2010 | Meka |

(56) References Cited

U.S. PATENT DOCUMENTS

| | | |
|---|---|---|
| 2010/0138218 A1 | 6/2010 | Geiger |
| 2010/0153670 A1 | 6/2010 | Dodgson et al. |
| 2010/0174919 A1 | 7/2010 | Ito et al. |
| 2010/0185863 A1 | 7/2010 | Rabin et al. |
| 2010/0211781 A1 | 8/2010 | Auradkar et al. |
| 2010/0241848 A1 | 9/2010 | Stuber et al. |
| 2010/0250965 A1 | 9/2010 | Olson et al. |
| 2010/0266132 A1 | 10/2010 | Bablani et al. |
| 2010/0289627 A1 | 11/2010 | McAllister et al. |
| 2010/0303241 A1 | 12/2010 | Breyel |
| 2010/0316219 A1 | 12/2010 | Boubion et al. |
| 2010/0325732 A1 | 12/2010 | Mittal et al. |
| 2011/0022642 A1 | 1/2011 | deMilo et al. |
| 2011/0072264 A1 | 3/2011 | McNulty |
| 2011/0083163 A1 | 4/2011 | Auvenshine et al. |
| 2011/0099362 A1 | 4/2011 | Haga et al. |
| 2011/0116636 A1 | 5/2011 | Steed |
| 2011/0154031 A1 | 6/2011 | Banerjee et al. |
| 2011/0154057 A1 | 6/2011 | England et al. |
| 2011/0173435 A1 | 7/2011 | Liu et al. |
| 2011/0178933 A1 | 7/2011 | Bailey |
| 2011/0191462 A1 | 8/2011 | Smith |
| 2011/0213971 A1 | 9/2011 | Gurel et al. |
| 2011/0246765 A1 | 10/2011 | Schibuk |
| 2011/0258437 A1 | 10/2011 | McKelvey et al. |
| 2011/0258443 A1 | 10/2011 | Barry |
| 2011/0296497 A1 | 12/2011 | Becker |
| 2012/0079289 A1 | 3/2012 | Weng et al. |
| 2012/0096272 A1 | 4/2012 | Jasper et al. |
| 2012/0114118 A1 | 5/2012 | Verma |
| 2012/0124612 A1 | 5/2012 | Adimatyam et al. |
| 2012/0134495 A1 | 5/2012 | Liu |
| 2012/0140923 A1* | 6/2012 | Lee ................. H04L 9/0894 380/45 |
| 2012/0191979 A1 | 7/2012 | Feldbau |
| 2012/0198042 A1 | 8/2012 | Dunbar et al. |
| 2012/0204032 A1 | 8/2012 | Wilkins et al. |
| 2012/0260094 A1 | 10/2012 | Asim et al. |
| 2012/0266218 A1 | 10/2012 | Mattsson |
| 2012/0281839 A1 | 11/2012 | Arnold et al. |
| 2012/0290850 A1 | 11/2012 | Brandt et al. |
| 2012/0291101 A1 | 11/2012 | Ahlstrom et al. |
| 2012/0297183 A1 | 11/2012 | Mukkara et al. |
| 2012/0297200 A1 | 11/2012 | Thom et al. |
| 2012/0300936 A1 | 11/2012 | Green |
| 2012/0303961 A1 | 11/2012 | Kean et al. |
| 2012/0311675 A1 | 12/2012 | Ham et al. |
| 2012/0314854 A1 | 12/2012 | Waters |
| 2012/0321086 A1 | 12/2012 | D'Zouza et al. |
| 2012/0323990 A1 | 12/2012 | Hayworth |
| 2013/0031255 A1 | 1/2013 | Maloy et al. |
| 2013/0044878 A1 | 2/2013 | Rich et al. |
| 2013/0111217 A1 | 5/2013 | Kopasz et al. |
| 2013/0157619 A1 | 6/2013 | Di Luoffo et al. |
| 2013/0159732 A1 | 6/2013 | Leoutsarakos |
| 2013/0163753 A1 | 6/2013 | MacMillan et al. |
| 2013/0198521 A1 | 8/2013 | Wu |
| 2013/0283045 A1 | 10/2013 | Li et al. |
| 2013/0316682 A1 | 11/2013 | Vieira |
| 2013/0326233 A1 | 12/2013 | Tolfmans |
| 2014/0012751 A1 | 1/2014 | Kuhn et al. |
| 2014/0047549 A1 | 2/2014 | Bostley, III et al. |
| 2014/0122866 A1 | 5/2014 | Haeger et al. |
| 2014/0164774 A1 | 6/2014 | Nord et al. |
| 2014/0177829 A1 | 6/2014 | MacMillan et al. |
| 2014/0201533 A1 | 7/2014 | Kruglick |
| 2015/0222604 A1 | 8/2015 | Ylonen |

FOREIGN PATENT DOCUMENTS

| | | |
|---|---|---|
| CN | 101573910 | 11/2009 |
| CN | 101741547 | 6/2010 |
| CN | 101753302 | 6/2010 |
| CN | 102130768 | 7/2011 |
| CN | 102318263 | 1/2012 |
| CN | 102656591 | 9/2012 |
| JP | 2000215240 | 4/2000 |
| JP | 2000295209 | 10/2000 |
| JP | 2001209582 | 3/2001 |
| JP | 2003188871 | 7/2003 |
| JP | 2005057417 | 3/2005 |
| JP | 2005258801 | 9/2005 |
| JP | 2005533438 | 11/2005 |
| JP | 2007081482 | 3/2007 |
| JP | 2007507760 | 3/2007 |
| JP | 2008015669 | 1/2008 |
| JP | 2008306418 | 12/2008 |
| JP | 2009213064 | 9/2009 |
| JP | 2009246800 | 10/2009 |
| JP | 2010128824 | 6/2010 |
| JP | 2011019129 | 1/2011 |
| JP | 2012073374 | 4/2012 |
| JP | 2014501955 | 1/2014 |
| KR | 101145766 | 5/2012 |
| WO | WO2004008676 | 1/2004 |
| WO | WO2009060283 | 5/2009 |
| WO | WO2010001150 | 1/2010 |
| WO | WO2010093559 | 8/2010 |
| WO | WO2011083343 | 7/2011 |
| WO | WO2011089712 | 7/2011 |
| WO | WO2012060979 | 5/2012 |
| WO | WO2013145517 | 3/2013 |

OTHER PUBLICATIONS

Bethencourt et al., "Ciphertext-Policy Attribute-Based Encryption," IEEE Symposium on Security and Privacy 2007, 15 pages.
Guttman et al., "An Introduction to Computer Security: The NIST Handbook," Special Publication 800-12, Oct. 1, 1995, Sections 17.6 and 18.3.2 and Section 19 for cryptographic tools, XP055298016, retrieved on Aug. 26, 2016, from http://www.davidsalomon.name/CompSec/auxiliary/handbook.pdf.
IEEE, "Draft Standard for Identity-based Public-key Cryptography Using Pairings," IEEE P1363.3/D1, Apr. 2008, retrieved Sep. 22, 2015, from http://grouper.ieee.org/groups/1363/IBC/material/P1363.3-D1-200805.pdf, 85 pages.
International Search Report and Written Opinion dated Apr. 29, 2014, in International Patent Application No. PCT/US2014/015404, filed Feb. 7, 2014.
International Search Report and Written Opinion dated May 28, 2014, in International Patent Application No. PCT/US2014/15697, filed Feb. 11, 2014.
International Search Report and Written Opinion dated May 30, 2014, in International Patent Application No. PCT/US2014/015408, filed Feb. 7, 2014.
International Search Report and Written Opinion dated May 30, 2014, in International Patent Application No. PCT/US2014/015410, filed Feb. 7, 2014.
International Search Report and Written Opinion dated May 30, 2014, International Patent Application No. PCT/US2014/015414, filed Feb. 7, 2014.
Krawczyk et al., "HMAC-based Extract-and-Expand Key Derivation Function (HKDF)," Internet Engineering Task Force (IETF), May 2010, retrieved Sep. 22, 2015, from https://tools.ietf.org/html/rfc5869, 14 pages.
Rescorla, "Diffie-Hellman Key Agreement Method," Network Working Group, RTFM Inc., Jun. 1999, retrieved on Sep. 22, 2015, from https://tools.ietf.org/html/rfc2631, 13 pages.
Sieloff, "The new systems administrator: The role of becoming root," Inside Solaris, Oct. 2002, 8(10):6-9.
Wikipedia, "IEEE P1363 an Institute of Electrical and Electronics Engineers (IEEE) standardization project for public-key cryptography," retrieved Sep. 22, 2015, from https://en.wikipedia.org/wiki/IEEE_P1363, 3 pages.
Wikipedia, "Key derivation function," retrieved Sep. 22, 2015, from https://en.wikipedia.org/wiki/Key_derivation_function, 4 pages.
Rahumed et al., "A Secure Cloud Backup System with Assured Deletion and Version Control," 2011 International Conference on Parallel Processing Workshops, IEEE Computer Society, 8 pages.

(56) References Cited

OTHER PUBLICATIONS

Canadian Notice of Allowance for Patent Application No. 2,899,014 dated Feb. 8, 2018, 1 page.
Canadian Office Action for Patent Application No. 2,899,008 dated Mar. 14, 2018, 4 pages.
Chinese Decision on Rejection for Patent Application No. 201480011965.9 dated Jan. 15, 2018, 6 pages.
Chinese First Office Action for Patent Application No. 201480020482.5, dated Dec. 28, 2017, 11 pages.
Chinese Notice on Grant of Patent for Application No. 201480020500.X dated Dec. 28, 2017, 4 pages.
Chinese Notice on the Second Office Action for Patent Application No. 201480020517.5 dated Jan. 3, 2018, 8 pages.
European Communication pursuant to Article 94(3) EPC for Application No. 14751612.4 dated Jan. 3, 2018, 4 pages.
European Official Letter for Patent Application No. 14751881.5 dated Feb. 21, 2018, 3 pages.
Japanese Final Decision of Rejection for Patent Application No. 2015-558056 dated Mar. 13, 2018, 18 pages.
Japanese Notice and Report of Reconsideration Report for Patent Application No. 2015-558043 dated Mar. 9, 2018, 6 pages.
Japanese Notice of Allowance for Patent Application No. 2015-558042, dated Dec. 27, 2017, 6 pages.
Japanese Report on Notice of Allowance for Patent Application No. 2015-558044 dated Mar. 27, 2018, 6 pages.
Manulis, et al., "Group Signatures: Authentication with Privacy," retrieved from https://www.bsi.bund.de/SharedDocs/Downloads/EN/BSI/Publications/Studies/GruPA/GruPA.pdf?_blob=publicationFile, Published May 15, 2010, 267 pages.
Barker et al., "Recommendation for Random Number Generation Using Deterministic Random Bit Generators," National Institute Standards and Technology Special Publication 800-90A, Jan. 2012, 136 pages.
NIST, "Implementation Guidance for FIPS PUB 140-1 and the Cryptographic Module Validation Program," Jan. 10, 2002, 63 pages.
NIST, "Implementation Guidance for FIPS PUB 140-2 and the Cryptographic Module Validation Program," Initial Release Mar. 28, 2003, 205 pages.
Australian Examination Report No. 1 for Patent Application No. 2017204853 dated Jun. 29, 2018, 4 pages.
Canadian Office Action for Patent Application No. 2,898,995 dated Jul. 3, 2018, 9 pages.
Canadian Office Action for Patent Application No. 2,899,019 dated Jul. 3, 2018, 8 pages.
Canadian Office Action for Patent Application No. 2,899,027 dated Jul. 17, 2018, 6 pages.
Chinese Second Office Action for Patent Application No. 201480020482.5 dated Jul. 19, 2018, 28 pages.
Chinese Second Office Action, dated Sep. 25, 2018, for Patent Application No. 201480013039.5, 11 pages.
Chinese Third Office Action for Patent Application No. 201480020517.5 dated Jul. 25, 2018, 6 pages.
European Communication pursuant to Article 94(3) EPC for Application No. 14751237.0 dated May 28, 2018, 4 pages.
European Communication pursuant to Article 94(3) EPC for Patent Application No. 14751881.5 dated Oct. 25, 2018, 5 pages.
European Official Communication Pursuant to Article 94(3) EPC for Patent Application No. 14751256.0 dated Jan. 3, 2018, 5 pages.
Japanese Final Decision on Rejection for Patent Application No. 2015-558070 dated Apr. 3, 2018, 7 pages.
Japanese Notice of Allowance, dated Oct. 2, 2018, for Patent Application No. 2015-558056, 6 pages.
Japanese Notice of Rejection, dated Sep. 4, 2018, for Patent Application No. 2015-558043, 25 pages.
Japanese Notice of Revocation for Reconsideration and Report, dated Dec. 4, 2018, for Patent Application No. 2015-558070, 4 pages.
Olexiy et al., "Starting Share Files with NFS," Linux Journal, dated Jan. 1, 2002, retrieved on Jan. 2, 2018, from http://www.linuxjournal.com/article/4880?page=0,0, 13 pages.
Stack Exchange, "Storing secrets in software," by ninefingers, Stack Exchange Security Blog, dated Sep. 6, 2011, retrieved on Jan. 2, 2018, from http://security.blogoverflow.com/2011/09/storing-secrets-in-software/, 3 pages.
U.S. Appl. No. 13/916,915, filed Jun. 13, 2013.
U.S. Appl. No. 13/916,964, filed Jun. 13, 2013.

\* cited by examiner

US 10,313,312 B2

1

KEY ROTATION TECHNIQUES

CROSS-REFERENCE TO RELATED APPLICATIONS

This application is a continuation of U.S. application Ser. No. 13/916,999, filed on Jun. 13, 2013, now U.S. Pat. No. 9,608,813, entitled "KEY ROTATION TECHNIQUES," which incorporates by reference for all purposes the full disclosure of U.S. patent application Ser. No. 13/916,915, filed on Jun. 13, 2013, now U.S. Pat. No. 9,300,639, entitled "DEVICE COORDINATION," and co-pending U.S. patent application Ser. No. 13/916,964, filed on Jun. 13, 2013, entitled "NEGOTIATING A SESSION WITH A CRYPTOGRAPHIC DOMAIN."

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

Figure 8:
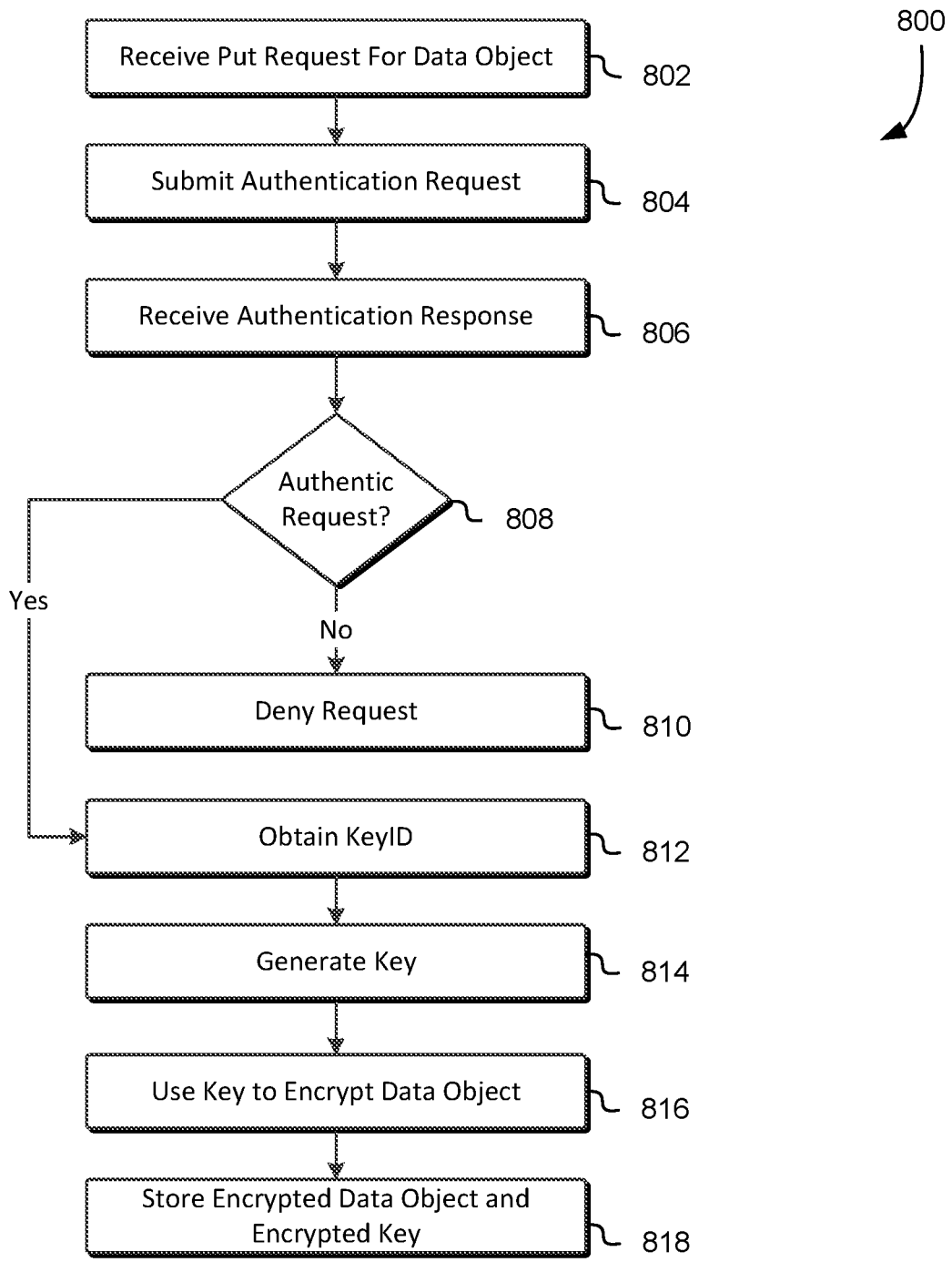
Figure 9:
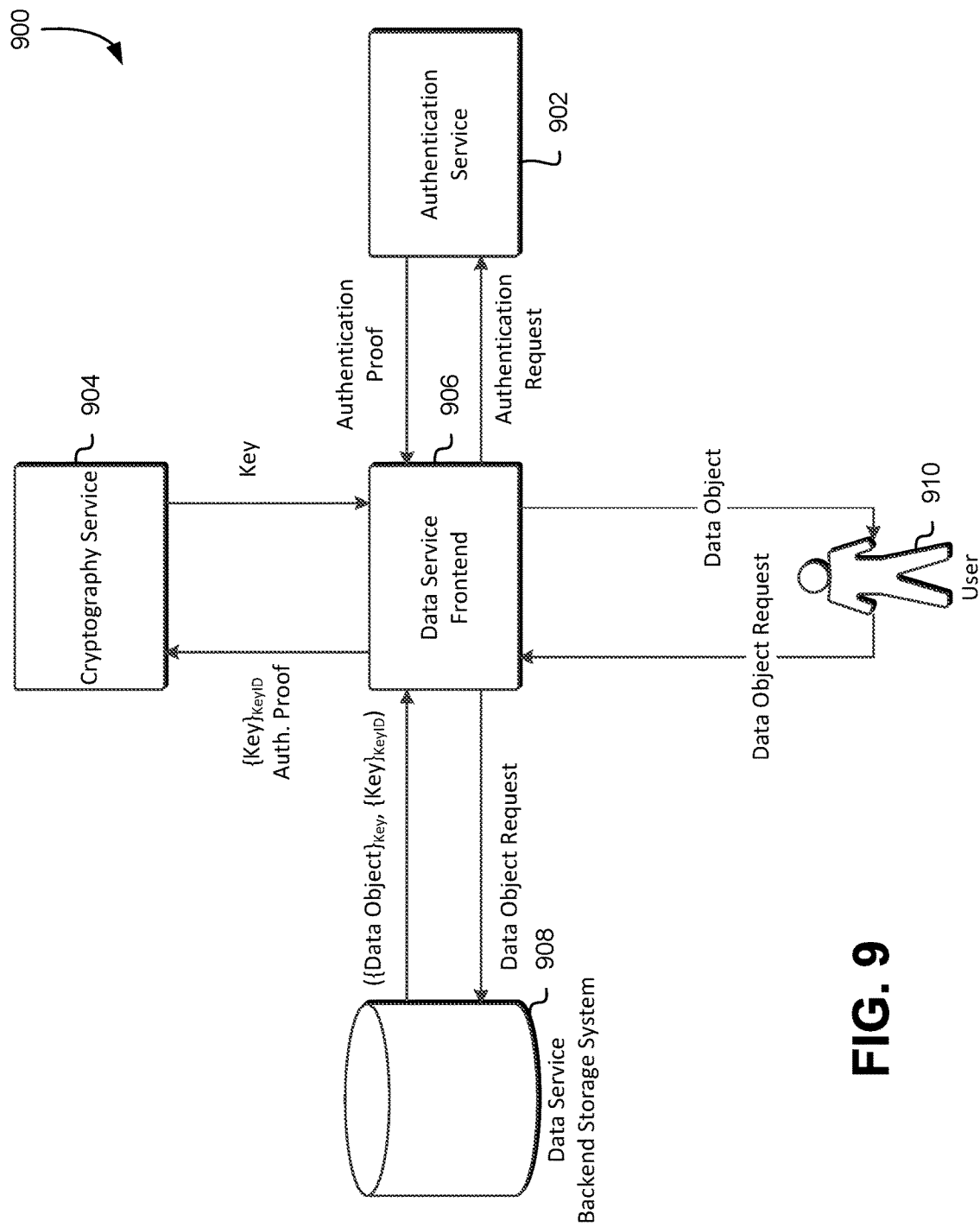
Figure 10:
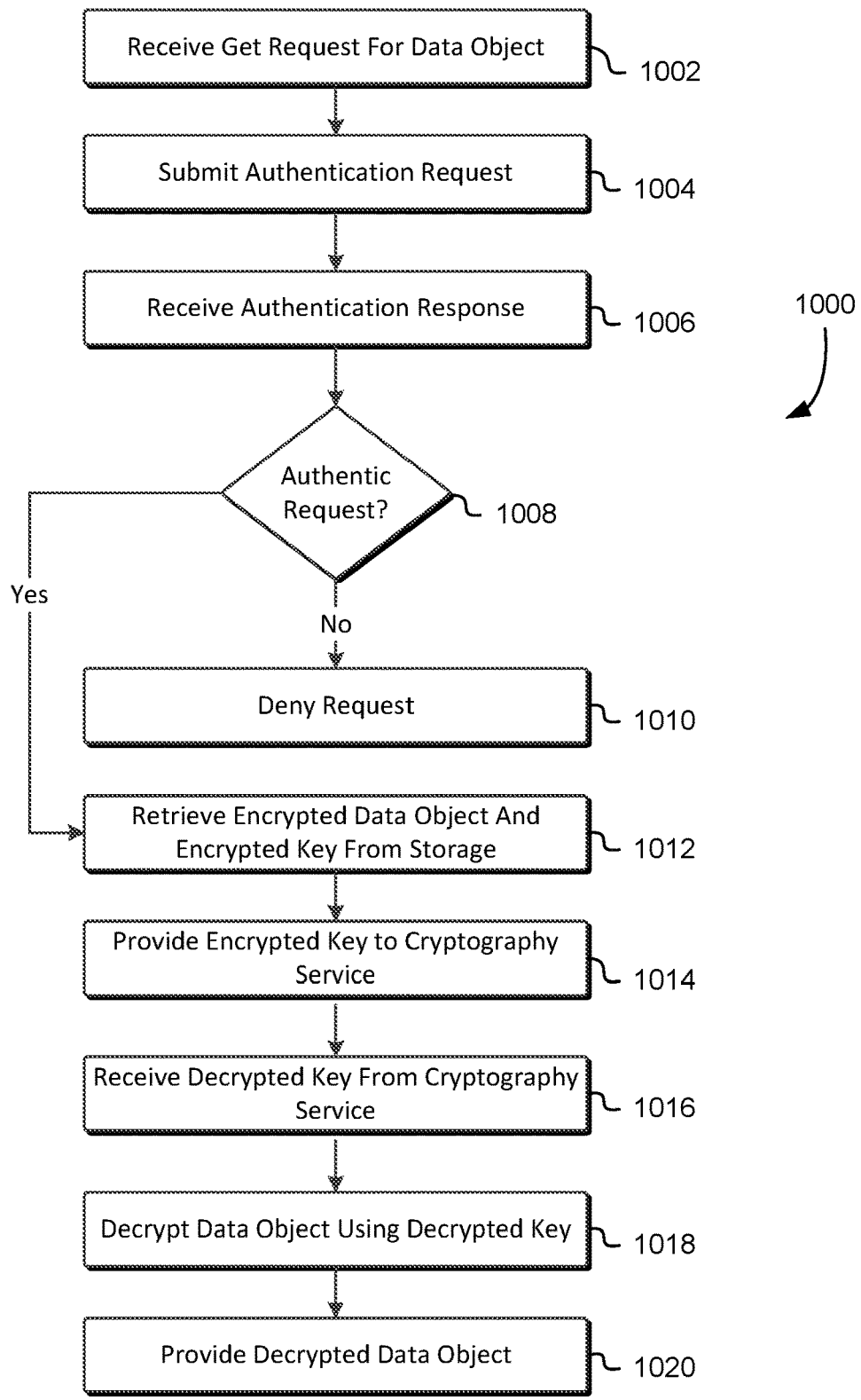
Figure 11:
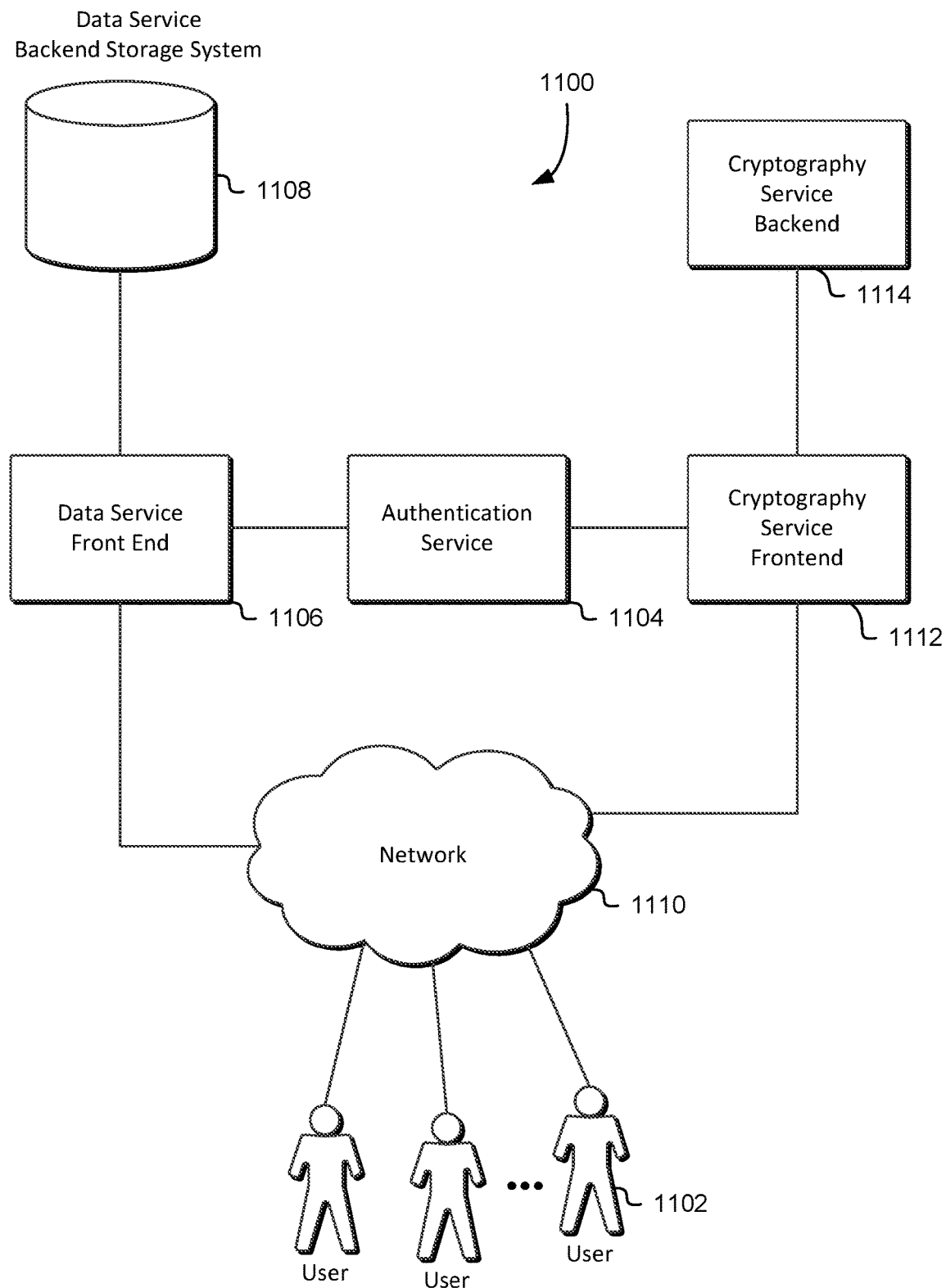
Figure 12:
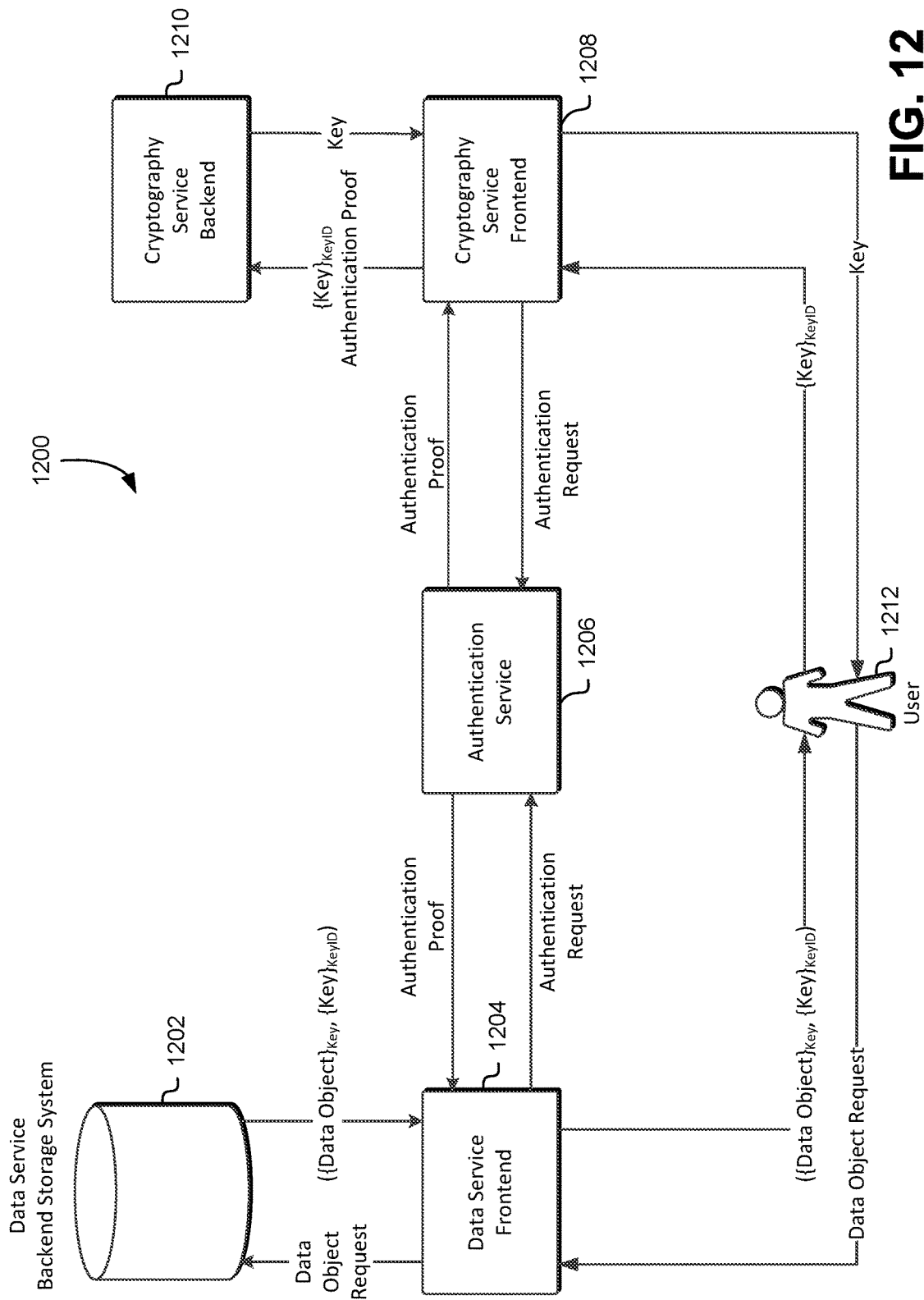
Figure 13:
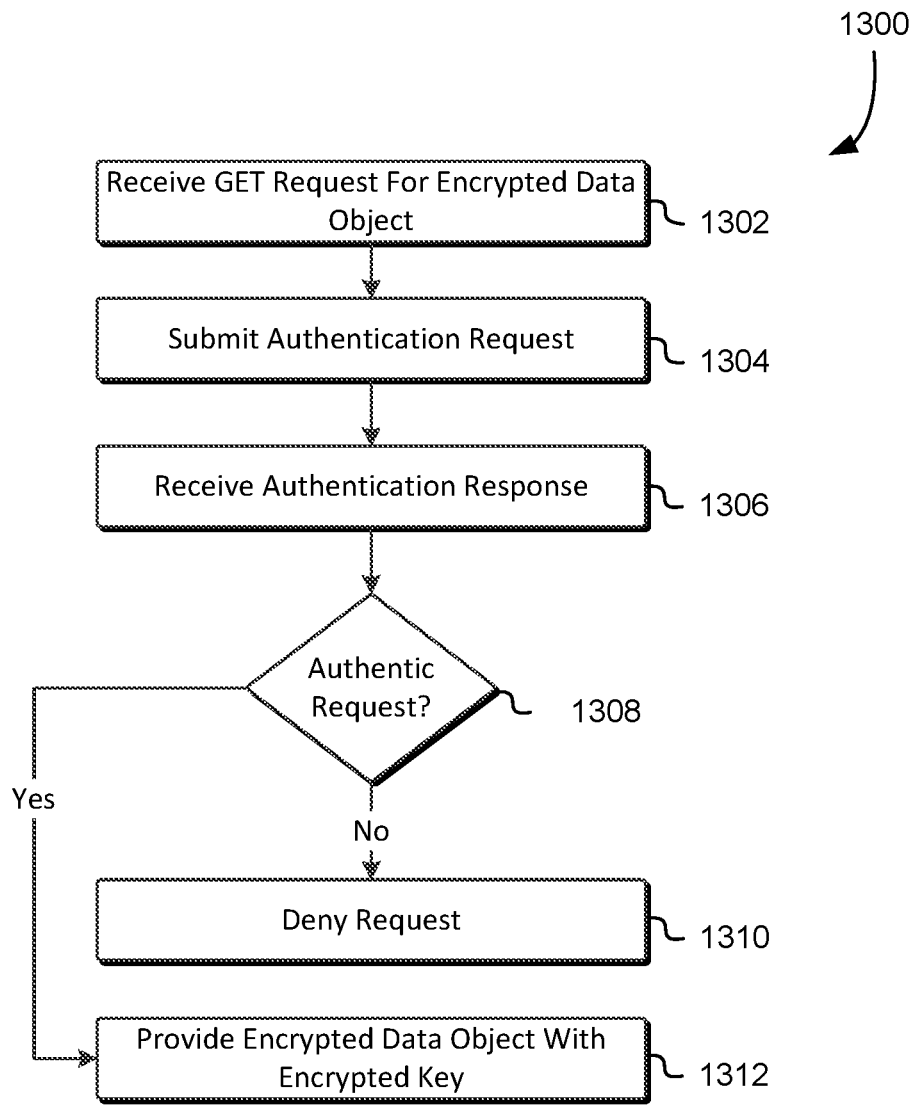
Figure 14:
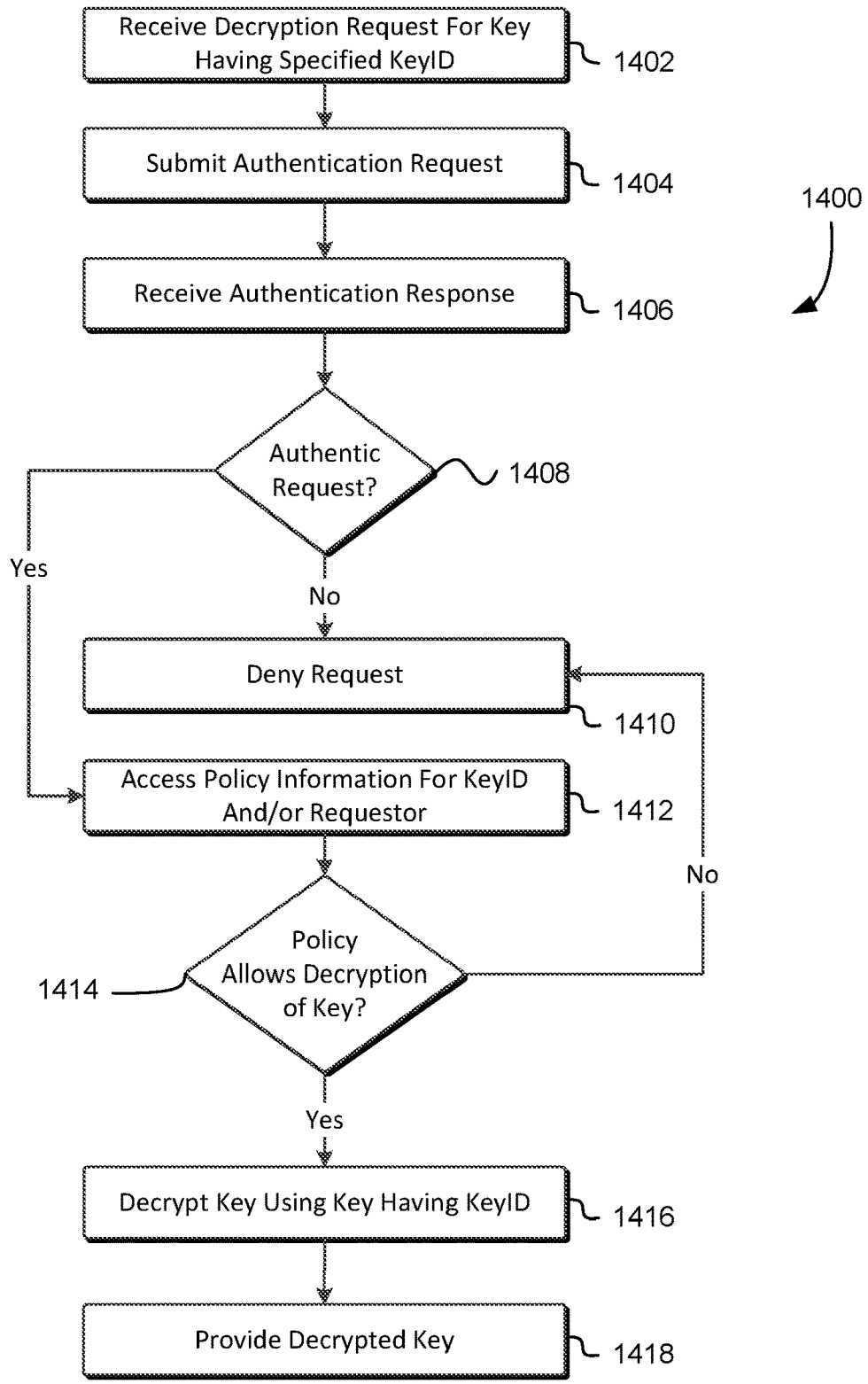
Figure 15:
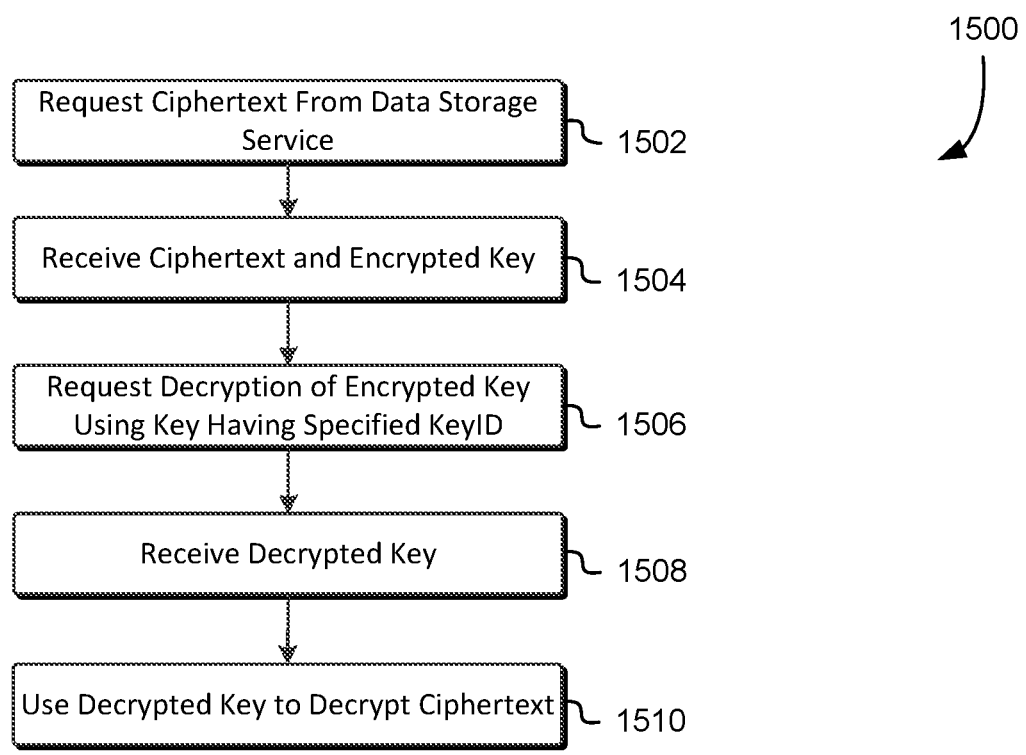
Figure 16:
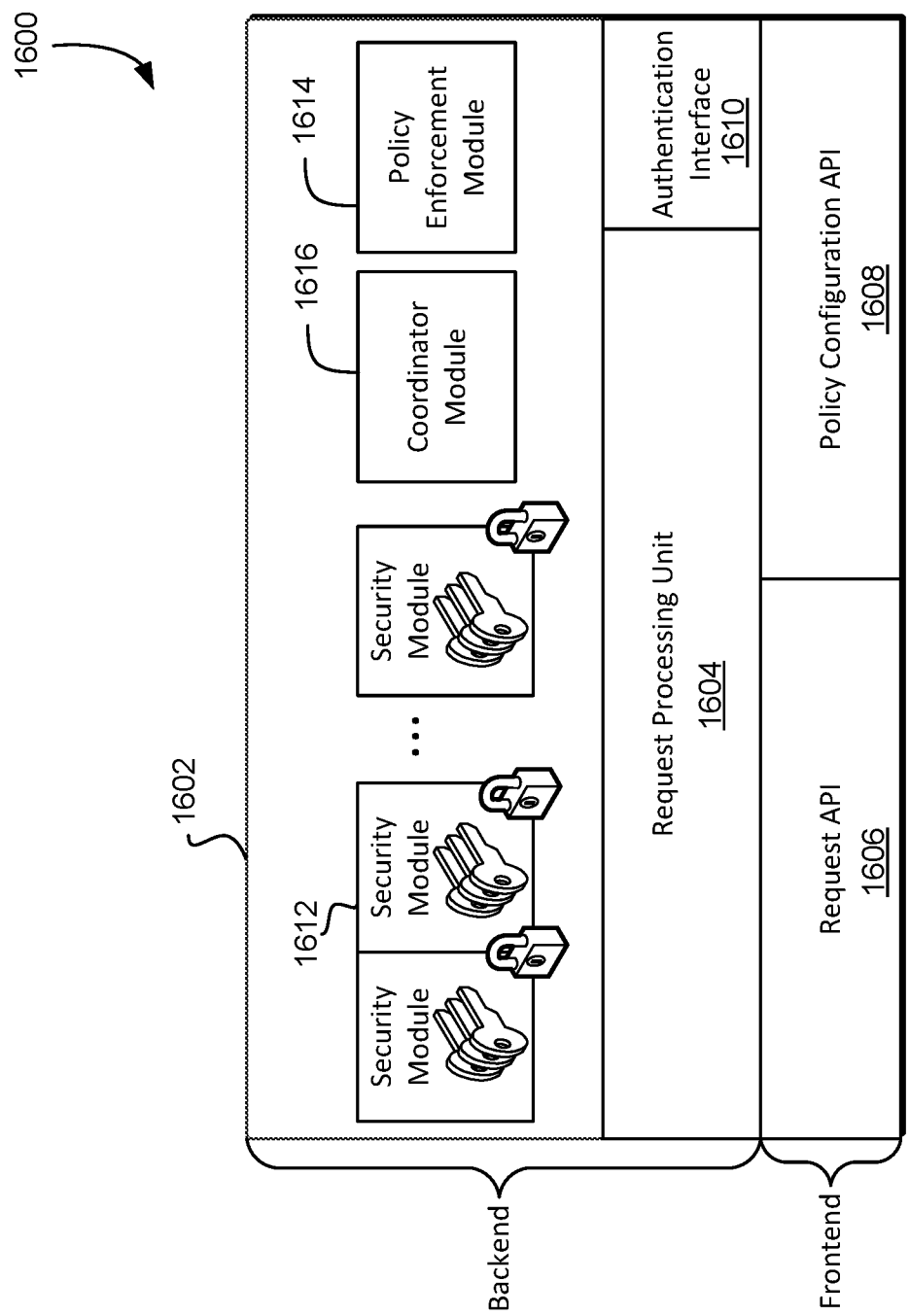
Figure 17:
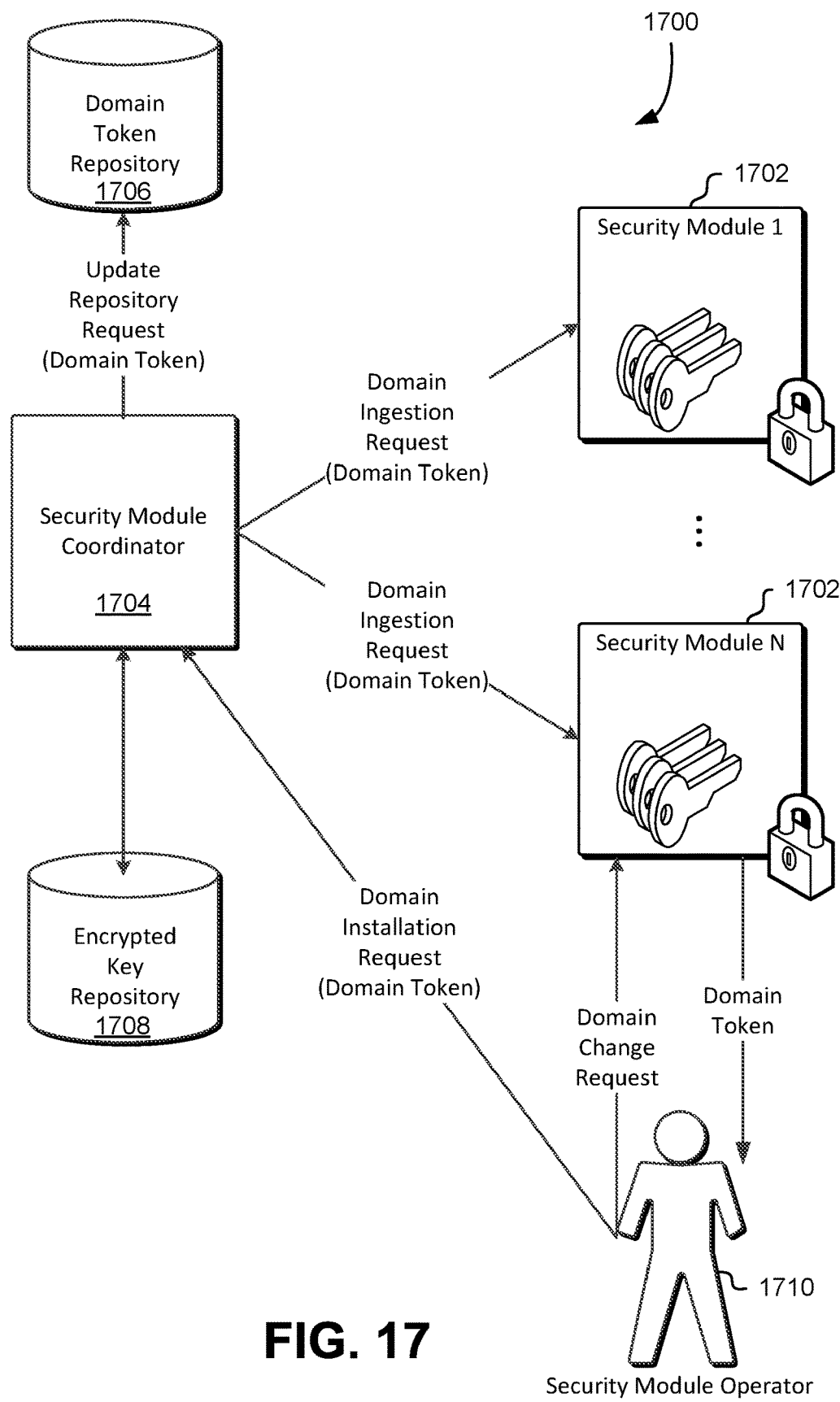
Figure 18:
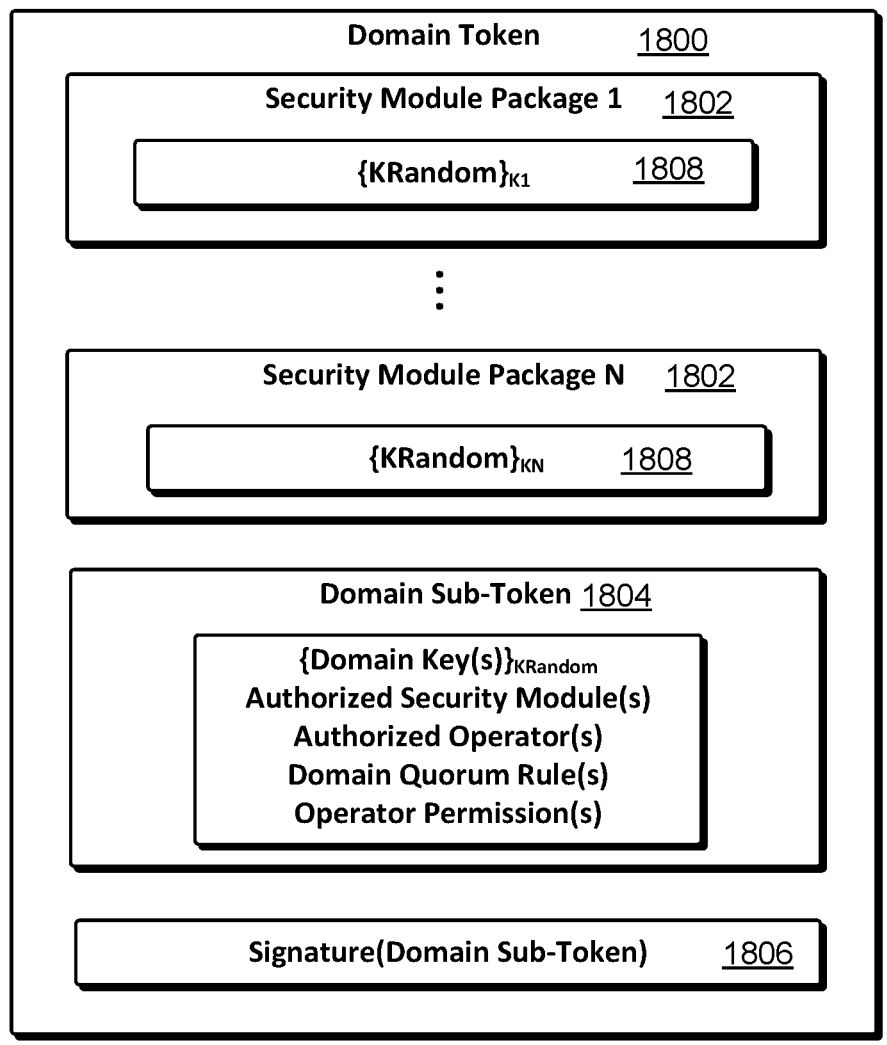
Figure 19:
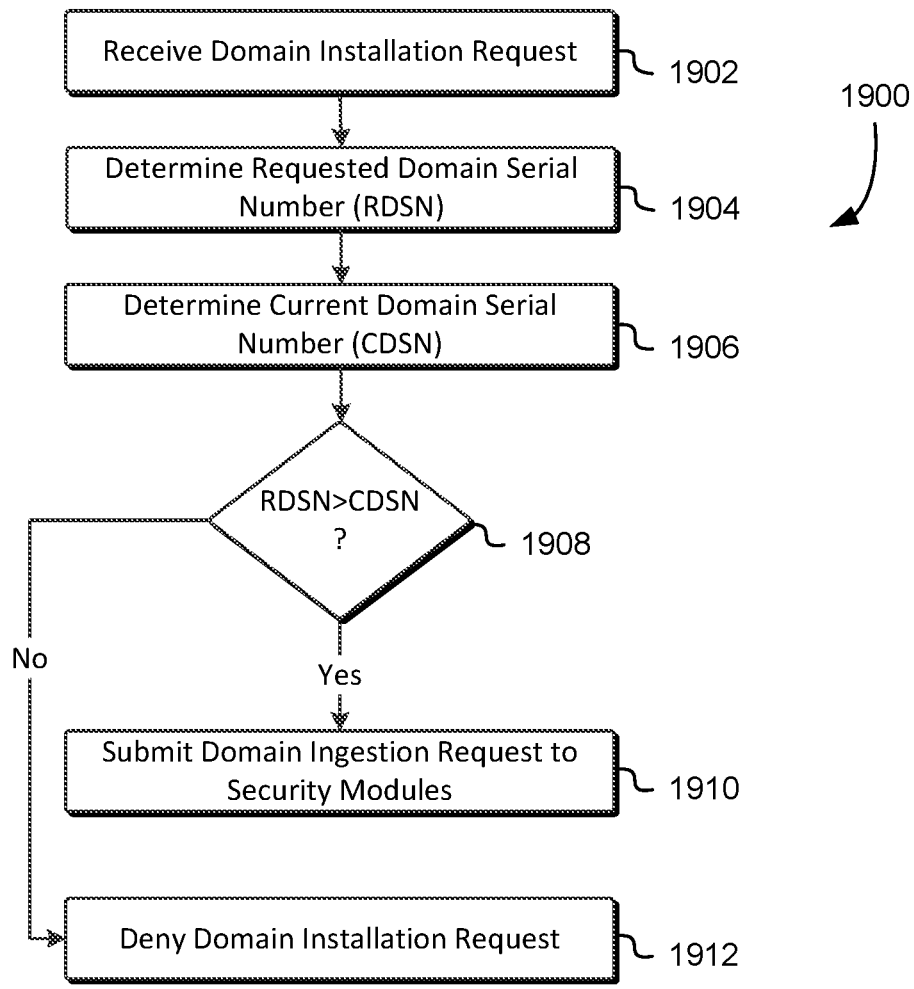
Figure 20:
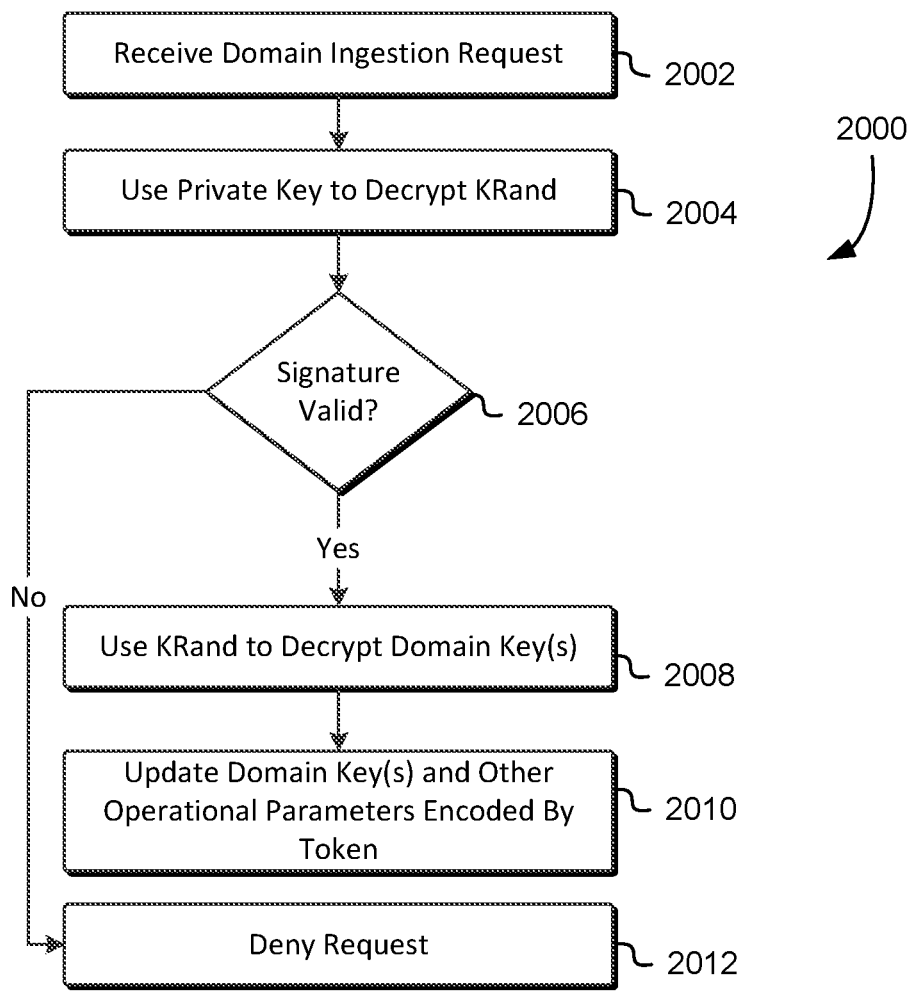
Figure 21:
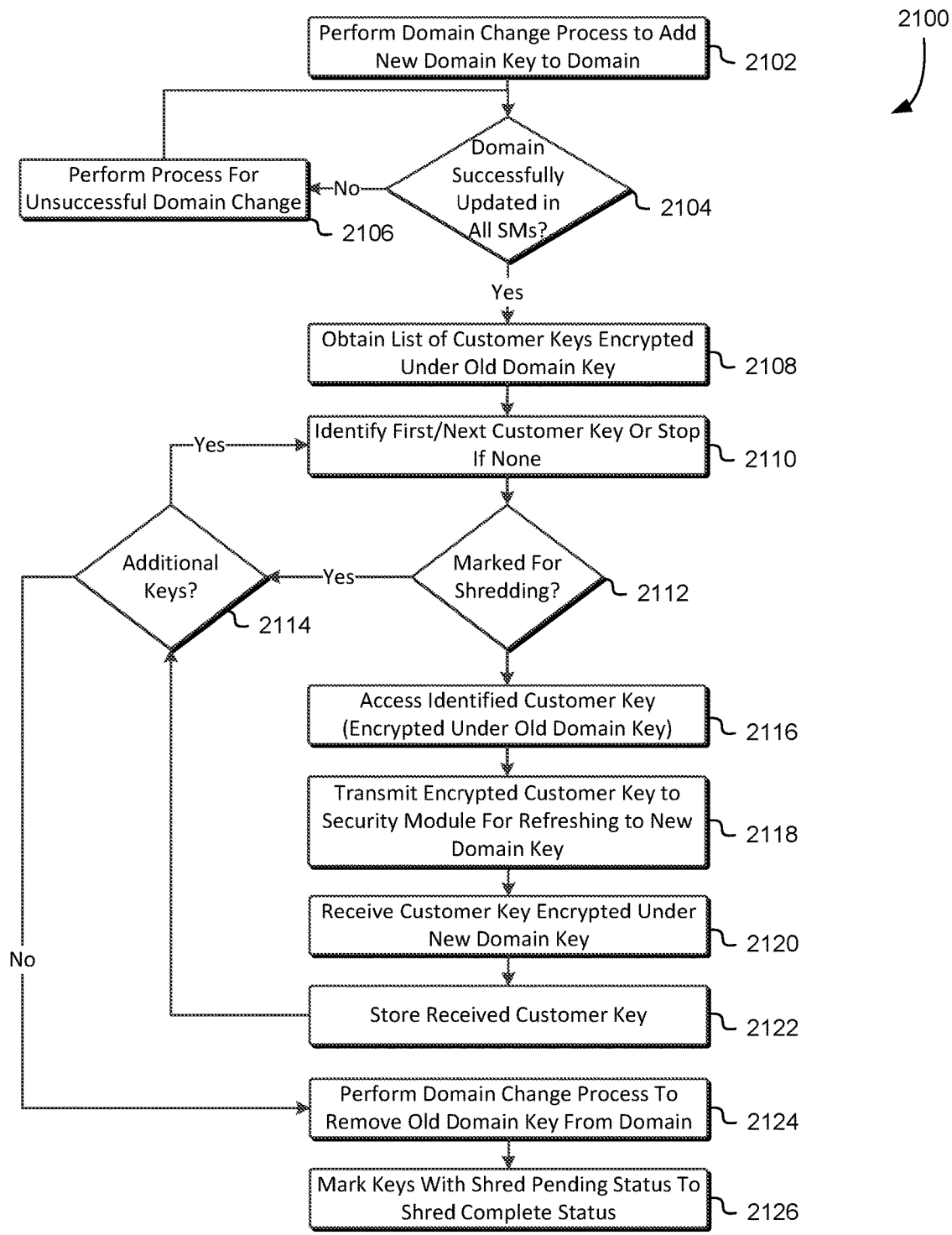
Figure 22:
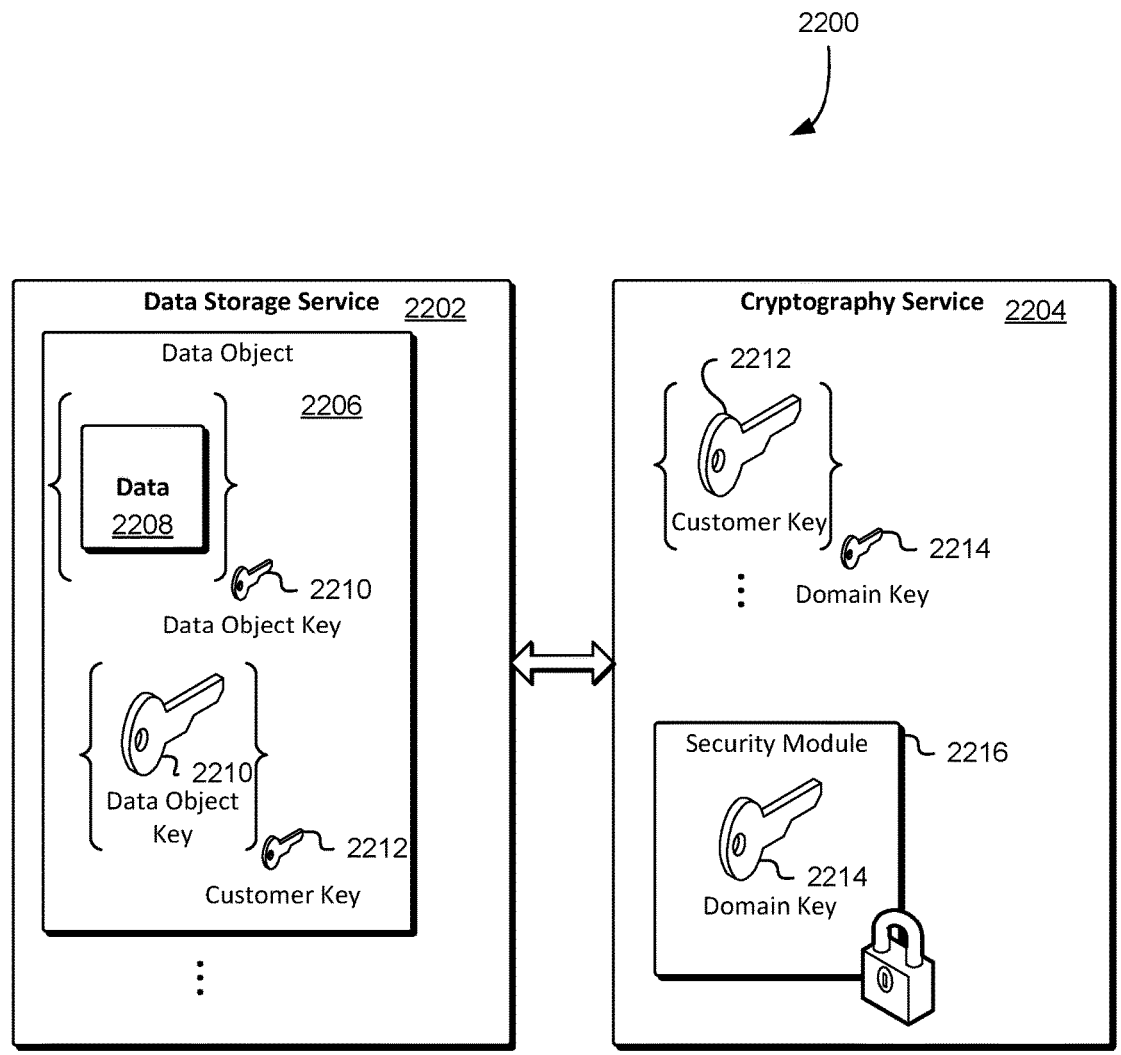
Figure 23:
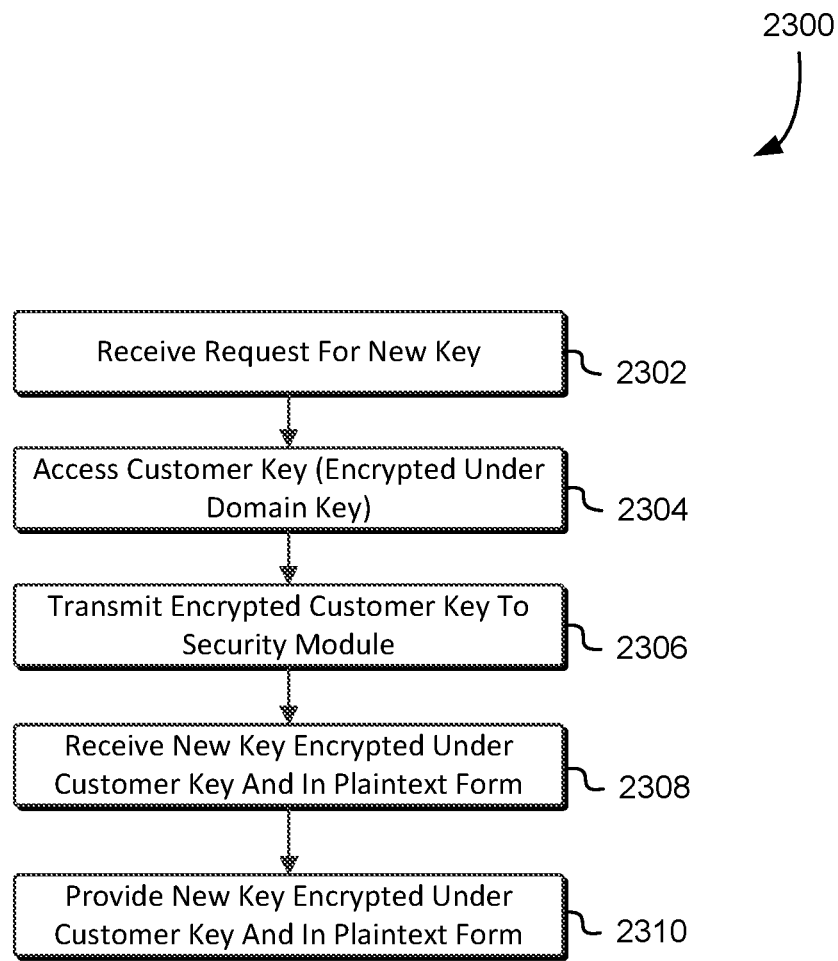
Figure 24:
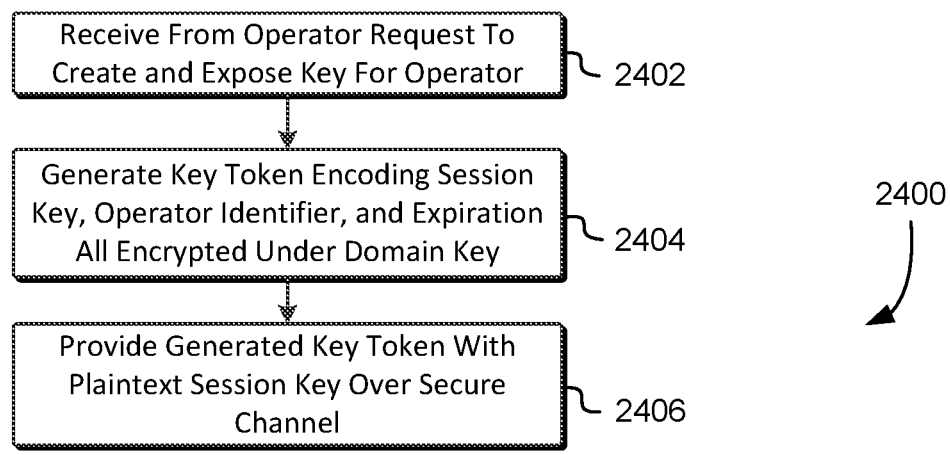
Figure 25:
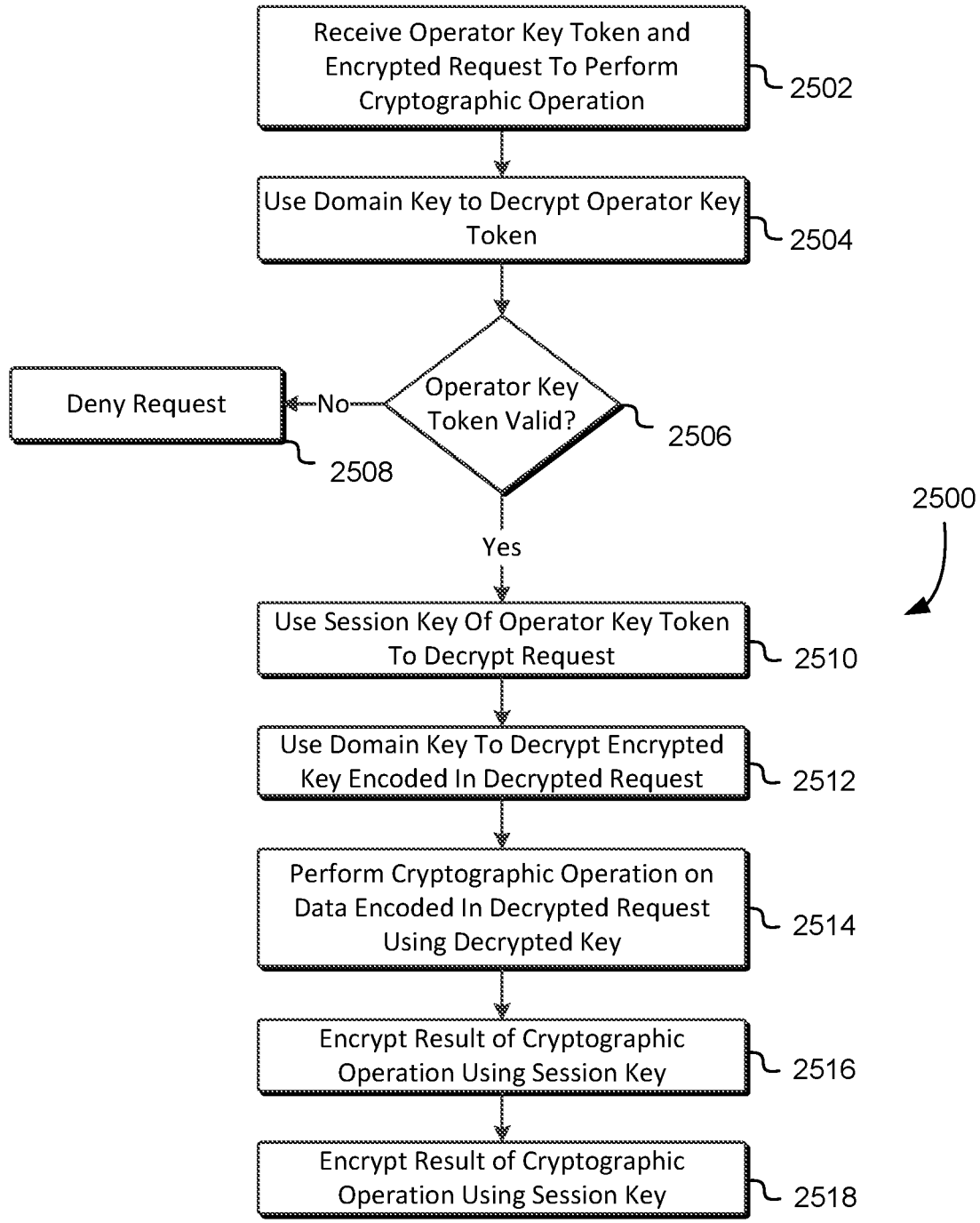
Figure 26:
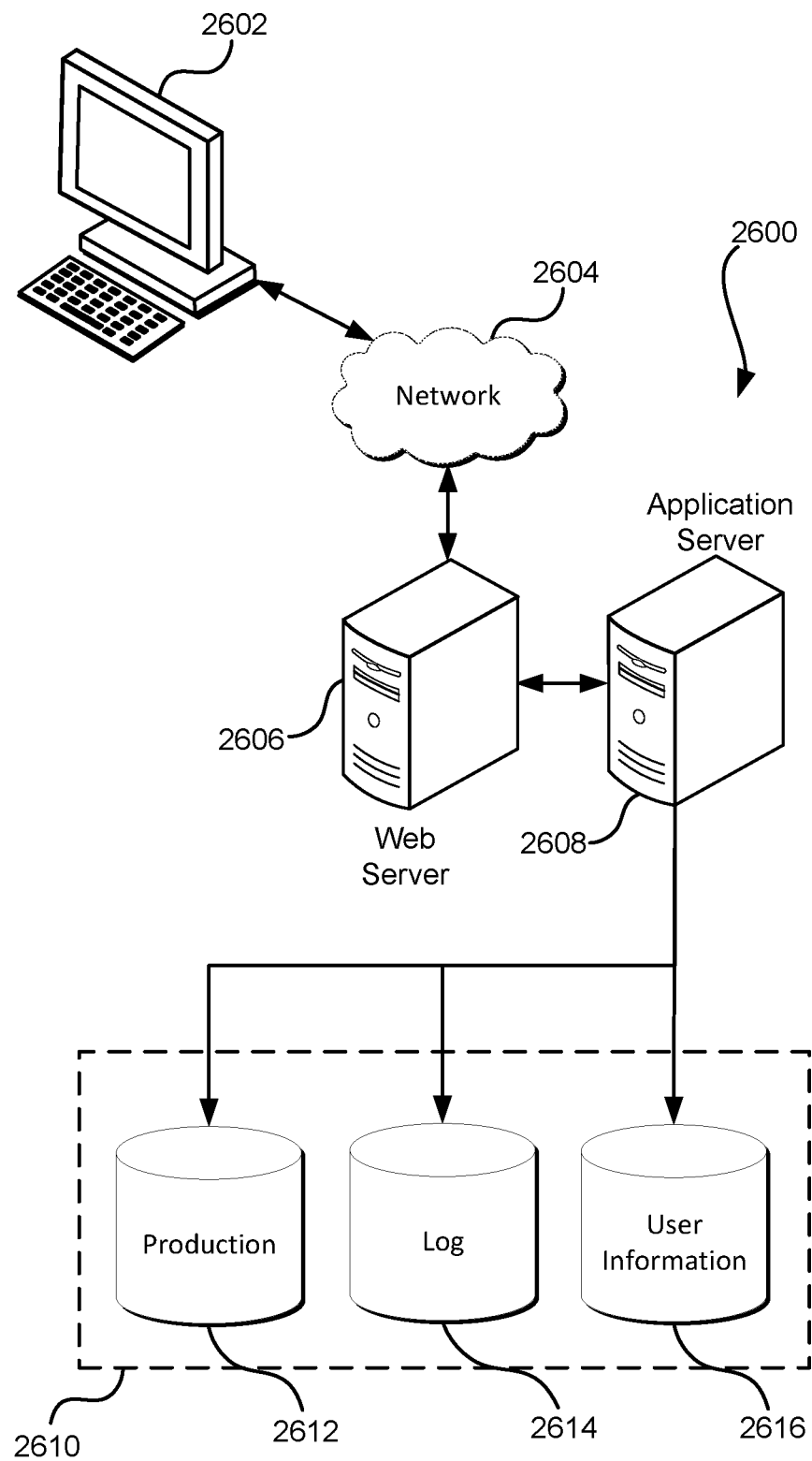

2 implemented and an example flow of information among the various components of the environment in accordance with at least one embodiment;

FIG. 8 shows example steps of an illustrative process for responding to a request to store data, in accordance with at least one embodiment;

FIG. 9 shows an illustrative example of an environment in which various aspects of the present disclosure may be implemented and an example flow of information among the various components of the environment in accordance with at least one embodiment;

FIG. 10 shows example steps of an illustrative process for responding to a request to retrieve data, in accordance with at least one embodiment;

FIG. 11 shows an illustrative example of an environment in which various aspects of the present disclosure may be implemented;

FIG. 12 shows an illustrative example of an environment in which various aspects of the present disclosure may be implemented and an example flow of information among the various components of the environment in accordance with at least one embodiment;

FIG. 13 shows example steps of an illustrative process for responding to a request to retrieve data, in accordance with at least one embodiment;

FIG. 14 shows example steps of an illustrative process for responding to a request to decrypt data, in accordance with at least one embodiment;

FIG. 15 shows example steps of an illustrative process for obtaining decrypted data, in accordance with at least one embodiment;

FIG. 16 shows a diagrammatic representation of an example cryptography service, in accordance with at least one embodiment;

FIG. 17 shows an illustrative example of an environment in which various embodiments may be practiced;

FIG. 18 shows an illustrative example of a representation of a domain token, in accordance with at least one embodiment;

FIG. 19 shows an illustrative example of a process for installing a cryptographic domain in accordance with at least one embodiment;

FIG. 20 shows an illustrative example of a process for ingesting a cryptographic domain in accordance with an embodiment;

FIG. 21 shows an illustrative example of a process for rotating domain keys in accordance with at least one embodiment;

FIG. 22 shows an illustrative example of an environment in which various embodiments may be practiced;

FIG. 23 shows an illustrative example of a process for creating and exposing a key in accordance with at least one embodiment;

FIG. 24 shows an illustrative example of a process for obtaining a session key in accordance with at least one embodiment;

FIG. 25 shows an illustrative example of a process for processing requests using a session key in accordance with at least one embodiment; and FIG. 26 shows an illustrative example of an environment in which various embodiments can be practiced.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein allow for enhanced data security in environments involving distributed computing resources. In one example, a distributed computing environment includes one or more data services which may be implemented by appropriate computing resources. The data services may allow various operations to be performed in connection with data. As one illustrative example, the distributed computing environment includes one or more data storage services. Electronic requests may be transmitted to the data storage service to perform data storage operations. Example operations are operations to store data using the data storage service and using the data storage service to retrieve data stored by the data storage service. Data services, including data storage services, may also perform operations that manipulate data. For example, in some embodiments, a data storage service is able to encrypt data.

Various embodiments of the present disclosure include distributed computing environments that include cryptography services that are implemented using appropriate computing resources. A cryptography service may be implemented by a distributed system that receives and responds to electronic requests to perform cryptographic operations, such as encryption of plaintext and decryption of ciphertext. In some embodiments, a cryptography service manages keys. In response to a request to perform a cryptographic operation, the cryptography service may execute cryptographic operations that use the managed keys. For example, the cryptography service can select an appropriate key to perform the cryptographic operation, perform the cryptographic operation, and provide one or more results of the cryptographic operation in response to the received request. In an alternative configuration, the cryptography service can produce an envelope key (e.g., a session key that is used to encrypt specific data items) and return the envelope key to the system invoking the cryptographic operations of the service. The system can then use the envelope key to perform the cryptographic operation.

In some embodiments, the cryptography service manages keys for multiple tenants of a computing resource service provider. A tenant of the computing resource may be an entity (e.g., organization or individual) operating as a customer of the computing resource service provider. The customer may remotely and programmatically configure and operate resources that are physically hosted by the computing resource service provider. When a customer submits a request to the cryptography service to perform a cryptographic operation (or when an entity submits a request to the cryptography service), the cryptography service may select a key managed by the cryptography service for the customer to perform the cryptographic operation. The keys managed by the cryptography service may be securely managed so that other users and/or data services do not have access to the keys of others. A lack of access by an entity (e.g., user, customer, service) to the key of another entity may mean that the entity does not have an authorized way of obtaining the key of the other and/or that the entity does not have an authorized way of causing a system that manages the key of the other of using the key at the entity's direction. For example, the cryptography service may manage keys so that, for a customer, other customers both do not have access to the customer's key(s) and are unable to cause the cryptography service to use the customer's key(s) to perform cryptographic operations.

As another example, the cryptography service may manage keys so that other services, such as a data storage service, are unable to cause the cryptography service to use some or all keys to perform cryptographic operations. Unauthorized access to a key may be prevented by appropriate security measures so that, for example, unauthorized access is difficult or impossible. Difficulty may be due to computational impracticality and/or due to a need for an unauthorized (e.g., illegal, tortious and/or otherwise disallowed such as a compromise of authorization credentials) to occur for access to be gained. Systems in accordance with the various embodiments may be configured to ensure an objective measure of computational impracticality to gain access to a key. Such measures may be, for example, measured in terms of an amount of time, on average, it would take a computer having a defined unit of computational ability (e.g., certain operations per unit of time) to crack encrypted information needed for authorized access to the key.

As noted, a cryptography service may receive requests from various entities, such as customers of a computing resource service provider. A cryptography service may also receive requests from entities internal to the computing resource service provider. For example, in some embodiments, data services implemented by the computing resource service provider may transmit requests to a cryptography service to cause the cryptography service to perform cryptographic operations. As one example, a customer may transmit a request to a data storage service to store a data object. The request may indicate that the data object should be encrypted when stored. The data storage service may communicate a request to a cryptography service to perform a cryptographic operation. The cryptographic operation may be, for example, encryption of a key used by the data storage service to encrypt the data object. The cryptographic operation may be encryption of the data object itself. The cryptographic operation may be to generate an envelope key that the data storage service can use to encrypt the data object.

Systems in accordance with the various embodiments implement various security measures to provide enhanced data security. For example, in various embodiments, the manner in which a cryptography service can utilize keys it manages is limited. For example, in some embodiments, a cryptography service is configured to only use a key corresponding to a customer upon appropriate authorization. If a request to use a customer's key purportedly originates from the customer (i.e., from a computing device operating on behalf of the customer), the cryptography service may be configured to require that the request be electronically (digitally) signed using appropriate credentials owned by the customer. If the request to use the customer's key originated from another data service, the cryptography service may be configured to require that the data service provide proof that a signed request to the data service has been made by the customer. In some embodiments, for example, the data service is configured to obtain and provide a token that serves as proof of an authenticated customer request. Other security measures may also be built into a configuration of an electronic environment that includes a cryptography service. For example, in some embodiments, a cryptography service is configured to limit key use according to context. As one illustrative example, the cryptography service may be configured to use a key for encryption for requests from a customer or from a data service acting on behalf of the customer. However, the cryptography service may be configured to only use a key for decryption for requests from the customer (but not from another data service). In this manner, if the data service is compromised, the data service would not be able to cause the cryptography service to decrypt data.

Various security measures may be built into a cryptography service and/or its electronic environment. Some security measures may be managed according to policies which, in some embodiments, are configurable. As one example, a cryptography service may utilize an application programming interface (API) that enables users to configure policies on keys. A policy on a key may be information that, when processed by a cryptography service, is determinative of whether the key may be used in certain circumstances. A policy may, for instance, limit identities of users and/or systems able to direct use of the key, limit times when the key can be used, limit data on which the key can be used to perform cryptographic operations on, and provide other limitations. The policies may provide explicit limitations (e.g., who cannot use the keys) and/or may provide explicit authorizations (e.g., who can use the keys). Further, policies may be complexly structured to generally provide conditions for when keys can and cannot be used. When a request to perform a cryptographic operation using a key is received, any policies on the key may be accessed and processed to determine if the request can, according to policy, be fulfilled.

Various embodiments of the present disclosure include techniques for coordinating devices to operate with consistent operational parameters. In some examples, the techniques are used to ensure that a group of security modules comprising a cryptographic domain operate consistently, using the same cryptographic keys and operating within the same parameters for use of the cryptographic keys, such as the same rules on which entities are authorized to cause the performance of cryptographic operations using the keys.

In various embodiments, an operator initiates a process for putting a group of security modules into a consistent state. The operator may, in some embodiments, accomplish this by submitting, to a security module, a request to change one or more parameters for a cryptographic domain. The security module may encode, in a token, the parameters for the cryptographic domain in accordance with the request. The information may be encoded so as to enable the security modules in the group to verify the authenticity of the token and to extract information that has been encrypted so as to prevent unauthorized access to particularly sensitive information in the token, such as one or more cryptographic keys to be stored and used by the security modules.

In some embodiments, security modules do not update their operational logic in accordance with changes to a cryptographic domain encoded in a token until the token has been approved by an entity, which may be referred to as a coordinator, authorized to approve the token. In some embodiments, any security module in the group is operable to generate a token. Accordingly, various techniques may be utilized by the coordinator to ensure that a token generated by a security module and provided for approval does not conflict with another token that was generated by the same or another security module and provided for approval. In various embodiments, security modules provide version numbers for cryptographic domains encoded in tokens. The version number may be based on a current version of a cryptographic domain installed on a security module that generated the token. As an example, if a security module currently operates in accordance with version N of a cryptographic domain, the security module may generate a token that proposes a cryptographic domain with version N+1. In this manner, a coordinator can use the version numbers to avoid installation of conflicting cryptographic domains.

For example, if a token encoding a proposed cryptographic domain with version N+1 is provided to a coordinator for approval, the coordinator can check if another token with version N+1 (or greater) has been used to install an updated cryptographic domain on one or more other security modules. If it has, the coordinator can reject (i.e., not use for updating a cryptographic domain) the new token identifying the version N+1. In this manner, the coordinator prevents two security modules operating with different sets of operational parameters that are identified by the same version. This prevents, for instance, security modules from using different keys when the same key should be used, prevents security modules from enforcing different rules and the like.

When a coordinator receives a token and determines that the token does not present a conflict, the coordinator may use the token to update the cryptographic domain. In an embodiment, the coordinator forwards the token to each security module in the group including, in some embodiments, the security module that generated the token. A security module may receive the token, perform any necessary authentication verification, and update its parameters in accordance with information encoded on the token. The security module can, for instance, update one or more cryptographic keys, can remove itself from the cryptographic domain, can add itself to the cryptographic domain, and/or perform other operations.

Various embodiments of the present disclosure also enable efficient rotation of cryptographic keys in a distributed environment without disruption of operational abilities. In various embodiments, each security module utilizes a cryptographic key, referred to as a domain key, that is common to all the security modules. The security modules may, for instance, use the domain keys to encrypt customer keys (keys of customers of a service provider) so that the customer keys can be securely stored outside of the security modules. When cryptographic operations are requested to be performed using the customer keys as input, a security module may use the domain key to decrypt the customer key, use the decrypted customer key to perform the cryptographic operations, and provide the results of the cryptographic operations which may include ciphertext and/or a digital signature.

To rotate a domain key (which may be referred to as an "old" domain key), in various embodiments, a new domain key may be added to a cryptographic domain, such as by using the process mentioned above and described in more detail below. Customer keys encrypted under the old domain key may be located, accessed, decrypted using the old domain key, encrypted using the new domain key and loaded back into storage. Once it is determined that the customer keys have been reencrypted using the new domain key, a process such as mentioned above and described in more detail below can be used to remove the old domain key from the cryptographic domain. In this manner, during the transition of customer keys from the old domain key to the new domain key, all security modules in the cryptographic domain have access to the old domain key until the customer keys have been transitioned to the new domain key. Similarly, during the transition, all security modules in the cryptographic domain have access to the new domain key to be able to access customer keys that have already transitioned to the new domain key. Variations are also considered as being within the scope of the present disclosure, such as variations where not all security modules in the cryptographic domain have access to the new domain key during the transition of the customer keys to the new domain key, but where customer keys are selectively provided to security modules having an appropriate domain key.

The key rotation techniques also enable useful techniques for electronically shredding customer keys or other data that are encrypted under a domain key. In various embodiments, for instance, customer keys are stored encrypted under a domain key. Customers may cause some or all of their customer keys to be marked for electronic shredding. Customers may, for instance, mark the customer keys through appropriately configured API calls or automatically, such as in accordance with a key rotation schedule, which may be the result of electronic shredding policies that cause the customer keys to be electronically shredded an a time determined by policy, which may be when one or more conditions are satisfied, such as the passage of a certain amount of time. In addition, a service provider may rotate keys automatically and, as a result, rotate customer keys unless customers explicitly request otherwise. When a rotation process for a domain key is performed, customer keys marked for electronic shredding may be excluded from transition to a new domain key. Therefore, the customer keys marked for electronic shredding may remain encrypted under an old domain key while other customer keys are reencrypted to the new domain key. In this manner, when the security modules (and any other device(s) with access) lose access to the old domain key, such as through a process mentioned above and discussed in more detail below, the ability to decrypt the customer keys encrypted under the old domain key is lost. In this manner, customers can be ensured that the customer keys encrypted under the old domain key cannot practically be recovered and used for unauthorized purposes.

Various embodiments of the present disclosure also enable for efficient and secure communications with security modules and other devices through the use of session keys. For example, an operator may perform a negotiation with a security module that results in the security module providing, over a secure channel, the operator a session key in plaintext form and encrypted under a domain key used by other security modules. The operator may use the session key to encrypt and sign requests that are submitted to any security module having the domain key under which the session key is encrypted. The operator may, for instance, provide any security module (having the domain key) the request, a digital signature generated based at least in part on the request and the session key, and the encrypted session key.

The security module can then use its copy of the domain key to decrypt the session key and use the decrypted session key to validate the request. In this manner, any security module having access to the domain key is able to validate the request and respond accordingly (e.g., by fulfilling or denying the request). Use of the session key to validate the requests can be computationally less expensive than establishing the secure channel over which the session key is provided to the operator by the security module. Thus, an operator is able to perform a relatively computationally expensive negotiation to obtain a session key that is computationally easier to use to authenticate to multiple security modules.

Figure 1:
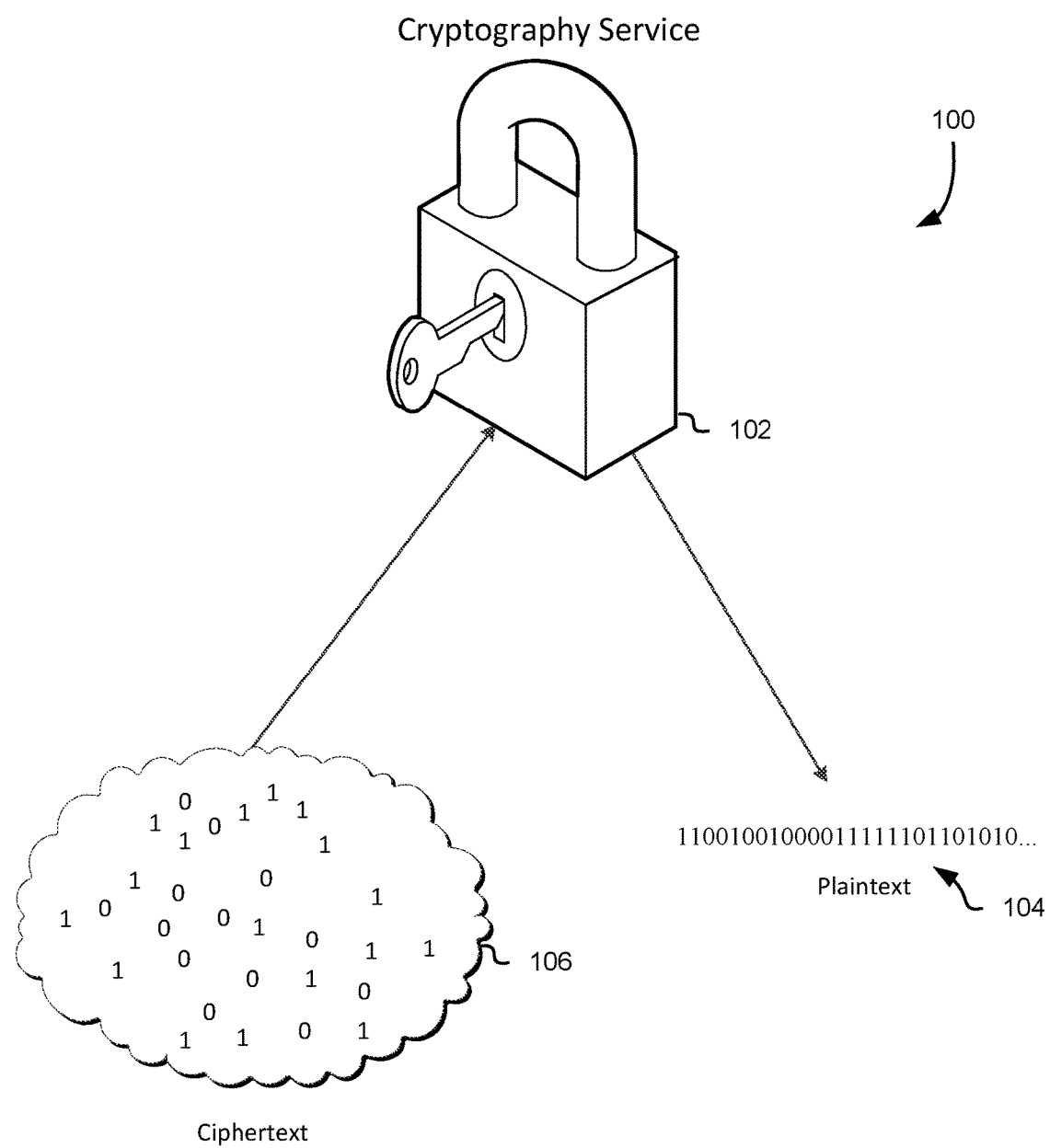
FIG. 1 shows an illustrative diagram representing various aspects of the present disclosure in accordance with various embodiments.

FIG. 1 is an illustrative diagram 100 demonstrating various embodiments of the present disclosure. In an embodiment, a cryptography service 102 performs cryptographic operations which may include application of one or more calculations in accordance with one or more cryptographic algorithms. As illustrated in FIG. 1, the cryptography service enables a user or a service to generate plaintext 104 from ciphertext 106. In an example configuration the cryptographic service can be used to encrypt/decrypt keys and these keys can be used to encrypt/decrypt data, such as data stored in a data storage service. For example, the cryptography service receives a request to generate plaintext from ciphertext encrypted under a key. The cryptography service determines that the requestor is an authorized entity; decrypts the key using a master key and returns the now decrypted key to the service, which can generate plaintext from the ciphertext using the decrypted key. In another configuration, the cryptography service receives ciphertext and processes the received ciphertext into plaintext which is provided as a service by the cryptography service. In this example, the ciphertext may be provided to the cryptography service as part of an electronic request to the cryptography service from an authorized entity, which may be a customer of a computing resource service provider that operates the cryptography service and/or which may be another service of the computing resource service provider. The cryptography service illustrated in FIG. 1 may utilize one or more cryptographically strong algorithms to encrypt data. Such cryptographically strong algorithms may include, for example, Advanced Encryption Standard (AES), Blowfish, Data Encryption Standard (DES), Triple DES, Serpent or Twofish, and depending on the specific implementation selected, may be either asymmetric or symmetric key systems. Generally, the cryptography service may utilize any encryption and/or decryption algorithm (cipher) or combination of algorithms that utilizes data managed by the cryptography service.

As will be discussed below in more detail, the cryptography service can be implemented in a variety of ways. In an embodiment, the cryptography service is implemented by a computer system configured in accordance with the description below. The computer system may itself comprise one or more computer systems. For example, a cryptography service may be implemented as a network of computer systems collectively configured to perform cryptographic operations in accordance with the various embodiments. Or put another way, the computer system could be a distributed system. In an embodiment, ciphertext is information that has been encrypted using a cryptographic algorithm. In the example of FIG. 1, the ciphertext is the plaintext in an encrypted form. The plaintext may be any information and while the name includes no word text, plaintext and ciphertext may be information encoded in any suitable form and does not necessarily include textual information but it may include textual information. For example, as illustrated in FIG. 1, plan text and ciphertext comprise sequences of bits. Plaintext and ciphertext may also be represented in other ways and generally in any manner by which encryption and decryption can be performed by a computer system.

Figure 2:
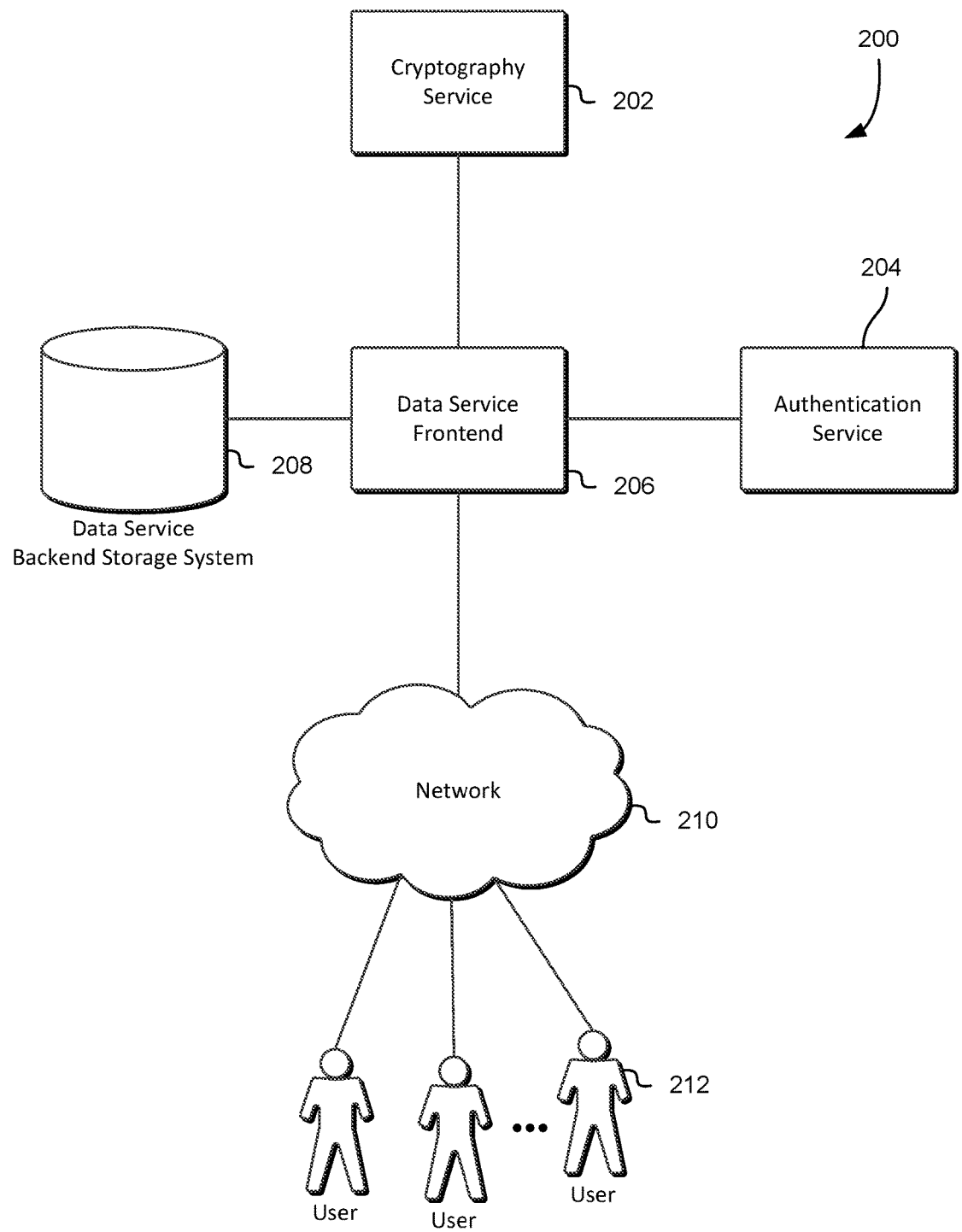
FIG. 2 shows an illustrative example of an environment in which various aspects of the present disclosure may be implemented.

FIG. 2 shows an illustrative example of an environment 200 in which a cryptography service 202, such as illustrated in FIG. 1, may be implemented. In the environment of 200, various components operate together in order to provide secure data related services. In this particular example, the environment 200 includes a cryptography service 202, an authentication service 204, a data service frontend 206 and a data service backend storage system 208. In an embodiment, the cryptography service is configured in the environment 200 to perform cryptographic operations, such as by receiving plaintext from a data service frontend and providing ciphertext in return or providing envelope keys to services, so that the services can use the envelope keys to perform encryption operations. The cryptography service may perform additional functions, such as described below, such as secure storage of keys for performance of cryptographic operations, such as converting plaintext into ciphertext and decrypting ciphertext into plaintext. The cryptography service may also perform operations involved in policy enforcement, such as by enforcing policy associated with keys stored therein. Example policies that may be enforced by a cryptography service are provided below. The data service frontend in an embodiment is a system configured to receive and respond to requests transmitted over a network 210 from various users 212. The requests may be requests to perform operations in connection with data stored or to be stored in the data service backend storage system 208. In the environment 200, the authentication service, cryptography service, data service frontend and data service backend storage system may be systems of a computing resource service provider that utilizes the systems to provide services to customers represented by the users illustrated in FIG. 2. The network illustrated in FIG. 2 may be any suitable network or combination of networks, including those discussed below.

The authentication service in an embodiment is a computer system configured to perform operations involved in authentication of the users. For instance, the data service frontend may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages transmitted to the data service frontend. Electronic signatures may be generated using secret information (e.g., a private key of a key pair associated with a user) that is available to both an authenticating entity (e.g., user) and the authentication service. The request and signatures for the request may be provided to the authentication service which may, using the secret information, compute a reference signature for comparison with the received signature to determine whether the request is authentic. If the request is authentic, the authentication service may provide information that the data service frontend can use to prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The data service backend storage system in an embodiment is a computer system that stores data in accordance with requests received through the data service frontend. As discussed in more detail below, the data service backend storage system may store data in encrypted form. Data in the data service backend storage system may also be stored in unencrypted form. In some embodiments, an API implemented by the data service frontend allows requests to specify whether data to be stored in the data service backend storage system should be encrypted. Data that is encrypted and stored in the data service backend storage system may be encrypted in various ways in accordance with the various embodiments. For example, in various embodiments, data is encrypted using keys accessible to the cryptography service, but inaccessible to some or all other systems of the environment 200. Data may be encoded by the cryptography service for storage in the data service backend storage system and/or, in some embodiments, data may be encrypted by another system, such as a user system or a system of the data service frontend, using a key that was decrypted by the cryptography service. Examples of various ways by which the environment 200 may operate to encrypt data are provided below.

Numerous variations of the environment 200 (and other environments described herein) are considered as being within the scope of the present disclosure. For example, the environment 200 may include additional services that may communicate with the cryptography service and/or authentication service. For example, the environment 200 may include additional data storage services (which may each comprise a frontend system and a backend system) which may store data in different ways. For instance, one data storage service may provide active access to data where the data storage service performs data storage services in a synchronous manner (e.g., a request to retrieve data may receive a synchronous response with the retrieved data). Another data storage service may provide archival data storage services. Such an archival data storage service may utilize asynchronous request processing. For example, a request to retrieve data may not receive a synchronous response that includes the retrieved data. Rather, the archival data storage service may require a second request to be submitted to obtain the retrieved data once the archival data storage service is ready to provide the retrieved data. As another example, the environment 200 may include a metering service which receives information from the cryptography service (and/or other services) and uses that information to produce accounting records. The accounting records may be used to bill customers for usage of the cryptography service (and/or other services). Further, information from the cryptography service may provide an indication of how charges should be incurred. For instance, in some instances customers may be provided bills for use of the cryptography service. In other instances, charges for use of the cryptography service may be rolled into usage charges of other services, such as a data service that utilizes the cryptography service as part of its operations. Usage may be metered and billed in various ways, such as per operation, per period of time, and/or in other ways. Other data services may also be included in the environment 200 (or other environments described herein).

In addition, FIG. 2 depicts users interacting with the data service frontend. It should be understood that users may interact with the data service frontend through user devices (e.g., computers) which are not illustrated in the figure.

Further, the users depicted in FIG. 2 (and elsewhere in the figures) may also represent non-human entities. For example, automated processes executing on computer systems may interact with the data service frontend as described herein. As one illustrative example, an entity represented by a user in FIG. 2 may be a server that, as part of its operations, uses the data service frontend to store and/or retrieve data to/from the data service backend storage system. As yet another example, an entity represented by a user in FIG. 2 may be an entity provided as a service of a computing resource service provider that operates one or more of the services in FIG. 2. For instance, a user in FIG. 2 may represent a virtual or other computer system of a program execution service offered by the computing resource service provider. Other variations, including variations of other environments described below, are also considered as being within the scope of the present disclosure.

Figure 3:
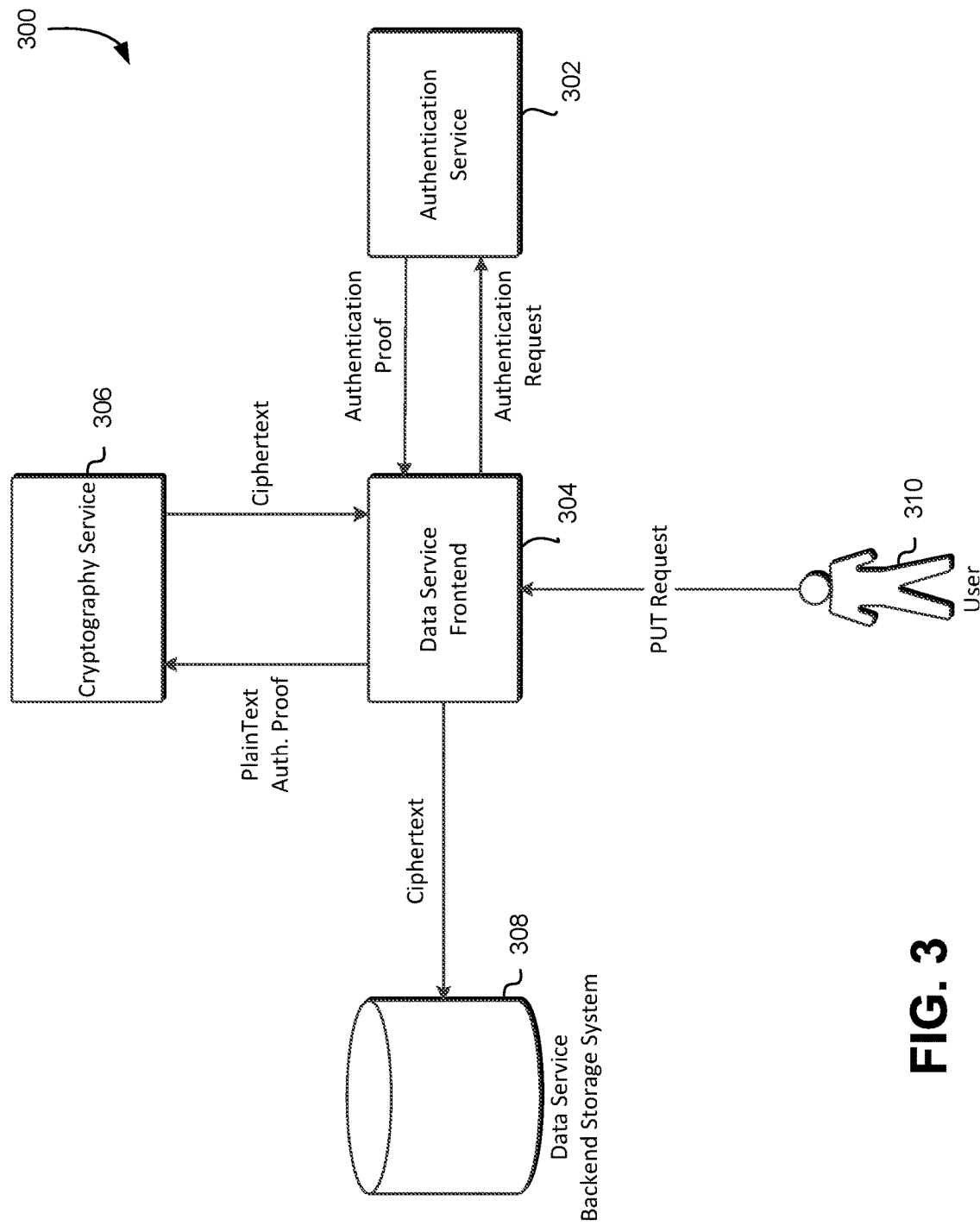
FIG. 3 shows an illustrative example of an environment in which various aspects of the present disclosure may be implemented and an example flow of information among the various components of the environment in accordance with at least one embodiment.

For example, FIG. 3 shows an illustrative example of an environment 300 in which various embodiments of the present disclosure may be implemented. As with FIG. 2, the environment in FIG. 3 includes an authentication service 302, a data service frontend 304 system (data service front end), a cryptography service 306 and a data service backend storage system 308. The authentication service, data service frontend, cryptography service and data service backend storage system may be configured such as described above in connection with FIG. 2. For example, users 310 may access the data service frontend through a suitable communications network, although such network is not illustrated in the figure. In the environment 300 illustrated in FIG. 3, arrows representing a flow of information are provided. In this example, a user transmits a PUT request to the data service frontend. The PUT request may be a request to store specified data in the data service backend storage system. In response to the PUT request, the data service frontend may determine whether the PUT request is authentic, that is if the user has submitted the request in the manner the requested operation can be performed in accordance with authentication policy implemented by the system.

In FIG. 3, an illustrative example of how such authentication decisions may be made is illustrated. In this particular example, the data service frontend submits an authentication request to the authentication service. The authentication service may use the authentication request to determine if the PUT request from the user is authentic. If the request is authentic, the authentication service may provide authentication proof to the data service frontend. The authentication proof may be an electronic token or other information that is usable by another service, such as the cryptography service, to independently determine that an authentic request was received. In one illustrative example, the PUT request is transmitted with a signature for the PUT request. The PUT request and its signature are provided through the authentication service, which independently computes what a signature should be if authentic. If the signature generated by the authentication service matches that signature provided by the user, the authentication service may determine that the PUT request was authentic and may provide authentication proof in response. Determining whether the PUT request is authentic may also include one or more operations in connection with the enforcement of policy. For example, if the signature is valid but policy otherwise indicates that the PUT request should not be completed (e.g., the request was submitted during a time disallowed by policy), the authentication service may provide information indicating that the request is not authentic. (It should be noted, however, that such policy enforcement may be performed by other components of the environment 300.) The authentication service may generate the signature, such as by using a key shared by the authentication service and the user. The authentication proof, as noted, may be information from which another service, such as the cryptography service, can independently verify that a request is authentic. For example, using the example of the cryptography service illustrated in FIG. 3, the authentication proof may be generated based at least in part on a key shared by both the authentication service and the cryptography service, such as a key that is inaccessible to other services.

As illustrated in FIG. 3, the data service frontend, upon receipt of authentication proof from the authentication service, provides plaintext and authentication proof to the cryptography service. The plaintext and authentication proof may be provided according to an API call or other electronic request to the cryptography service (e.g., an Encrypt API call). The cryptography service may analyze the authentication proof to determine whether to encrypt the plaintext.

It should be noted that additional information may be provided to the cryptography service. For example, an identifier of a key to be used to encrypt the plaintext may be provided as an input parameter to the API call from the data service frontend (which, in turn, may have received the identifier from the user). However, it should be noted that an identifier may not be transmitted to the cryptography service. For instance, in various embodiments, it may be otherwise determinable which key to use to encrypt the plaintext. For example, information transmitted from the data service frontend to the cryptography service may include information associated with the user, such as an identifier of the user and/or an organization associated with the user, such as an identifier of a customer on behalf of which the user has submitted the PUT request. Such information may be used by the cryptography service to determine a default key to be used. In other words, the key may be implicitly specified by information that is usable to determine the key. Generally, determination of the key to be used may be performed in any suitable manner. Further, in some embodiments, the cryptography service may generate or select a key and provide an identifier of the generated or selected key to be used later. Another example API parameter can be an identifier for a master key for the customer account the encryption operation is being performed for.

As illustrated in FIG. 3, if the authentication proof is sufficient to the cryptography service for the plaintext to be encrypted, the cryptography service can perform one or more cryptographic operations. In an embodiment, the one or more cryptographic operations can include an operation to generate an envelope key to be used to encrypt the plaintext. The envelope key can be a randomly generated symmetric key or a private key of a key pair. After the envelope key is generated, the cryptographic service can encrypt the envelope key with the master key specified in the API call and cause the encrypted envelope key to be persistently stored (e.g., by storing the encrypted key in a storage service or some other durable storage) or discarded. In addition, the cryptographic service can send a plaintext version of the envelope key as well as and the encrypted envelope key to the data service frontend. The data service can then use the plaintext version of the envelope key to encrypt the plaintext (i.e., the data associated with the encryption request) and cause the envelope key to be stored in persistent storage in association with an identifier for the master key used to encrypt the envelope key. In addition, the data service can discard the plaintext version of the envelope key. As such, in an embodiment after the data service discards the plaintext version of the envelope key it will no longer be able to decrypt the ciphertext.

In an alternative embodiment, the cryptographic operation can involve encrypting the plaintext. For example, the cryptographic service encrypts the plaintext and provides ciphertext to the data service frontend storage system. The data service frontend may then provide the ciphertext to the data service backend storage system for persistent storage in accordance with its operation. Other information may also be transmitted from the data service frontend to the data service backend storage system. For example, an identifier of the key used to encrypt the plaintext to generate ciphertext may be provided with the ciphertext for storage by the data service backend storage system. Other information, such as metadata identifying the user and/or the user's organization, may also be provided.

As with all environments described herein, numerous variations are considered as being within the scope of the present disclosure. For example, the flow of information among the various components of the environment 300 may vary from that which is shown. For example, information flowing from one component to another component through an intermediate component (e.g. data from the authentication service to the cryptography service and/or data from the cryptography service to the data service backend storage system) may be provided directly to its destination and/or through other intermediate components of the environment 300 (which are not necessarily included in the figure). As another example, PUT requests (and, below, GET requests) are provided for the purpose of illustration. However, any suitable request for performing the operations described may be used.

Figure 4:
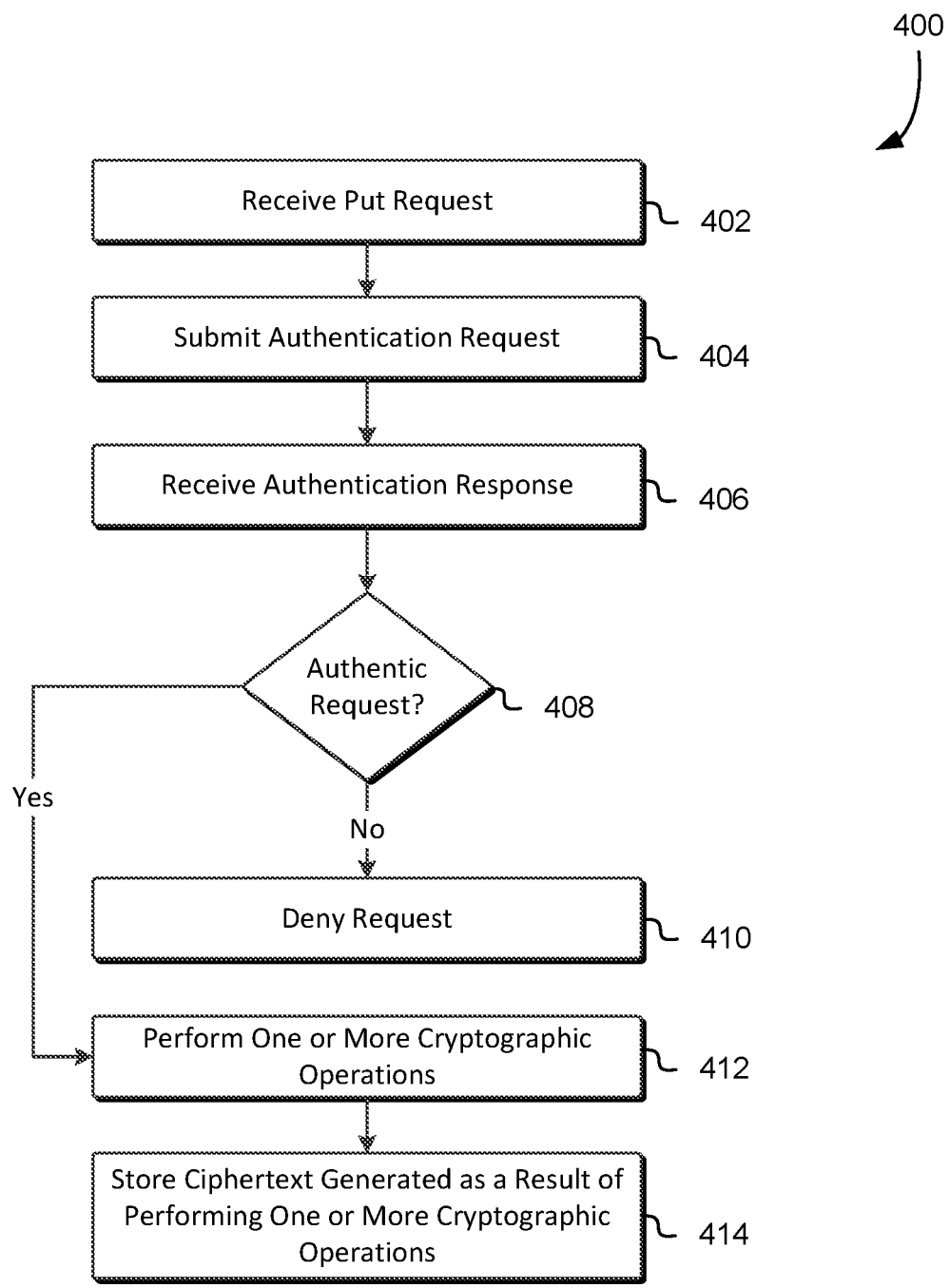
FIG. 4 shows example steps of an illustrative process for storing ciphertext, in accordance with at least one embodiment.

FIG. 4 shows an illustrative example of a process 400 which may be used to store data in a data storage service in accordance with an embodiment. The process 400 may be performed, for example, by the data service frontend illustrated in FIG. 3. Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

As illustrated in FIG. 4, the process 400 includes receiving 402 a PUT request. The PUT request may be electronically received over a network and may include information associated with the request, such as information required for authentication, such as an electronic signature of the PUT request. In response to having received the PUT request, the process 400 may include submitting 404 an authentication request. For example, the system performed in the process 400 may submit (e.g., via an appropriately configured API call) an authentication request to a separate authentication service, such as described above in connection with FIG. 3. Similarly, a data service frontend that performs its own authentication may submit the authentication request to an authentication module implemented by the data service frontend. Generally, the authentication request may be submitted in any suitable manner in accordance with the various embodiments.

Upon submission of the authentication request, an authentication response is received 406 by the entity to which the authentication request was submitted 404. For example, referring to FIG. 3, the authentication service may provide a response to the data service frontend that includes proof of the authentication for use by other services. Other information, such as an indication of whether or not authentication was successful, may also be transmitted. A determination may be made 408 whether the request is authentic. Authenticity of the request may depend from one or more factors checked by an entity, such as by an authentication service, or a combination of entities that collectively perform such checks. Authenticity may, for example, require that the request provide necessary valid credentials (e.g., an electronic signature generated by a secret key shared by the checking entity) and/or that policy allows the request to be fulfilled. From the perspective of a system that submits 404 an authentication request and receives an authentication response, authenticity may depend from the received authentication response. Accordingly, in an embodiment, the determination 408 whether the request is authentic may be performed based at least in part of the received authentication response. For example, if authentication was not authentic, the authentication response so indicates and the determination 408 may be made accordingly. Similarly, the response may implicitly indicate that the authentication request is authentic, such as by not including information that would be included if the request was authentic. If it is determined 408 that the PUT request is not authentic, then the PUT request may be denied 410. Denying the PUT request may be performed in any suitable manner and may depend upon the various embodiments in which the process 400 is being performed. For example, denying 410, the PUT request may include transmitting a message to a user that submitted the PUT request. The message may indicate that the request was denied. Denying the request may also include providing information about why the request was denied, such as an electronic signature not being correct or other reasons that may be used for determining how to resolve any issues that resulted in the PUT request not being authentic or authorized.

If it is determined 408 that the PUT request is authentic and authorized, then, in an embodiment, the process 400 includes performing 412 one or more cryptographic operations that result in the plaintext being encrypted. For example, a request (e.g., an appropriately configured API call) may be submitted to a cryptography service to provide a key to be used for performing the one or more cryptographic operations. The request provided to the cryptography service may be provided with proof of the PUT request being authentic so that the cryptography service can independently determine whether to perform the cryptographic operation (e.g., to encrypt the plaintext and provide ciphertext or generate an envelope key that can be used to encrypt the plaintext). However, in various embodiments, authentication proof may not be provided to the cryptography service and, for example, the cryptography service may operate in accordance with the request that it receives. For example, if the cryptography service receives a request from the data service frontend, the cryptography service may rely on the fact that the data service frontend has already independently verified authentication of the request. In such an embodiment and other embodiments, the data service frontend may authenticate itself with the cryptography service to provide an additional layer of security. The cryptography service may generate or otherwise obtain a key, encrypt the obtained key or otherwise obtain the encrypted key (e.g., from memory), and provide the obtained key and the encrypted obtained key in response to the request. The obtained key may be encrypted using a key identified in the request to the cryptography service. The obtained key may be used to encrypt the plaintext and, after encrypting the plaintext, the obtained key may be discarded (e.g., irrevocably removed from memory). In alternate embodiment, a system performing the process 400 may generate or otherwise obtain the key used to perform the one or more cryptographic operations, provide the obtained key to the cryptography service to be encrypted.

In some embodiments, performing the one or more cryptographic operations may result in ciphertext being generated. Ciphertext generated as a result of one or more cryptographic operations may be stored 414 for possible retrieval at a later time. As noted above, storage of the ciphertext may include storage of additional information that would enable the decryption of the ciphertext at later time. For instance, the ciphertext may be stored with an identifier of a key used to encrypt the plaintext into the ciphertext so that the key having that identifier may later be used to decrypt the ciphertext to obtain the plaintext. Storage of the ciphertext may also be performed in any suitable manner. For example, storage of the ciphertext may be performed by a data service backend storage system, such as described above.

Figure 5:
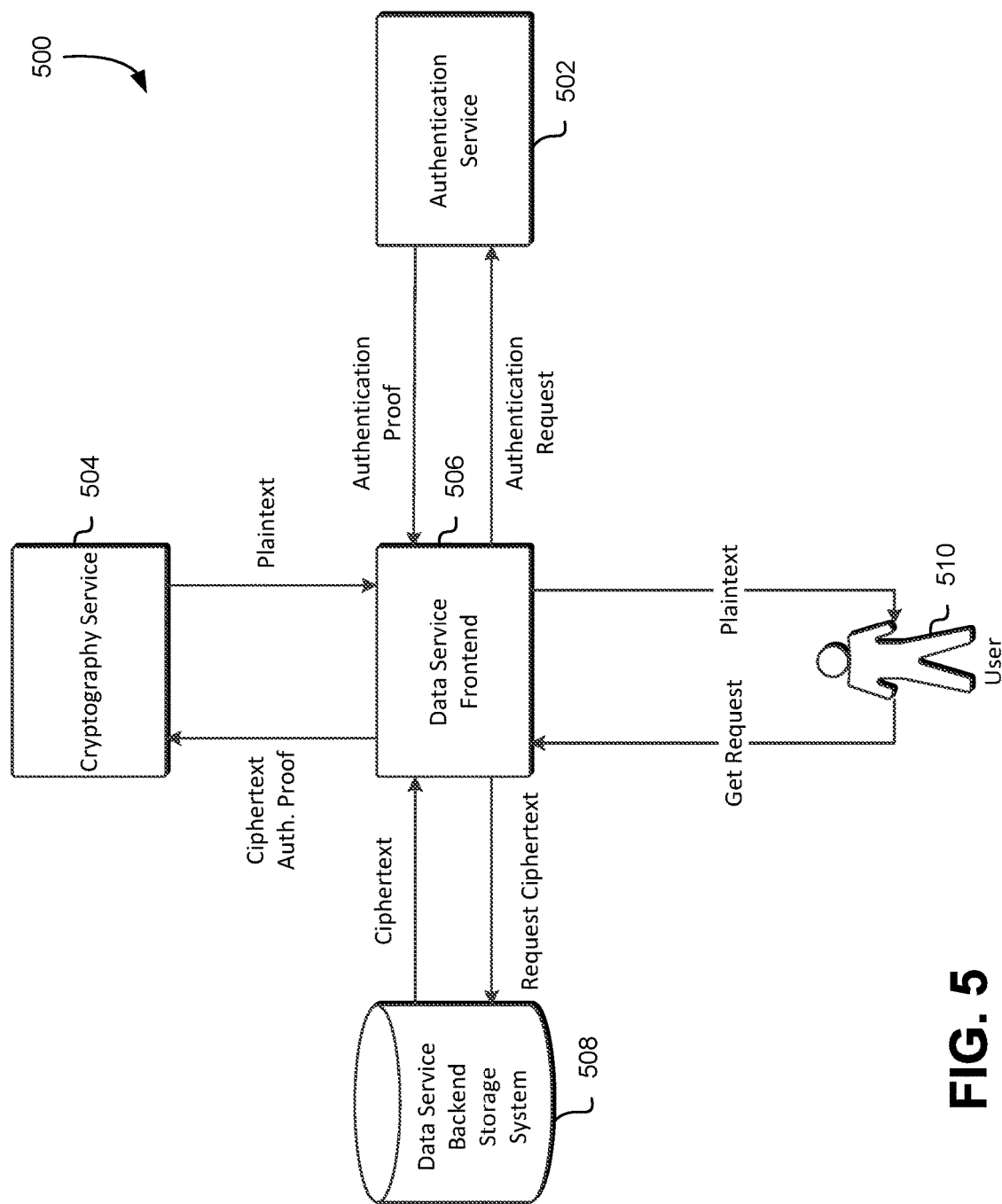
FIG. 5 shows an illustrative example of an environment in which various aspects of the present disclosure may be implemented and an example flow of information among the various components of the environment in accordance with at least one embodiment.

FIG. 5, accordingly, shows an illustrative example of an environment 500 and the flow of information illustrating how plaintext may be obtained. The environment 500 in this example includes an authentication service 502, a cryptography service 504, a data service frontend 506 and a data service backend storage system 508. The authentication service, cryptography service, data service frontend and a data service backend storage system may be systems such as described above. As illustrated in FIG. 5, the data service frontend is configured to receive a GET request from a user 510 and provide plaintext in response. In order to do this, the data service frontend may also be configured to submit authentication requests to an authentication service which itself may be configured to, if appropriate, provide to the data service frontend authentication proof. The data service frontend may also be configured to send a request to the cryptographic service to cause it to execute one or more cryptographic operations related to decrypting the data. In an embodiment where envelope keys are used, the data service can submit a request (e.g., an API call) to the cryptographic service that includes or specifies the encrypted envelope key (or an identifier for the encrypted envelope key) authentication proof, and an identifier of the master key used to encrypt the envelope key to the cryptographic service. The cryptographic service can determine whether the authentication proof is sufficient to allow the operation and, if the authentication proof is sufficient, decrypt the envelope key. The decrypted envelope key can be sent back to the data service, which can use the key to decrypt the encrypted plaintext. The data service can then discard the decrypted plaintext key.

In an alternative embodiment, the data service frontend may be configured to provide the received authentication proof to the cryptography service with ciphertext for the cryptography service to decrypt. The cryptography service may, accordingly, be configured to determine whether the authentication proof is sufficient to allow decryption of the ciphertext and, if the authentication proof is sufficient, decrypt the ciphertext using an appropriate key (which may be identified to the cryptography service by the data service frontend), and provide the decrypted ciphertext (plaintext) to the data service frontend. To provide ciphertext to the cryptography service, the data service frontend may be configured to obtain (e.g., via an appropriately configured API call) the ciphertext from the data service backend storage system.

Figure 6:
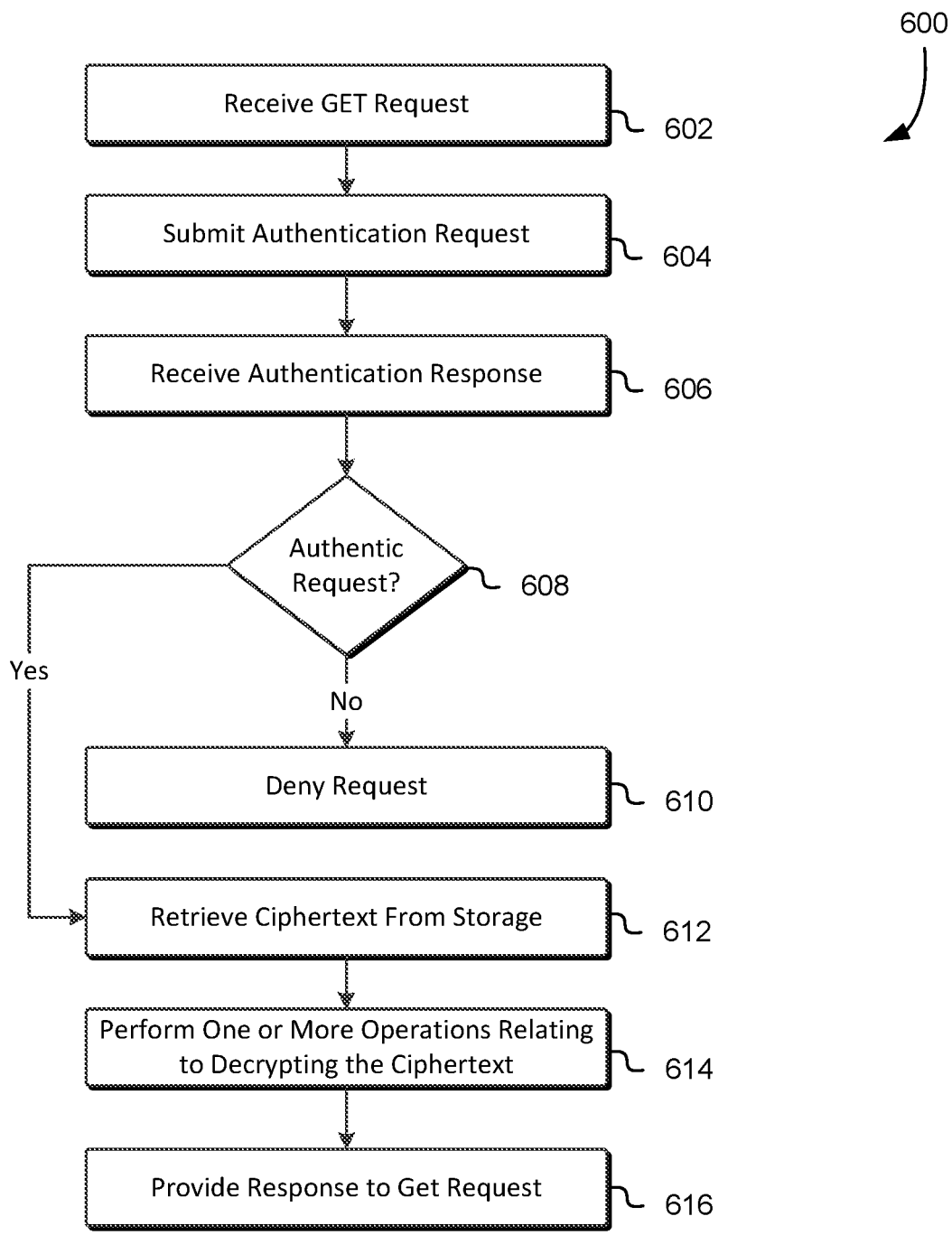
FIG. 6 shows example steps of an illustrative process for responding to a request to retrieve data, in accordance with at least one embodiment.

FIG. 6 shows an illustrative example of a process 600 which may be used to obtain plaintext in accordance with various embodiments. The process 600 may be performed, for example, by the data service frontend system (data service frontend) illustrated above in connection FIG. 5, although the process 600 and variations thereof may be performed by any suitable system. In an embodiment, the process 600 includes receiving 602 a GET request (or other appropriate request) from a user. Receiving the GET request may be performed such as described above in connection with other types of requests. Upon receipt 602 of the GET request, an authentication request may be submitted 604 to an authentication service or in any manner such as described above. An authentication response may, accordingly, be received. Based at least in part on the receive authentication response, a determination may be made 608 whether the GET request is authentic. If it is determined 608 that the GET request is not authentic, the process 600 may include denying 610 the request which, as described above, may be performed in various manners in accordance with the various embodiments.

If it is determined 608 that the GET request is authentic, the process 600 may include retrieving ciphertext from storage. Retrieving 612 ciphertext from storage may be performed in any suitable manner. For example, referring to the environment 500 discussed above in connection with FIG. 5, the data service frontend may submit a request for the ciphertext to the data service backend storage system and may receive the ciphertext in response. Generally, ciphertext may be obtained from storage in any suitable manner. Upon receipt of the ciphertext, the process 600 may include performing 614 one or more operations relating to decrypting the ciphertext. For example, in an embodiment, the data storage service may send a request to the cryptographic service to perform one or more cryptographic operations relating to decrypting the ciphertext 614. In one example configuration, the data service can send the cryptographic service an API call that includes the encrypted envelope key (or an identifier for the encrypted envelope key) authentication proof, and an identifier of the master key used to encrypt the envelope key to the cryptographic service. The cryptographic service can determine whether the authentication proof is sufficient to allow the operation and, if the authentication proof is sufficient, decrypt the envelope key. The decrypted envelope key can be sent back to the data service, which can use the key to decrypt the encrypted plaintext.

In another configuration, the ciphertext may be provided to a cryptography service such as the cryptography service described above in connection with FIG. 5. Other information may also be provided to the cryptography service such as proof of authentication that can be used by the cryptography service to determine whether or not to decrypt the ciphertext. In addition, in some embodiments, an identifier of a key to be used by the cryptography service to decrypt the ciphertext may be provided to the cryptography service. However, in other embodiments, the key may be implicitly indicated to the cryptography service. For example, the cryptography service may use a default key associated with a customer that is indicated to the cryptography service. Generally, any manner by which the cryptography service can determine which key to use to decrypt the ciphertext may be used.

As illustrated in FIG. 6, after the ciphertext is decrypted, the process 600 may include providing 616 a response to the GET request. Providing a response to the GET request may be performed in various ways in accordance with the various embodiments. For example, providing the response to the GET request may include providing the plaintext. In other embodiments, the plaintext may be a key that is used to decrypt other encrypted information which is then provided in response to the GET request. Generally, depending on the role of the plaintext in a particular embodiment of the disclosure, providing a response to the GET request may be performed in various ways.

Figure 7:
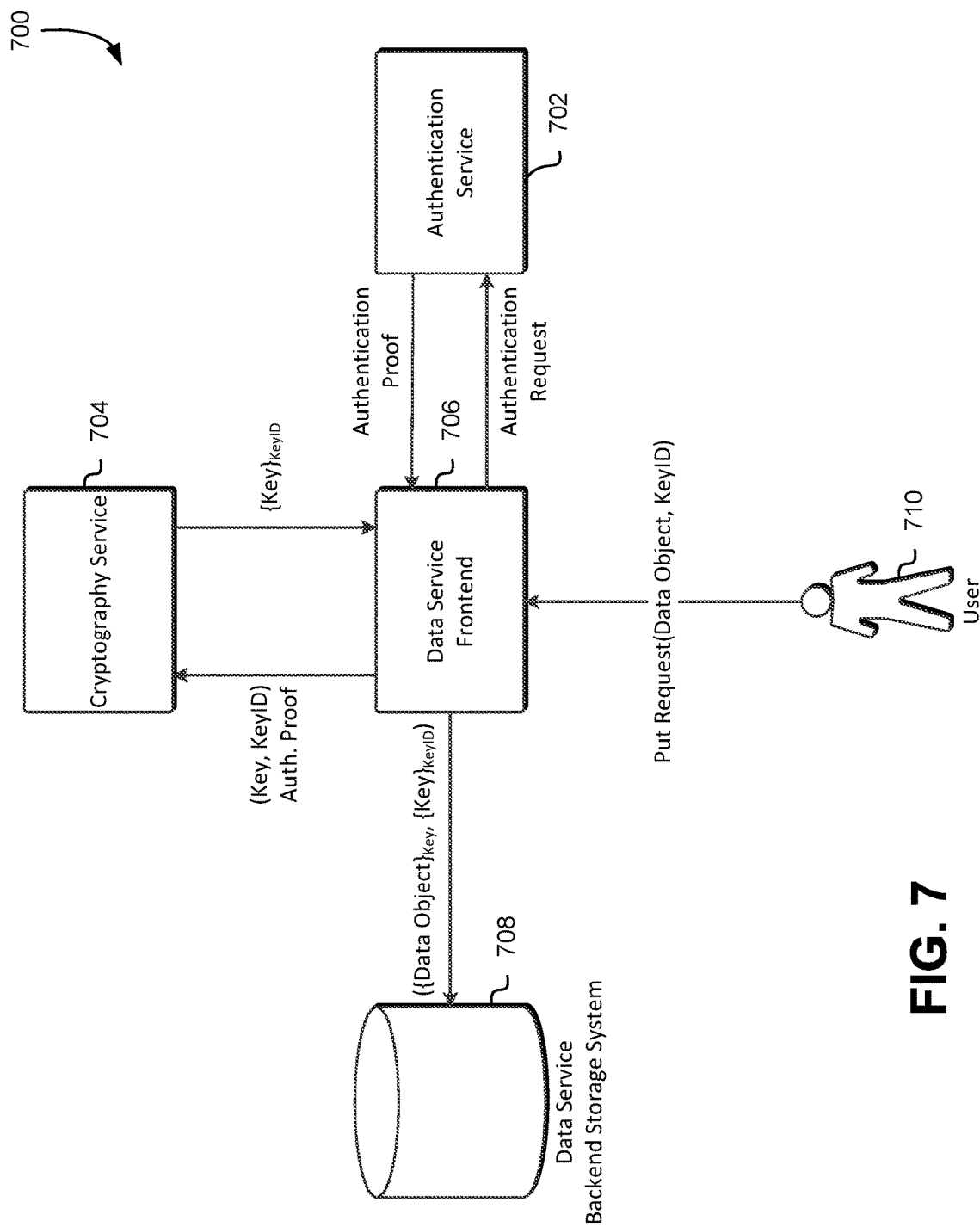
FIG. 7 shows an illustrative example of an environment in which various aspects of the present disclosure may be

As noted, various embodiments of the present disclosure allow for data to be stored by a data storage service in various ways. FIG. 7 shows an illustrative example of an environment 700 with arrows indicating information flow in accordance with such embodiment. As illustrated in FIG. 7, environment 700 includes an authentication service 702, a cryptography service 704, a data service frontend 706 and a data service backend storage system 708, such as described above. In this particular example, the data service frontend is a computer system configured to receive PUT requests from various users 710. PUT requests may include or specify data objects to be stored by a data service backend storage system. PUT requests may also specify a key identifier for a key to be used to encrypt the data object. The data service frontend may also be configured to interact with an authentication service, such as described above, in order to provide authentication proof to a cryptography service that is operable to receive keys and key identifiers and provide in response keys encrypted by the keys identified by the key identifiers. The data service frontend may then cause storage in a data service backend storage system. The data that may be stored may include a data object encrypted by the key. The data that may be stored may also include the key encrypted by the key identified by the key identifier. As discussed elsewhere, herein, the encrypted data object and encrypted key may be stored in different services.

As illustrated in FIG. 7, the data service frontend is configured to provide encrypted information to the data service backend storage system for storage. In this example, the data service frontend is configured to provide a data object encrypted under a key and the key encrypted under another key having a KeyID. It should be noted that, for the purpose of illustration, curly bracket notation is used to denote encryption. In particular, information inside of curly brackets is the information that is encrypted under a key specified in subscript. For example, {Data Object}$_{Key}$ denotes that the data "Data Object" is encrypted under the key "Key." It should be noted that a key identifier may also appear in subscript using this curly bracket notation. When a key identifier appears in subscript, the information inside the curly brackets is encrypted under a key identified by the key identifier. For example, {Data Object}$_{KeyID}$ denotes that the data object "Data Object" is encrypted under a key identified by the key identifier "KeyID." Similarly, {Key}$_{KeyID}$ denotes that the key "Key" is encrypted under the key identified by the key identifier "KeyID." In other words, this disclosure makes use of both keys and key identifiers in subscript and the meaning of the subscript should be clear from context. The ciphertext may include additional metadata usable to determine the identity of the associated decryption key.

FIG. 8 shows an illustrative example of a process 800 which may be performed to store a data object in a data storage system, such as the data service backend storage system described above in connection with FIG. 7. The process 800 may be performed by any suitable system, such as by the data service frontend system described above in connection with FIG. 7. In an embodiment, the process 800 includes receiving 802 a PUT request for a data object. Receiving the PUT request for the data object may be performed in any suitable manner, such as described above. It should be noted that the data object can be received in connection with the request or may be received from another service. For example, the request may include an identifier for a data object that may be obtained from another service using the identifier. As with other processes described above, the process 800 in an embodiment includes submitting 804 an authentication request and receiving 806 an authentication response. The authentication response that was received 806 may be used to determine 808 whether the PUT request is an authentic request. If it is determined 808 that the PUT request is not authentic, the process 800 may include denying 810 the request such as described above. If it is determined 808 that the PUT request is authentic, the process 800 may include obtaining 812 a key identifier (KeyID), such as a keyID for a master key used to encrypt envelope keys. Obtaining 812 the KeyID may be performed in any suitable manner and the manner in which the KeyID is obtained may vary in accordance with the various embodiments. For example, as illustrated in FIG. 7, the PUT request may specify the KeyID. As another example, the identity of the user, or otherwise associated with the user, may be used to obtain an identifier or a default key. As another example, the ciphertext may provide an indication of the associated key ID. As yet another example, one or more policy determinations may be used to determine which key identifier to obtain.

In an embodiment, the process 800 also includes generating 814 a key, such as an envelope key. Generating the key may be performed in any suitable manner by, for example, the cryptographic service or the service requesting encryption operations from the cryptographic service (e.g., a data storage service). For example, the key may be generated using a key derivation function using appropriate input to the key derivation function. Example key derivation functions include KDF1, defined in IEEE Std 1363 2000, key derivation functions defined in ANSI X9.42, and HMAC-based key derivation functions, such as the HMAC-Based Extract-and-Expand Key Derivation Function (HKDF) specified in RFC 5869. As another example, the key may be generated by a random or pseudo random number generator, a hardware entropy source or a deterministic random bit generator such as is specified by National Institute of Standards and Technology Special Publication (NIST SP) 800-90A. It should be noted that while FIG. 8 shows the process 800 including generating 814 a key, the key may be obtained in other ways such as by retrieval from storage. In other words, the key may have been pre-generated.

Continuing with the process 800 illustrated in FIG. 8, in an embodiment, the process 800 includes using 816 the generated key to encrypt a data object. For example, in an embodiment where the cryptographic service generates the key, the cryptographic service can provide the key, the KeyID, and an encrypted copy of the key to the data service. For example, referring to FIG. 7, the data service frontend may receive the envelope key and the KeyID for the master key used to encrypt the envelope key from the cryptography service with any other relevant information, such as authentication proof. The plaintext copy of the encryption key may then be used to encrypt the data object. The plaintext copy of the encryption key can be discarded and the encrypted data object as well as the encrypted key may then be stored 818. For example, referring to FIG. 7, the data service frontend may transmit to the encrypted data object and the encrypted key to the data service backend storage system for storage. In a configuration where the service generates the key, the service can provide the key and the KeyID to the cryptography service. For example, the data service frontend may send the envelope key and the KeyID for the master key used to encrypt the envelope key to the cryptography service with any other relevant information, such as authentication proof. The plaintext copy of the encryption key may then be used to encrypt the data object. The service can discard the plaintext copy of the encryption key and the encrypted data object as well as the encrypted key may then be stored. For example, referring to FIG. 7, the data service frontend may transmit to the encrypted data object and the encrypted key to the data service backend storage system for storage.

The encrypted data object and the encrypted envelope key may be stored without the plaintext version of key, that is, the plaintext key may be inaccessible to the data service backend storage system and one or more other systems. The key under which the data object is encrypted (e.g., the master key) may be made inaccessible in any suitable manner. In some embodiments this is achieved by storing it in memory accessible only to the cryptographic service. In some other embodiments this can be achieved by storing the master key in a hardware or other security module or otherwise under the protection of a hardware or other security module. In some embodiments, the memory location storing the plaintext envelope key (e.g., memory of the data service) may be allowed to be overwritten or memory location storing the key may be intentionally overwritten to render inaccessible the key to the data service frontend. As another example, the plaintext envelope key may be maintained in volatile memory that eventually ceases to store the key. In this manner, the envelope key is only accessible if it is decrypted using a key identified by the KeyID or otherwise obtained in an unauthorized manner, such as by cracking the key without the key identified by the KeyID, which may be computationally impractical. In other words, the key identified by the KeyID is required for authorized access to the key under which the data object is encrypted. Thus, if the data service backend storage system of FIG. 7 is compromised, such compromise would not provide access to the unencrypted data object because decrypting the data object would require access to the key, which is only obtainable through decryption using the key identified by the KeyID or through other ways which are not computationally feasible.

As noted, various embodiments of the present disclosure allow users to both store data objects and retrieve them in a secure manner. FIG. 9, accordingly, shows an illustrative example of an environment 900 which may be used to obtain data objects from storage. As illustrated in FIG. 9, the environment 900 includes an authentication service 902, a cryptography service 904, a data service frontend 906 system and a data service backend storage system 908. The authentication service, cryptography service, data service frontend and data service backend storage system may be computer systems such as described above. As illustrated in FIG. 9, the data service frontend system is configured to receive data object requests and provide data objects in response. In order to provide the data objects in response, the data storage frontend system in this embodiment is configured to interact with the authentication service, the cryptography service, and the data service backend storage system as illustrated in FIG. 9. For example, in various embodiments, the data service frontend system is configured to submit authentication requests to the authentication service and receives authentication proof in response to the requests. As another example, the data service frontend is configured to provide keys encrypted by a key identified by a KeyID and authentication proof to a cryptography service which is operable to determine whether to provide the key based, at least in part, on the authentication proof and, if determined to provide the key, then provide the key to the data service frontend. The data service frontend may also be configured to provide other information, such as the KeyID, to the cryptography service. Although, in some embodiments, the KeyID may be implicitly indicated to the cryptography service, such as through association with other information provided to the cryptography service. It should also be noted that, in some embodiments, the user 910 provides the KeyID to the data service frontend in connection with submitting requests to the data service frontend. Also, as illustrated in FIG. 9, the data service frontend in an embodiment is configured to request the data object from the data service backend storage system and receive in response the data object encrypted by the key and the key encrypted by a key identified by the KeyID. In some embodiments the cryptographic service may be operable to refuse to perform decryption of a ciphertext not generated using a key associated with a specified KeyID.

The data service frontend, in an embodiment, is configured to use the key received from the cryptography service to decrypt the data object and provide the decrypted data object to the user. FIG. 10, accordingly, shows an illustrative example of a process 1000 which may be used to provide the decrypted object in accordance with various embodiments. The process 1000 may be performed by any suitable system such as the data service frontend system described in connection with FIG. 9. In an embodiment, the process 1000 includes receiving 1002 a GET request for a data object. Receiving the GET request for the data object may be performed in any suitable manner such as described above in connection with other types of requests. For example, the GET request for the data object may include information used to authenticate the request and/or other information. The process 1000, accordingly, in an embodiment, as with other processes described herein, includes submitting 1004 an authentication request to an authentication system and receiving 1006 an authentication response. Submitting the authentication request and receiving the authentication response may be performed in any suitable manner, such as described above. The authentication response may be used to determine 1008 whether or not the GET request is authentic. If it is determined 1008 that the GET request is not authentic, the process 1000 in an embodiment includes denying 1010 the request. If, however, it is determined 1008 that the GET request is authentic, the process 1000 in an embodiment includes retrieving 1012 the encrypted data object and an encrypted key from storage. For example, the data service frontend system may obtain the encrypted data object and encrypted key from the data service backend storage system illustrated above in connection with FIG. 9.

In an embodiment, the process 1000 includes providing 1014 the encrypted envelope key to a cryptography service. Providing 1014 the encrypted envelope key to the cryptography service may be performed in any suitable manner and may be provided with other information, such as authentication proof that enables the cryptography service to determine whether to decrypt the encrypted key. In addition, providing 1014 the encrypted envelope key to the cryptography service may include providing an identifier of a key required for authorized decryption of the encrypted envelope key to enable the cryptography service to select a key identified by the identifier from among multiple keys managed by the cryptography service. As noted above, however, keys may be implicitly identified. The cryptography service may, accordingly, select an appropriate key and decrypt the encrypted key. Accordingly, in an embodiment, the process 1000 includes receiving 1016 the decrypted envelope key from the cryptography service. For example, if the cryptography service determines that the authentication proof is valid and/or that decryption of the encrypted is allowable according to any applicable policies, the cryptography service may provide the decrypted key to a system attempting to decrypt the data object. The data object may then be decrypted 1018 using the decrypted envelope key. The decrypted data object may then be provided 1020 to the requestor, such as the user or other system that submitted the GET request.

In many instances, it is desirable for users (i.e., generally devices utilizing a cryptography service) to interact directly with the cryptography service. FIG. 11 accordingly shows an illustrative example of an environment 1100 which allows for direct user 1102 access to a cryptography service. In environment 1100, included is an authentication service 1104, a data service frontend 1106 and a data service backend storage system 1108. The authentication service, data service frontend and data service backend storage system may be as described above. For example, the data service frontend may be configured to receive and respond to requests from users as illustrated in FIG. 11 over a suitable network 1110. As part of responding to requests from the users over the network, the data service frontend may also be configured to interact with the authentication service in order to determine whether user requests are authentic and/or enforce policy on the requests. The data service frontend may also be configured to interact with the data service backend storage system as part of fulfilling user requests. User requests may include, for example, PUT requests to store data in the backend storage system and GET requests to retrieve data from the data service backend storage system. As above, other requests may also be used in accordance with the various embodiments, such as requests to delete data stored in the data service backend storage system, requests to update the data stored in the data service backend storage system and the like.

In the particular example of FIG. 11, in the environment 1100, the cryptography service includes a cryptography service frontend 1112 and a data service backend 1114. As with the data service frontend, the cryptography service frontend is configured to receive and respond to requests from users over the network. The cryptography service frontend is also configured to interact with the authentication service to determine whether user requests are authentic. Determining whether user requests are authentic may be performed in a simple manner such as described above. It should be noted that, while the cryptography service frontend and the data service frontend interact with the same authentication service, the cryptography service frontend and the data service frontend may interact with different authentication services. Further, the cryptography service frontend may be configured to enforce policy when responding to user requests.

The cryptography service frontend, in an embodiment, is configured to interact with the cryptography service backend. The cryptography service backend is configured, in accordance with instructions received from the cryptography service frontend, to perform cryptographic operations. Cryptographic operations include encryption, decryption and hash calculations and others. The environment 1100 may be used, for example, by users to have plaintext encrypted by the cryptography service so that the encrypted data can be stored in the data service backend storage system. Examples of such use of the environment 1100 are provided below. In addition, example details of an example cryptography service are also provided below.

Data may be stored in the data service backend storage system in any suitable manner such as described above. For example, techniques for storing encrypted data in the backend storage system described above may be used in the environment 1100. For example, while not illustrated, the data service frontend may communicate with the cryptography service frontend to cause the cryptography service backend to encrypt data which may then be stored in the data service backend storage system. The encrypted data may be a data object and/or an encrypted key that was used to encrypt a data object. In the environment 1100, data may be placed into the data service backend storage system in other ways as well. For example, users may provide plaintext to be encrypted by the cryptography service and may receive ciphertext in response. The users may then interact or may submit a request to the data service frontend to request that the ciphertext be stored in the data service backend storage system. The data service frontend, in this example, may store the ciphertext in any manner. For instance, the data service frontend and backend storage systems may be configured to be indifferent to whether data is encrypted.

In addition, as with all environments illustrated herein, an additional frontend system may be logically located between the users and the data service frontend and the cryptography service frontend and possibly other frontend systems in order to coordinate actions between the systems. For example, in some embodiments, users may interact with a frontend system that itself interacts with the cryptography service frontend and data service frontend so that operations from the perspective of the user are simpler. For example, a user may request that a data object be encrypted and stored and a frontend system responds to the request by appropriate interactions with the cryptography service frontend and data service frontend. From the perspective of the user, however, such may be performed by a single request. Other variations are also within the scope of the present disclosure.

FIG. 12 shows an illustrative example of an environment 1200 which may be used to implement various embodiments of the present disclosure. In FIG. 12, the environment 1200 is configured to enable users to store ciphertext in a data service backend storage system 1202. As illustrated in FIG. 12, accordingly, the environment 1200 includes a data service frontend 1204, a data service backend storage system 1202, an authentication service 1206, a cryptography service frontend 1208 and a cryptography service backend 1210. The data service backend storage system, the data service frontend, the authentication service, the cryptography service frontend and the cryptography service backend may be systems such as described above in connection with FIG. 11. For example, as illustrated in FIG. 12, the data service frontend is configured to receive and respond to user 1212 requests and may also be configured to enforce policy on user requests. The data service frontend, as part of responding to requests, may be configured to submit authentication requests to the authentication service and receive authentication proof in response in response. Upon successful authentication, the data service frontend may be further configured to interact with the data service backend storage system to obtain encrypted data objects and possibly unencrypted data objects from the data service backend storage system, which may be then provided to a user.

As illustrated in FIG. 12, the cryptography service frontend is also configured to submit authentication requests to the authentication service and receive, in response, authentication proof. Authentication proof may be used to obtain services from the cryptography service backend. For example, the cryptography service frontend may be configured to provide ciphertext to the cryptography service backend with authentication proof and the cryptography service backend may be configured to decrypt the ciphertext and provide the ciphertext in return. As illustrated in FIG. 12, the ciphertext may be an encrypted key and the cryptography service backend may decrypt the encrypted key and provide the decrypted key, that is a plaintext key, to the cryptography service frontend, which is further configured to provide the plaintext key to the user. The user may then use the key to decrypt the encrypted data object received from the data service frontend or to decrypt encrypted data objects stored within the user's domain (e.g., within a user operated or controlled data center or computer system). In this example, the user may have obtained the encrypted key from the data service frontend. For example, the user may have submitted a request to the data service frontend for the data object and/or the key used to encrypt the data object. While illustrated in FIG. 11 as a single request, the separate requests may be made for both the data object and the key. As illustrated in FIG. 11, the data service frontend may obtain the encrypted data object and encrypted key from the data service backend storage system and provide the encrypted data object and encrypted key to the user.

It should be noted that, as with all environments illustrated herein, variations are considered as being within the scope of the present disclosure. For example, FIG. 12 shows a data object encrypted under a key and the key encrypted by another key identified by a key identifier being provided to the user. Further levels of encryption may also be used. For example, the data object may be encrypted under a key that is only accessible to the user (and/or that is not accessible by the other components of the environment 1200). A key used to encrypt the data object may also be encrypted under the key that is only accessible to the user. In this example, unauthorized access to the components of the environment 1200 (absent the user) still does not provide access to the unencrypted contents of the data object since access to the user's key is still required for authorized decryption.

As another example, in the environment 1200 illustrated in FIG. 12, the data service frontend and the data service backend storage system do not have access to the plaintext data stored by the data service backend storage system because the data service frontend and the data service backend storage system do not have access to a key needed to decrypt the encrypted data. In some embodiments, however, access may be granted to the data service frontend and/or the data service backend storage system. For instance, in an embodiment, temporary access to the key may be provided to the data service frontend to enable the data service frontend to obtain encrypted data, decrypt the encrypted data, use the decrypted data for a particular purpose (e.g., indexing), and then delete or otherwise lose access to the decrypted data. Such actions may be governed by policy enforced by the data service frontend and/or cryptography service and may require authorization from the user.

FIG. 13 shows an illustrative example of a process 1300 which may be used to obtain an encrypted data object and an encrypted key such as from a data service backend storage system such as described above. The process 1300, for example, may be performed by the data service frontend system described above in connection with FIG. 12. In an embodiment, the process 1300 includes receiving 1302 a GET request for an encrypted data object. Receiving the GET request may be performed in any suitable manner such as by receiving the request via an API call to the data service frontend system. As a result of having received the GET request, process 1300 may include submitting 1304 an authentication request and receiving 1306 an authentication response. Submitting 1304 the authentication request and receiving 1306 the authentication response may be performed in any suitable manner such as described above. The authentication response may be used to determine 1308 whether the GET request is authentic. If it is determined 1308 that the GET request is not authentic, the process 1300 may include denying 1310 the GET request. Denying 1310 the GET request may be performed in any suitable manner such as described above. If, however, it is determined 1308 that that GET request is authentic, the process 1300 may include providing 1312 the encrypted data object with an encrypted key that, when decrypted, is usable to decrypt the encrypted data object. It should be noted that, as with all processes described herein, numerous variations are considered as being within the scope of the present disclosure. For example, the process 1300 may be configured to respond to the GET request, when authentic, by providing the encrypted data object but without providing an encrypted key. A requester, that is a user or system that submitted the GET request, may obtain the encrypted key in other ways. For example, in some embodiments, users may store encrypted keys themselves in a data storage system under the user's control. As another example, one storage service may store the encrypted data object and another service may store the encrypted key and the user may obtain the encrypted data object and encrypted key from the respective services. As another example, another service or a third party to the user may be used to store encrypted keys and users may obtain encrypted keys upon request. Generally, any way by which encrypted keys may be provided may be used.

As illustrated in FIG. 13, the process 1300 may result in an entity having been provided a data object and an encrypted key usable to decrypt the data object. In various embodiments, the encrypted key must be decrypted in order to decrypt the data object. FIG. 14, accordingly, shows an illustrative example of a process 1400 which may be used to provide a decrypted key to an entity in need of such a decrypted key in order to use the decrypted key for decryption of an encrypted data object. The process 1400 may be performed by any suitable system such as by the cryptography service frontend system described above in connection with FIG. 12. In an embodiment, the process 1400 includes receiving 1402 a decryption to decrypt a key using another key having a specified KeyID. While the process 1400 is described in connection with decryption of a key, it should be noted that the process 1400 may be adapted for decryption of data in general. The decryption request may be received 1402 in any suitable manner such as described above (e.g., via an appropriately configured API call). Further, the decryption request may be received by any entity appropriate to the context in which the process 1400 is being performed. For instance, the decryption request may originate from the user or from another system, such as the data service frontend discussed above. The decryption request may also include data (e.g., a key) to be decrypted or a reference thereto. The KeyID may be specified also in any suitable manner. For example, in some embodiments, the decryption request includes the KeyID or a reference to the KeyID, that is, information that can be used to determine the KeyID. As discussed above, the KeyID may also be implicitly specified. For example, the KeyID may be obtained through association with available data such as an identity of a requester that submitted the decryption request. For instance, the key corresponding to the KeyID may be a default key for the requestor or for the entity on behalf of which the request was submitted.

The process 1400, in an embodiment, includes submitting 1404 an authentication request and receiving 1406 an authentication response. Submitting 1404 the authentication request and receiving 1406 the authentication response may be performed in any suitable manner such as described above. Further, as described above, the received authentication response may be used to determine 1408 whether the GET request is authentic. If it is determined 1408 that the GET request is not authentic, the process 1400 may include denying 1410 the GET request. Denying 1410 the GET request may be performed in any suitable manner such as is described above. If, however, it is determined 1408 that the GET request is authentic, the process 1400 may include accessing policy information for the specified KeyID and/or for the requester. Policy information may include information including one or more policies on the KeyID and/or the requester.

In an embodiment, the accessed policy information is used to determine 1414 whether any applicable policy allows decryption of the key having the specified KeyID. If it is determined 1414 that the policy does not allow decryption of the key specified by the KeyID, the process 1400 may include denying 1410 the GET request such as described above. If, however, it is determined 1414 that policy allows decryption of the key having the specified KeyID, the process 1400 may include decrypting 1416 the key using the key identified by the KeyID. Once the key has been decrypted, using a key having the KeyID, the decrypted key may then be provided 1418 such as by transmission over a network to the requester that submitted the decryption request (or, in some embodiments, another authorized destination).

As illustrated in the environment 1200 discussed above, a user may obtain encrypted data objects and keys for decrypting the data objects in various ways. FIG. 15 shows an illustrative example of a process 1500 which may be used to obtain plaintext in accordance with various embodiments. The process 1500 may be performed by any suitable system such as by a system being operated and/or hosted by a user such as described in connection with FIG. 12. Other suitable systems include systems operating on behalf of users and not necessarily according to real time user input provided but perhaps according to preprogrammed processes.

In an embodiment, the process 1500 includes requesting 1502 ciphertext from a data storage service. Requesting 1502 ciphertext from a data storage service may be performed in any suitable manner such as described above. For example, a system performing the process 1500 may request 1502 ciphertext, using an appropriately configured API call in the environment 1200 illustrated above in connection with FIG. 12 and/or by the process 1300 described above in connection with FIG. 13.

The process 1500 may also include receiving 1504 ciphertext and an encrypted key. Receiving ciphertext and encrypted key may be performed in any suitable manner. For example, the ciphertext and encrypted key may be received in a response to the request for the ciphertext from a data storage service. Generally, however, the ciphertext and encrypted key may be received 1504 in other suitable ways. For example, the request to receive ciphertext from the data storage service may be an asynchronous request and ciphertext may be received 1504 pursuant to another request that is subsequently submitted. Further, the ciphertext and encrypted key may be provided in a single response or may be obtained separately such as by different responses (which may be from the same or from different systems). As another example, a system performing a process 1500 may locally or otherwise store encrypted keys and the encrypted key may be received from local memory.

In an embodiment, the process 1500 includes requesting decryption of the encrypted key, using a key having a specified KeyID. The KeyID may be specified in any suitable manner such as described above. Further, it should be noted that the system performing the process 1500 may be able to specify the KeyID in any suitable manner. For example, the encrypted key and/or information provided therewith may specify the KeyID. As another example, the system performing the process 1500 may have local or remote access to information that enables determining the KeyID. A local or remote database, for instance, may associate data object identifiers with key identifiers for keys used to encrypt the data objects. Generally, any manner in which the system can be enabled to specify the KeyID may be used. Further, in some embodiments, the KeyID need not be specified, such as when information provided to a cryptography service is sufficient to determine the KeyID. The request 1506 for decryption of the encrypted key may be performed in any suitable manner such as in connection with an environment discussed above in connection with FIG. 12 and/or by performance of the process 1400 described above in connection with FIG. 14.

The process 1500, in an embodiment, includes receiving 1508 the decrypted key. Receiving 1508 the decrypted key may be performed in any suitable manner. For example, the decrypted key may be received in response to a request for decryption of the encrypted key. As another example, the request for decryption of the encrypted key may be an asynchronous request and another request may have been submitted for receiving the decrypted key. Generally, the decrypted key may be received in any suitable manner. Further, as with all information flowing from one device to another, the passage of information may be performed using secure channels. For instance, the decrypted key may be once again encrypted for decryption by an entity receiving the decrypted key. Generally, any manner of secure communication may be used to pass information from one entity to another.

Once the decrypted key has been received 1508, the process 1500 may include using 1510 the decrypted key to decrypt 1510 ciphertext and therefore obtain plaintext. It should be noted that, as with all processes described herein, variations are considered as being within the scope of the present disclosure. For example, the process 1500 shows a request for ciphertext and a request for decryption of an encrypted key being performed sequentially. However, as with many operations described herein in connection with the various processes, operations need not be performed sequentially in various embodiments. For example, if a system performing the process 1500 has access to the encrypted key prior to requesting the ciphertext, or is otherwise able to do so, the system may request ciphertext and request decryption of the encrypted key in parallel or in an order different from that which is illustrated. Other variations are also considered as being within the scope of the present disclosure.

As discussed above, various embodiments of the present disclosure are directed to providing cryptography services. Cryptography services may be provided by a cryptography service system such as described above. FIG. 16 accordingly shows an illustrative example of a cryptography service 1600 in accordance with various embodiments. As illustrated in FIG. 16 and as discussed above, the cryptography service 1600 is logically comprised of a frontend system and a backend system. Both the frontend system and the backend system may be implemented by one or more computer systems configured to perform operations described herein. For example, as illustrated in FIG. 16, the frontend system of the cryptography service 1600 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:

CreateKey(KeyID)
Encrypt(KeyID, Data, [AAD])
Decrypt(KeyID, Ciphertext, [AAD])
Shred(KeyID)
ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeros or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key).

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API Call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

As illustrated in FIG. 16, the cryptography service 1600 includes a backend system 1602 that itself comprises various components in some embodiments. For example, the backend system in this example includes a request processing system (unit) 1604 which may be a subsystem of the cryptography service 1600 that is configured to perform operations in accordance with requests received through either the request API 1606 or the policy configuration API 1608. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 1610 which enables the request processing unit to determine whether requests are authentic. The authentication interface may be configured to interact with an authentication system such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 1600 also, in this illustrative example, includes a plurality of a security modules 1612 (cryptography modules), a policy enforcement module 1614, and a coordinator module 1616. An example of the coordinator module 1616 is the security module coordinator 1704 discussed below in connection with FIG. 17. Returning to FIG. 16, one or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 1600 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 1600 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 16 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

FIG. 17 shows an illustrative example of an environment 1700 in which various embodiments may be practiced. The environment 1700 illustrated in FIG. 17 may be a component of any of the environments described above. As illustrated in FIG. 17, the environment 1700 includes a plurality of security modules 1702, where each of the security modules 1702 may be a security module such as described above. Each of the security modules 1702 may, for instance, store or otherwise have access to the same cryptographic key or the same set of cryptographic keys, which may include multiple cryptographic keys. In other words, multiple security modules 1702 may have access to the same cryptographic key(s) and, generally, may operate under the same operational parameters. Accordingly, as discussed above, the security modules 1702 are configured to upon request perform cryptographic operations utilizing the cryptographic keys to which the security modules 1702 have access.

As illustrated in FIG. 17, the environment 1700 also includes a security module coordinator 1704. The security module coordinator 1704 may be a system configured to coordinate the states of the security modules in a cryptographic domain where a cryptographic domain (referred to simply as a domain) may comprise a set of security modules all having access to the same set of cryptographic keys. The security module coordinator 1704 may, for instance, coordinate the states of the security modules 1702 by ensuring that each of the security modules 1702 operate under the same operational parameters, such as by using the same cryptographic keys. For the purpose of illustration, the security modules 1702 are all members of the same cryptographic domain, although in various embodiments various environments may utilize multiple security modules where some security modules are not members of one or more cryptographic domains of which other security modules are members. Further, security modules of the same cryptographic domain are not necessarily all members of other cryptographic domains. One cryptographic module that is a member of the same cryptographic domain as another security module may, for instance, be a member of another cryptographic domain of which the other security module is not a member.

As described in more detail below, the security module coordinator may synchronize the states of the security modules 1702 so that the security modules 1702 all operate in accordance with the same operational parameters. For example, the security module coordinator may ensure that each of the security modules 1702 operate using the same cryptographic keys, the same operator quorum rules, operator permissions and/or with other operational parameters such as those described below. In an embodiment, the security module coordinator 1704 is configured to access a domain token repository 1706. The domain token repository 1706 may be a system having data storage configured to store domain tokens, such as described in more detail below. The domain token repository 1706 may include various metadata about the domain tokens, such as data indicating which operator submitted the domain token, whether the domain token was accepted for installation, which security modules have installed the domain token (i.e., which security modules have updated their operational parameters in accordance with information encoded in the domain token) and/or other information.

The security module coordinator 1704 may also be configured to access an encrypted key repository 1708. The encrypted key repository 1708 may be a data storage system that stores encrypted customer keys, that is, keys of customers of a cryptography service that utilizes the environment 1700. The keys in the encrypted key repository may be encrypted under a key securely stored among the security modules 1702, which may be referred to as a domain key. In an embodiment, keys stored in the encrypted key repository 1708 may be encrypted in key tokens, which may be organized collections of data that include a customer key encrypted under a domain key and an identifier of the domain key (and possibly additional information that may be encrypted or plaintext). As discussed below, to perform cryptographic operations using a customer key, the customer key may be provided to a security module which may, in turn, use the domain key to decrypt the customer key and use the customer key to perform one or more cryptographic operations, such as encryption or decryption of data provided to the security module with the encrypted customer key. The encrypted key repository 1708 may be configured to store customer keys in an organized manner. For instance, the encrypted key repository may store each customer key in association with an identifier of a domain key under which the customer key is encrypted. In this manner, if the domain key changes (e.g., is rotated as part of a key rotation process), customer keys encrypted under the domain key are locatable (e.g., by submitting a query to the encrypted key repository 18708) so that the customer keys can be decrypted using the domain key and reencrypted under a new domain key.

As illustrated in FIG. 17, the environment 1700 includes one or more security module operators 1710. A security module operator 1710 may be a human operator having authorization to perform various actions in the environment 1700, such as described in more detail below. It should be noted that while security module operator 1710 in an embodiment is a human operator, the security module operator may interact with various components of the environment 1700 through appropriate hardware such as input devices, computer systems and the like, although such hardware is not illustrated in the figure. It should further be noted that while in various embodiments the security module operator 1710 is a human operator, various embodiments of the present disclosure may utilize non-human operators, such as computer systems operating in accordance with automated processes. As an illustrative example, various embodiments of the present disclosure may utilize non-human operators, such as the security module coordinator 1704, that are configured to perform various automated tasks, such as cryptographic key rotation.

As illustrated by the various arrows in FIG. 17, the environment 1700 is configured to enable synchronization of the security modules 1702 so that the security modules 1702 operate in accordance with consistent operational parameters. In an embodiment of the security module operator 1710 submits a domain change request to one of the security modules 1702. The domain change request may be a request that specifies a change to a domain that the security module operator 1710 desires to make. As an example, the security module operator may desire to change one or more cryptographic keys in the cryptographic domain, one or more quorum rules for performing operations requested by operators, one or more operator permissions and/or other operational parameters in which the security modules 1702 operate. Further, in various embodiments, the security modules 1702 are configured such that the security module operator 1710 is able to submit a domain change request to any of the security modules 1702, and all of the security modules 1702 are operable to process the request. As illustrated in FIG. 17, the security module 1702 may respond to the domain change request by providing the security module operator 1710 a domain token. The security modules 1702 may each be configured to enforce one or more conditions before providing a domain token in response to a request to change a domain. In some examples, each security module 1702 may be configured to determine whether a request to change a domain includes an electronic (digital) signature for each security module operator of a set of security module operators that satisfy domain quorum rules of a domain currently installed on the security module 1702. For instance, if the quorum rules require K (K a positive integer) of the security module operators 1710, the security module may check that the domain change request includes an electronic signature for K operators listed in a currently installed domain.

As described in more detail below, a domain token may be a collection of information that encodes the operational parameters with which the security modules operator desires that the security modules 1702 operate. It should be noted that, as discussed in more detail below, the security module that provides the domain token, in various embodiments, does not operate in accordance with the proposed operational parameters encoded in the token until a later time, such as when instructed to operate in accordance with the parameters by the security module coordinator 1704. In other words, a domain token is an example of a proposal for a set of operational parameters for the security modules 1702 of the cryptographic domain defined in the token. Thus, the token is an example of information encoding a proposed state for a set of security modules. As discussed below, the token may change the set of security modules that are members of a cryptographic domain, such as by adding or subtracting security modules from the cryptographic domain.

In an embodiment, the domain token includes a complete set of operational parameters that the security module operator 1710 desires to replace operational parameters already present in the security modules 1702. In other words, a domain token encodes all parameters that are subject to change through the techniques described herein. However, in other embodiments the domain token may encode different information, such as information illustrating differences between a current domain of the security modules 1702 and a proposed domain. The domain token may include various other information which allows the domain token to be authenticated, such as one or more electronic signatures. The domain token may also include other information, such as a proposed version identifier for the proposed domain, an identifier of the operator that requested the domain token and/or an identifier of the security module that generated the token.

Once the security module operator 1710 receives a domain token from the security module 1702 to which the security module operator submitted the domain change request, the security module operator 1710 may provide the domain token to the security module coordinator 1704 in a domain installation request. A domain installation request may be a request for the security module coordinator 1704 to cause the security modules 1702 to synchronize to the operational parameters encoded by the domain token. In other words, the domain installation request may be a request from the security module operator 1710 to the security module coordinators 1704 for the security module coordinator 1704 to synchronize the security modules 1702 to a state proposed by the security module operator and encoded in the domain token.

In an embodiment, once the security module coordinator 1704 receives from the security module operator 1710 the domain installation request to install the domain token, the security module coordinator 1704 may make a determination whether to fulfill the domain installation request. In addition to operations such as determining whether the request is authentic and/or whether the operator that submitted the request is permitted (by any permissions stored for the operator and/or whether any quorum rules are satisfied, the security module coordinator may determine based at least in part on a version of the domain proposed in the domain token, and a version of the domain currently installed in the security modules 1702, whether to fulfill the request.

In an embodiment, domains have corresponding versions which may be identified by version numbers, which may be serially updated. When a security module 1702 receives a domain change request, the security module 1702 may provide a domain token that identifies a version for the proposed domain that is greater than the version of the domain currently installed on the security module. As an example, if the security module 1702 has installed domain version number 192427, the security module 1702 may generate a token with a proposed version number of 192428. The security module coordinator 1704 may accordingly compare the domain version number of the domain proposed in the domain token with another domain version, which may be the domain version already or currently being processed by the security module coordinator. Referring to the previous example, if the latest domain version that the coordinator has installed is 192427, the security module coordinator may allow a request to install a domain with proposed version number 192428 (or higher) but may deny a request to install a domain with a proposed version number of 192427 or lower. In this manner, the security module coordinator 1704 is able to ensure that inconsistent domains are not installed on the security modules 1702. For instance, if the security module coordinator 1704 has submitted a domain ingestion request to one or more security modules 1702 for version number 192427, and then receives a domain token proposing a domain with version 192427, the security module coordinator can determine to not install the received domain token since it may conflict with the other domain already installed or in the process of being installed on the security modules 1702.

Other information about a proposed domain may be used, in addition to or in alternative to domain version numbers, by the security module coordinator 1704 to determine whether to install the proposed domain. For example, in some embodiments, domain version information may include a hash calculated over some portion of the domain or other information based at least in part on the operational parameters encoded in that domain version. This information may be further based on information related to prior states related to the domain, where the information is usable to determine that a new domain version supersedes the exact current state operating as well as all prior states (to exclude conflicting domains generated in error cases from being accepted). Thus, determining by the security module coordinator 1704 to install a proposed domain may require analyzing the domain information to determine that the proposed domain supersedes the current domain as well as all prior states.

Once the security module coordinator 1704 determines to fulfill the domain installation request, the security module coordinator 1704 may submit domain ingestion requests to each of the security modules 1702 that are members of the domain proposed in the domain token. As discussed in more detail below, the domain token may include information that when received by a security module 1702 enables the security module 1702 to authenticate and update its operational parameters in accordance with information encoded in the domain token. Once a security module 1702 has installed a domain, the security module 1702 may begin operating in accordance with the updated operational parameters.

FIG. 18 shows an illustrative representation of a domain token 1800 in accordance with various embodiments. In an embodiment, the domain token is an organized collection of information that encodes proposed operational parameters for each security module of a cryptographic domain. As illustrated in FIG. 18, the domain token 1800 includes a security module package 1802 for each security module that is proposed to be a member of the proposed domain, a domain sub-token 1804, and an electronic signature 1806 of the domain sub-token (or other information contained in the domain token 1800). The security module package 1802 for a security module may include information specific to a corresponding security module in a cryptographic domain, such as an encrypted key 1808. In the embodiment illustrated in FIG. 18, a security module package 1802 includes a random key (discussed below) encrypted under a public key of a public private key pair specific to the security module for which the security module package is generated. In this manner, a security module may use its private key of the public private key pair to decrypt the random key and use the decrypted random key to, as discussed in the following paragraphs, decrypt the one or more domain keys that, in the domain sub-token 1804, are encrypted under the random key.

The domain sub-token 1804 may include various operational parameters for the proposed domain, for example, as illustrated in FIG. 18, the domain sub-token 1804 includes one or more domain keys encrypted under a random key which may be randomly generated by the security module that generates the domain token 1800. The domain sub-token 1804 may also include identifiers for one or more security modules proposed to be members of the cryptographic domain (authorized security modules), which may be the same identifiers of security modules that are currently members of the cryptographic domain if the domain is to be unchanged in this respect. The domain sub-token 1804 may also identify one or more authorized operators where the authorized operator may be human operators or non-human operators, such as the security module coordinator 1704 discussed above in connection with FIG. 17 and/or one or more servers operable to submit requests to perform cryptographic operations to the security modules of the cryptographic domain, which may be servers of a frontend system, such as described above.

A domain sub-token 1804 may also encode one or more domain quorum rules. A domain quorum rule may be a rule that specifies a quorum of operators required for fulfillment of a request, such as any request whose fulfillment includes generating a domain token. For example, referring to FIG. 17 the environment 1700 illustrates a single security module operator 1710. The environment 1700 may be configured, however, to require a request electronically signed by multiple security module operators 1710 before a request of a certain type is fulfilled. In this example, fulfillment of the request may be denied if the request does not include a valid signature for each member of a set of operators that satisfies the quorum rules. A domain quorum rule may specify a minimum number of operators required or may specify more complex rules. Further, a different domain quorum rule may be included for different types of requests. For example, one type of a request may have one domain quorum rule and another type of request may have another domain quorum rule. In addition, a domain sub-token may encode on or more operator permissions. Operator permissions may specify for a particular operator one or more operations that are permitted for a particular operator. There may be operator permissions for multiple operators. A security module may be configured to enforce the permissions, quorum rules, and ensure that requests are only processed if received from an authorized operator or set of operators.

As noted above, a security module package 1802 may include an electronic signature 1806 of the domain sub-token 1804 of the corresponding security module package 1802. The electronic signature may be generated using the random key discussed above or another key to which security module corresponding to the security module package has access. For instance, the electronic signature of a security module package for a security module may be generated using a public key of a public-private key pair, where the security module has access to the private key. Other information may also be included in the domain token 1800, such as information enabling a security module to select the appropriate security module package (i.e., the package that the security module is able to decrypt using its private key). In addition, a domain token may include a serial number or other identifier of a proposed version for the domain.

As noted above, various embodiments of the present disclosure relate to coordination of security modules. FIG. 19 accordingly shows an illustrative example of a process 1900 that may be used to coordinate security modules. The process may be performed by any suitable system, such as a security module coordinator such as described above in connection with FIG. 17. In an embodiment, the process 1900 includes receiving 1902, a domain installation request, which may, for example, include a domain token such as described above. The process 1900 may also include determining 1904 a requested (proposed) domain serial number, which may be included in or otherwise with the domain token. Further, the process 1900 may include determining 1906 a current domain serial number, which may be a serial number for a domain that has been installed in one or more security modules, such as described above. As with other operations, determining the requested (proposed) domain serial number and the current domain serial number may be performed in an order different than that which is illustrated in FIG. 19.

A determination may then be made 1908 whether the requested domain serial number is greater than the current domain serial number. Other checks may also be made, such as whether the requested domain is compatible with a currently installed domain. Such checks may include determining whether the requested domain is a descendent of the currently installed domain (e.g., whether a domain token encoding operational parameters for the requested domain was generated by a device that had the currently installed domain installed), whether the currently installed domain and requested domain share common information, such as one or more common domain keys and/or whether other conditions are satisfied. If it is determined 1908 that the requested domain serial number is greater than the current domain serial number (and/or that the requested domain is compatible with the currently installed domain), the process 1900 may include submitting 1910 a domain ingestion request to a plurality of security modules, which may be the security modules of the proposed domain and/or of the current domain. The domain ingestion request may be a request to update operational parameters in accordance with the operational parameters encoded in the domain token. If, however, it is determined 1908 that the requested domain serial number is not greater than the current domain serial number, then the process 1900 may include denying 1912 the domain installation request. Denying 1912 the domain installation request may be performed in any suitable manner, such as by transmitting a message that the request is denied or simply taking no action. In this manner, a domain token having a version that is not greater than a version that is already installed on one or more security modules prevents a conflicting domain from being installed on another security module. In this manner, it can be assured that the operational parameters by which the security modules operate are consistent.

Security modules themselves may also be configured to prevent installation of domains that conflict with other domains or that are otherwise improper. FIG. 20 accordingly shows an illustrative example of a process 2000 for processing requests to ingest a domain. In an embodiment, the process 2000 includes receiving 2002 a domain ingestion request such as described above in connection with FIG. 17. For example, a security module performing the process 2000 may receive a domain ingestion request with the domain token from a security module coordinator. The security module may then use 2004 a private key of a public private key pair to decrypt a random key included in the domain token and encrypted under a public key of the public private key pair. The decrypted random key may then be used to determine 2006 whether a signature of the domain token is valid. For example, the security module performing the process 2000 may use the decrypted random key to generate a reference signature for a domain sub-token provided with the request and compare the generated reference signature with a signature included in the domain token to determine whether the signatures match, a match indicating that the signature is valid. Other ways of determining the validity of a signature of the request and/or, generally, whether the request is authentic may also be used. Further, as discussed above, one or more checks whether the requested domain is compatible with a currently installed domain or, generally, whether one or more prerequisite conditions for installing the requested domain are satisfied may also be performed.

If it is determined 2006 that the signature is valid (and/or that one or more conditions for installability of the requested domain are satisfied), the process 2000 may include using 2008 the random key to decrypt one or more domain keys that are encrypted in the domain token under the random key. The one or more domain keys and/or other operational parameters included by the domain token may then be used to update 2010 the operational parameters of the security module performing the process 2000. That is, the security module may reconfigure itself to operate in accordance with the operational parameters included in the domain token. If, however, it is determined 2006 that the signature of the domain sub-token is invalid, the process 2000 may include denying 2012 the request such as described above. As with all processes described herein, variations are considered as being within the scope of the present disclosure. For example, the signature may be generated using any key to which a security module has access to enable the security module to verify the signature.

In various embodiments, security modules supporting a cryptography service do not themselves store customer keys, although variations where security modules store customer keys are considered as being within the scope of the present disclosure. Alternatively, customer keys are encrypted under a domain key and stored externally to the security modules, such as in a separate data storage system which may be operated as a service accessible through appropriately configured application programming interface (API) calls. Requests to perform cryptographic operations in connection with a customer key may be fulfilled by accessing the encrypted customer key from the external storage, providing the encrypted customer key to a security module which may then decrypt the customer key to perform the one or more cryptographic operations. However, as noted above, domain keys may change over time. For example, domain keys may be rotated to ensure that security modules do not perform so many operations that a cryptographic attack on the security of a cryptography service, and therefore on one or more customer keys, is enabled. Further, domain keys may be rotated so that, should a domain key be compromised by becoming accessible to an unauthorized entity, the lifetime during which the domain key is usable is limited.

FIG. 21, accordingly shows an illustrative example of a process 2100 which may be performed to rotate domain keys such that customer keys are re-encrypted as appropriate. The process 2100 may be performed by any suitable system, such as by a coordinator described above or another system (operator) authorized to communicate with a set of security modules. Generally speaking, the process 2100 includes updating a cryptographic domain to include a new domain key, identifying customer keys encrypted under the old domain key that is to be replaced by the new domain key, re-encrypting the identified customer keys under the new domain key and then performing an additional change of the domain to remove from the domain the old domain key. In this manner, security modules are able to perform cryptographic operations with customer keys during the process of a domain key rotation, regardless of whether the customer keys are encrypted under the old domain key or the new domain key at any given time during the rotation. In other words, during a domain key rotation, security modules may be configured with the ability to decrypt and use customer keys that are encrypted under the old domain key until the process is complete.

Referring to FIG. 21, in an embodiment the process 2100 includes performing 2102 a domain change process to add a new domain key to a cryptographic domain. The domain change process may be any suitable process that results in addition of the new domain key to the domain, such as the process 1900 discussed above in connection with FIG. 19. A determination may then be made 2104 whether the domain has been successfully updated in all the security modules (SMs) for which the update is required. If it determined 2104 that the domain has not been updated in all the security modules, a process for an unsuccessful domain change may be performed 2106. The process for an unsuccessful domain change may include waiting for a period of time and re-checking 2104 whether the domain has been updated in all the security modules. The process for an unsuccessful domain change may also include other actions such as by including notifying one or more operators so that the operators may take appropriate action.

If/when it is determined 2104 that the domain has been updated in all the security modules, the process 2100 may include obtaining 2108 a list of customer keys encrypted under the old domain key. A first customer key encrypted under the old domain key may be identified 2110. A determination may then be made 2112 whether the identified customer key is marked for electronic shredding, where electronic shredding may refer to any process where access to information is intentionally and irrevocably lost, such as by losing access to a key under which the information is encrypted, such as described below. If it is determined 2112 that the identified customer key is marked for shredding, then the identified customer key is not encrypted under the new domain key. In this manner, once access to the old domain key is lost, access to the customer hey is also lost. In other words, the identified customer key has been electronically shredded when access to the key under which the customer key is encrypted has been lost.

As illustrated in FIG. 21, the process 2100 may include determining 2114 whether there are additional customer keys encrypted under the old domain key. If it is determined 2114 that there are additional keys encrypted under the old domain key, the process 2100 may include identifying 2110 the next customer key encrypted under the old domain key. As described above, if it is determined 2112 that the identified next customer key is marked for shredding, the identified next customer key is not encrypted under the new domain key.

These operations may repeat as illustrated in FIG. 21 until it is determined 2112 that the identified next customer key is not marked for shredding. If it is determined 2112 that the identified next customer key is not marked for shredding, the process 2100 may include accessing 2116 the identified customer key and transmitting 2118 the encrypted customer key to a security module for refreshing to the new domain key (i.e., for performing a process that results in the encrypted customer key being encrypted in a manner decryptable using the new domain key). Transmitting 2118 the encrypted customer key to a security module may be performed, for example, referring to FIG. 17 by transmitting the customer key to any of the security modules 1702 described above in connection with FIG. 17.

The security module may then decrypt the encrypted customer key using the old domain key, and may re-encrypt the customer key using the new domain key. Accordingly, the process 2100, as illustrated in the embodiment shown in FIG. 21, includes receiving 2120 the customer key encrypted under the new domain key. The customer key encrypted under the new domain key may then be stored 2122 such as by storing 2122 the received customer key under the new domain key and the encrypted key repository 1708 described above in connection with FIG. 17.

A determination may then be made 2114 whether there are additional customer keys encrypted under the old domain key. This process may continue until it is determined 2114 that there are no additional keys encrypted under the old domain key. Once determined 2114 that there are no additional customer keys encrypted under the old domain key, the process 2100 may include performing 2124 a domain change process to remove the old domain key from the domain. The domain change process may be a process such as described above in connection with FIG. 19 where a security module operator submits a domain change request to a security module or receives a domain token, provides the domain token to a security module coordinator which may then cause the domain to be ingested in the security modules. The security modules, as a result of ingesting the token (i.e., by updating operational parameters in accordance with the token) may lose access to the old domain key. In some embodiments, for example, the security modules are configured such that domain keys are only stored in volatile memory such that domain keys are eventually overwritten or lost when power to the volatile memory is lost. It should be noted that explicit actions that result in loss of the old domain key may be performed by the security modules, such as by intentionally overwriting one or more memory locations in which the domain key is stored. In this manner, once the security modules lose access to the old domain key, keys that have been marked for shredding are effectively lost, that is, are practically inaccessible since the old domain key is no longer accessible to decrypt the keys marked for shredding.

As noted above, various systems, such as a system utilizing the environment 1700 may mark the shredding status of customer keys, such as when customers request or policy otherwise dictates that customer keys should be shredded. Accordingly, the process 2100 may include marking 2126 any of the customer keys with a "shred pending" status to a "shred complete" status. In this manner, customers and a provider to the customers are informed, such as by querying the keys' status, that customer keys have, in fact, been electronically shredded.

To enable various efficiencies and security enhancements, a cryptography service may store and utilize cryptographic keys in various ways. Further, as noted above, a cryptography service may operate in connection with other services such as data storage services. FIG. 22 accordingly shows an illustrated example of an environment 2200 in which various services may operate concurrently. As illustrated in FIG. 22 a data storage service 2202 is configured to communicate with a cryptography service 2204. For example, the data storage service 2202 and the cryptography service 2204 may be configured to configure appropriate API calls to each other for the purpose of transferring information and submitting requests and responses to the requests to one another.

As noted above, a data storage service 2202 may store a plurality of data objects 2206. Some, or even all, of the data objects 2206 may be encrypted utilizing the cryptography service 2204. As illustrated in 2204, data 2208 of the data object 2206 may be encrypted under a data object key 2210. The data object 2206 may also include the data object key 2210 encrypted under a customer key 2212 of a customer of the data storage service and the cryptography service 2204. In other words, the data object 2206 may include data encrypted under a key and the key encrypted under another key. In this manner, the data of the data object is stored in encrypted form with the key usable to decrypt the data, but the key is in encrypted form for the purpose of security. In other words, unauthorized access to the data object does not, by itself, enable access to the data inside of the data object in plaintext form. As shown in FIG. 22, the cryptography service 2204 may store the customer key 2212 encrypted under a domain key 2214 such as described above. For instance, referring to FIG. 17, a cryptography service may store the customer key 2212 encrypted under the domain key 2214 in the encrypted key repository 1708 of the environment 1700 described above in connection with FIG. 17.

As noted, the cryptography service 2204 may store multiple customer keys in this manner. As further noted above further, the cryptography service 2204 may include a plurality of security modules 2216 such as described above that store securely the domain key 2214. In this manner, the data storage service 2202 may interact with the cryptography service 2204 for decryption of the data object key. The data storage service 2202 may, for instance, provide the data object key 2210 encrypted under the customer key 2212 to the cryptography service 2204. The cryptography service 2204 may utilize a security module 2216 to use the domain key 2214 to decrypt the customer key 2212 and use the customer key 2212 to decrypt the data object key 2210. The data object key 2210 in plain text form may then be provided to the data storage service 2202, which may then use the data object key 2210 to decrypt the data 2208.

Variations, of course, are considered as being within the scope of the present disclosure. For example, the security module 2216 may be used to decrypt the data 2208 using the data object key 2210, thereby never providing the data storage service 2202 access to the data object key 2210.

FIG. 23 shows an illustrative example of a process 2300 which may be used to provide cryptographic services to another service. For example, the process 2300 may be performed by the cryptography service 2204 discussed above in connection with FIG. 22 in order to provide services to the data storage service 2202, and ultimately to a customer of the data storage service 2202. Returning to FIG. 23, in an embodiment, the process 2300 includes receiving 2302 a request for a new key. Referring to FIG. 22, for instance, the cryptography service 2204 may receive an electronic request in an appropriately configured API call from the data storage service 2202. Upon receipt of the request for the new key, the process 2300 may include accessing 2304 a customer key that is encrypted under a domain key. Referring to FIG. 17, for example, a web server of the cryptography service may access the customer key from the encrypted key repository 1708. It should be noted that the request for the new key may identify, that is provide an identifier, for the customer key to be used.

Once the customer key has been accessed 2304, the customer key which is encrypted under the domain key may be transmitted 2306 to a security module, such as one of the security modules 1702 described above in connection with FIG. 17. The security module may then use its access to the domain key to decrypt the customer key. The security module may generate (e.g., randomly) or otherwise obtain a key and encrypt the generated key with the customer key. Accordingly, the process 2300 may include receiving 2308 a new key encrypted under the customer key and in plaintext form from the security module that performed the encryption. The received new key in encrypted and plaintext form may then be provided 2310 in response to the request that was received 2302. In addition, the new key unencrypted by the customer key may also be provided in response to the request. In this manner, the data storage service can use the new key to encrypt data and then electronically shred the new key, leaving only the encrypted key accessible.

As with all processes described herein, variations are considered as being within the scope of the present disclosure. For example, in some embodiments the process 2300 is modified such that a request to encrypt a key is received. The data storage service may, for instance, generate a data object key, use the generated data object key to encrypt data of a data object and then provide the generated data object key to the cryptography service, which as described in connection with FIG. 23, may encrypt the data object key by accessing an appropriate customer key providing the encrypted customer key and the data object key to a security module, which may encrypt the data object key.

Various embodiments of the present disclosure may also be used to enable the use of sessions so that various components of a cryptography service environment, such as the environment 1700 discussed above in connection with FIG. 17 can operate more efficiently. FIG. 24 accordingly shows an illustrative example of a process 2400 which may be used to enable the use of sessions. In an embodiment, the process 2400 includes receiving 2402 from an operator a request to create and expose a key. An example operator is the security module coordinator 1704 discussed above in connection with FIG. 17, or another component such as a component involved in the processing of requests submitted by customers and/or other services, such as in a frontend system, described above. The request may be authenticated using an operator key, which, as an example, may be a secret shared between the security module and the operator. For instance, the operator may sign the request using the operator key. Upon receipt 2403 of the request to create and expose a key, the process 2400 may include generating 2404 a key token. The key token may include a session key, an identifier of the operator to use the session key, and an expiration (e.g., time of expiration) all encrypted under a domain key of the current cryptographic domain. The session key may be, for example, a key that is randomly generated. The key token may also include an identifier of the domain key under which the data of the key token is encrypted to enable, for example, selection of an appropriate domain key should multiple domain keys be available for use. The generated key token may then be provided 2406 along with the plaintext session key in response to the request that was received 2402. The plaintext session key (and key token) can be provided over a secure channel, such as a secure socket layer (SSL) connection or by encrypting the session key using a public key of a public-private key pair where the operator has access to the private key of the public-private key pair. It should be noted that, while a single session key in a key token is used throughout the present disclosure for the purpose of illustration, more than one session key may be included in a key token. For instance, in some embodiments, a session key for each direction of communications traffic (inbound/outbound, e.g.) may be encoded in a key token in accordance with the various techniques described herein. Similarly, a key token may include one or more keys for message signing and one or more keys for encryption/decryption.

Once an operator obtains a key token that encodes a session key (which may be referred to as an operator key token), the operator may use the session key and key token to submit requests to various security modules for a time during which the key token has not expired. FIG. 25, accordingly, shows an illustrative example of a process 2500 for processing requests to perform cryptographic operations in accordance with an embodiment. The process 2500 may be performed by any suitable system, such as a security module, as described above. As illustrated in FIG. 25, the process 2500 includes receiving 2502 an operator key token and encrypted requests to perform a cryptographic operation (or multiple cryptographic operations). The request may be encrypted and digitally signed under the session key of the operator key token that was received 2502 with the request. In other words, in an embodiment, the request may include a digital signature that, to be valid, was generated by inputting the request and session key into a digital signature algorithm.

Upon receiving 2502 the request and operator key token, the process 2500 may include using 2504 the domain key to decrypt the received 2502 operator key token. A determination may then be made 2506 whether the operator key token is valid. The determination 2506 whether the operator key token is valid may include determining whether the operator that submitted the key is the operator identified in the operator key token, whether the operator key token was received within a time during which the operator key token is valid, as indicated by the expiration in the operator key token, and whether the digital signature of the request is valid (such as described above). If all conditions for the operator key token being valid are not satisfied, the process 2500 may include determining 2506 that the operator key token is invalid and, therefore, deny 2508 the request, such as described above. If, however, all conditions for the operator key token being valid are satisfied, the process 2500 may include determining 2506 that the operator key token is valid and may then include using 2510 the session key of the operator key token to decrypt the request.

As noted above, the request may include a key token that includes an encrypted key and an identifier of a domain key usable to decrypt the encrypted key. The process 2500 may, accordingly, include using the domain key identified in the key token of the decrypted request to decrypt 2512 the key in the key token of the decrypted request. Once the key of the key token has been decrypted 2512, the process 2500 may include performing 2514 the requested cryptographic operation(s) on data encoded in the decrypted request using the decrypted key. One or more results may be generated as a result of performing the one or more cryptographic operations (such as plaintext, ciphertext, a digital signature, or result of verifying a digital signature). Accordingly, the process 2500 may include encrypting 2516 the result(s) of performing the cryptographic operation(s) using the session key. The encrypted result(s) may then be provided 2518 in response to the request that was submitted 2512.

In this manner, the operator is able to perform a relatively computationally intensive negotiation with a security module to receive a session key which may be used during a time period (determined by the expiration in an operator key token), where use of the session key may utilize a relatively lower amount of computational resources. For example, cryptographic operations using a session key may be performed using one or modes of the Advanced Encryption Standard while obtaining the session key from the security module may require relatively more computational resources. In other words, the operator is able to perform a relatively more difficult negotiation in order to obtain a session key that is computationally easier to use to interact with the security modules.

FIG. 26 illustrates aspects of an example environment 2600 for implementing aspects in accordance with various embodiments. As will be appreciated, although a web-based environment is used for purposes of explanation, different environments may be used, as appropriate, to implement various embodiments. The environment includes an electronic client device 2602, which can include any appropriate device operable to send and receive requests, messages or information over an appropriate network 2604 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 2606 for receiving requests and serving content in response thereto, although for other networks an alternative device serving a similar purpose could be used as would be apparent to one of ordinary skill in the art.

The illustrative environment includes at least one application server 2608 and a data store 2610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the electronic client device 2602 and the application server 2608, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 2610 can include several separate data tables, databases or other data storage mechanisms and media for storing data relating to a particular aspect of the present disclosure. For example, the data store illustrated may include mechanisms for storing production data 2612 and user information 2616, which can be used to serve content for the production side. The data store also is shown to include a mechanism for storing log data 2614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 2610. The data store 2610 is operable, through logic associated therewith, to receive instructions from the application server 2608 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 2602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 26. Thus, the depiction of the example environment 2600 in FIG. 26 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers and business application servers.

The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    for a set of data objects encrypted with a first key that is accessible to a plurality of devices, terminating access to a first subset of the set of data objects by:
        transmitting a second key to the plurality of devices, the second key usable for reencrypting a second subset of the set of data objects; and
        causing, until the plurality of devices complete reencryption of the second subset of the set of data objects, the first key to be usable to perform a first cryptographic operation on individual data objects of the set of data objects and to be unusable to perform a second cryptographic operation on the individual data objects; and
    at a time after the second subset becomes accessible by using the second key:
        verifying that each of the plurality of devices has access to the second key; and
        causing the plurality of devices to lose access to the first key.

2. The computer-implemented method of claim 1, wherein:
    the set of data objects is associated with a customer of a service provider; and
    the method further comprises receiving a selection, from the customer, of the first subset for electronic shredding.

3. The computer-implemented method of claim 1, further comprising selecting the second subset to exclude data objects of the set of data objects that are marked for electronic shredding.

4. The computer-implemented method of claim 1, wherein reencrypting the second subset includes accessing, based at least in part on the second subset being associated with the first key, a data object of the second subset from a data storage system.

5. The computer-implemented method of claim 1, wherein the plurality of devices are security modules.

6. The computer-implemented method of claim 1, further comprising determining, based at least in part on a lack of a request to mark a particular data object of the set of data objects for electronic shredding, that the particular data object of the set of data objects is not selected for electronic shredding.

7. The computer-implemented method of claim 1, wherein a data object of the set of data objects is a cryptographic key used by the plurality of devices to perform cryptographic operations.

8. A system, comprising memory to store instructions that, as a result of execution by one or more processors, cause the system to, for a set of data objects encrypted with a first key that is accessible to a plurality of devices:
    initiate reencryption of a second subset of the set of data objects by providing tho a second key to the plurality of devices;
    during reencryption of the second subset, allow the plurality of devices to perform a first cryptographic operation and not to perform a second cryptographic operation on a first subset of the set of data objects using the first key; and
    at a time after the individual data object of the second subset becomes accessible by using the second key, cause the plurality of devices to lose access to the first key.

9. The system of claim 8, wherein the set of data objects is a plurality of cryptographic keys.

10. The system of claim 8, wherein the instructions further include instructions that, as the result of execution by the one or more processors, cause the system to:
    receive an identifier associated with the individual data object; and
    select one of the first key or the second key based at least in part on the identifier.

11. The system of claim 8, wherein:
    the instructions further include instructions that, as the result of execution by the one or more processors, cause the system to associate the first subset with a first status indicating that electronic shredding is pending; and
    the instructions include instructions that, as the result of execution by the one or more processors, cause the device to, further at the time after an individual data object of the second subset is reencrypted, associate the first subset with a second status that indicates that electronic shredding of the first subset has been completed.

12. The system of claim 8, wherein the instructions include instructions that, as the result of execution by the one or more processors, cause the system to receive a request to replace the first key with the second key in accordance with a rotation schedule for the set of data objects.

13. The system of claim 8, wherein the instructions include instructions that, as the result of execution by the one or more processors, cause the system to cause the plurality of devices to use at least a third subset of the set of data objects to perform cryptographic operations as a service to a customer of the service.

14. The system of claim 8, wherein:
the first subset is a proper subset of the set of data objects; and
the second subset is mutually exclusive of the first subset.

15. A non-transitory computer-readable storage medium that stores executable instructions which, when executed by one or more processors of a computer system, cause the computer system to, for a set of data objects encrypted with a first key that is accessible to a plurality of devices, at least:
provide a second key to allow the plurality of devices to reencrypt, using a second key, a second subset of the set of data objects different from a first subset;
until the reencryption of the second subset is completed, allow the plurality of devices to perform a first cryptographic operation and not to perform a second cryptographic operation on a first subset of the set of data objects using the first key; and
at a time after the second subset becomes accessible by using the second key, cause the plurality of devices to lose access to the first key.

16. The non-transitory computer-readable storage medium of claim 15, wherein an individual data object of the second subset is a cryptographic key used by the plurality of devices to perform cryptographic operations.

17. The non-transitory computer-readable storage medium of claim 15, wherein the executable instructions, when executed by the one or more processors of the computer system, further cause the computer system to transmit the second subset to a data storage service.

18. The non-transitory computer-readable storage medium of claim 15, wherein the executable instructions that, when executed by the one or more processors of the computer system, cause the computer system to:
provide, to a selected device from the plurality of devices, a request that includes the first key and the second key;
receive a response that includes an encrypted first key and an encrypted second key, the encrypted first key and the encrypted second key being decryptable by individual devices of the plurality of devices to obtain the first key and second key; and
provide the encrypted first key and the encrypted second key to the individual devices of the plurality of devices.

19. The non-transitory computer-readable storage medium of claim 15, wherein the executable instructions that, when executed by the one or more processors of the computer system, cause the computer system to cause the plurality of devices to lose access to the first key include instructions that cause the computer system to:
provide a request, to a selected device from the plurality of devices, for a set of operational parameters for the plurality of devices for which the first key has been replaced by the second key;
receive a response that includes the set of operational parameters; and
provide the set of operational parameters received to the plurality of devices.

20. The non-transitory computer-readable storage medium of claim 15, wherein:
the second subset is a proper subset of the set of data objects encrypted under the first key; and
the executable instructions include instructions that, when executed by the one or more processors of the computer system, further cause the computer system to select the second subset based at least in part on an individual data object of the second subset lacking an association with information indicating an instruction for electronically shredding.

* * * * *